US012659480B2

(12) United States Patent
Filippov et al.

(10) Patent No.: US 12,659,480 B2
(45) Date of Patent: Jun. 16, 2026

(54) METHOD AND APPARATUS OF HARMONIZING WEIGHTED PREDICTION WITH NON-RECTANGULAR MERGE MODES

(71) Applicant: HUAWEI TECHNOLOGIES CO., LTD., Shenzhen (CN)

(72) Inventors: Alexey Konstantinovich Filippov, Moscow (RU); Huanbang Chen, Shenzhen (CN); Vasily Alexeevich Rufitskiy, Moscow (RU); Haitao Yang, Shenzhen (CN); Elena Alexandrovna Alshina, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/785,937

(22) Filed: Jul. 26, 2024

(65) Prior Publication Data

US 2024/0388706 A1     Nov. 21, 2024

Related U.S. Application Data

(63) Continuation of application No. 17/861,641, filed on Jul. 11, 2022, now Pat. No. 12,075,045, which is a
(Continued)

(51) Int. Cl.
H04N 19/119          (2014.01)
H04N 19/172          (2014.01)
(Continued)

(52) U.S. Cl.
CPC ......... H04N 19/119 (2014.11); H04N 19/172 (2014.11); H04N 19/174 (2014.11);
(Continued)

(58) Field of Classification Search
CPC .................................................... H04N 19/119
See application file for complete search history.

(56) References Cited

U.S. PATENT DOCUMENTS

2005/0185937 A1*  8/2005  Comer ........... H04N 21/234327
                                                        386/334
2009/0279608 A1    11/2009  Jeon et al.
(Continued)

FOREIGN PATENT DOCUMENTS

CN         103959793 A      7/2014
CN         105659603 A      6/2016
(Continued)

OTHER PUBLICATIONS

Document: JVET-P0617-v1, A. Filippov et al, Non-CE4: On TPM merge mode in the presence of weighted prediction, Joint Video Experts Team (JVET) of ITU-T SG 16 WP 3 and ISO/IEC JTC 1/SC 29/WG11, 16th Meeting: Geneva, CH, Oct. 1-11, 2019, 9 pages.
(Continued)

*Primary Examiner* — Jerry T Jean Baptiste
(74) *Attorney, Agent, or Firm* — WOMBLE BOND DICKINSON (US) LLP

(57)          ABSTRACT

A method of coding is described. The method can include obtaining a bitstream for a current picture, obtaining a value of a first indicator for the current picture according to the bitstream indicating a slice type, and obtaining a value of a second indicator for the current picture according to the bitstream indicating whether a weighted prediction parameter is present in a picture header or slice header of the bitstream. The method can also include parsing a value of the weighted prediction parameter for a current block of a current slice of the current picture from the bitstream.
(Continued)

Furthermore, the method can include predicting the current block according to the value of the weighted prediction parameter.

20 Claims, 19 Drawing Sheets

Related U.S. Application Data continuation of application No. PCT/RU2021/050003, filed on Jan. 12, 2021.

(60) Provisional application No. 62/960,134, filed on Jan. 12, 2020.

(51) Int. Cl.

| | |
|---|---|
| *H04N 19/174* | (2014.01) |
| *H04N 19/176* | (2014.01) |
| *H04N 19/503* | (2014.01) |
| *H04N 19/70* | (2014.01) |

(52) U.S. Cl.
CPC ......... *H04N 19/176* (2014.11); *H04N 19/503* (2014.11); *H04N 19/70* (2014.11)

(56) References Cited

U.S. PATENT DOCUMENTS

| | | |
|---|---|---|
| 2013/0016771 A1 | 1/2013 | Misra et al. |
| 2013/0070850 A1 | 3/2013 | Jeon et al. |
| 2013/0294499 A1 | 11/2013 | Wang |
| 2013/0329790 A1 | 12/2013 | Zhou |
| 2014/0105299 A1 | 4/2014 | Chen et al. |
| 2015/0264404 A1 | 9/2015 | Hannuksela |
| 2016/0150242 A1 | 5/2016 | Zhang et al. |
| 2017/0230684 A1 | 8/2017 | Gisquet et al. |
| 2019/0246114 A1 | 8/2019 | Tourapis et al. |
| 2020/0059674 A1 | 2/2020 | Shibuya |
| 2020/0228796 A1 | 7/2020 | Seregin |
| 2023/0114860 A1 * | 4/2023 | Zhang .................. H04N 19/105 |
| | | 375/240.26 |

FOREIGN PATENT DOCUMENTS

| | | |
|---|---|---|
| CN | 107027026 A | 8/2017 |
| KR | 20220097511 A | 7/2022 |
| RU | 2668723 C2 | 10/2018 |
| WO | 2021125700 A1 | 6/2021 |

OTHER PUBLICATIONS

Document: JVET-Q0266-v1, Alexey Fihppov et al, On TPM and GEO merge modes in presence of weighted prediction, Joint Video Experts Team (JVET) of ITU-T SG 16 WP 3 and ISO/IEC JTC 1/SC 29/WG11, 17th Meeting: Brussels, BE, Jan. 7-17, 2020 , 15 pages.

Document: JVET-Q0419-v2, Ling Li et al, Aug. 9: On picture header, Joint Video Experts Team (JVET) of ITU-T SG 16 WP 3 and ISO/IEC JTC 1/SC 29/WG11, 17th Meeting: Brussels, BE, Jan. 7-17, 2020, 5 pages.

Document: JVET-P2001-vE, Benjamin Bross et al, Versatile Video Coding (Draft 7), Joint Video Experts Team (JVET) of ITU-T SG 16 WP 3 and ISO/IEC JTC 1/SC 29/WG 11, 16th Meeting: Geneva, CH, Oct. 1-11, 2019, 489 pages.

Pan ong et al., AVS + Video Coding Technology and elevant Measurement Standards Overview, DOI: 10.16280/j.videoe. 2015. 16.022, 2015, with an English abstract total 5 pages.

JVET-Q0200, Hendry et al., [AHG9]: On picture level and slice level tool parameters, Joint Video Experts Team (JVET) of ITU-T SG 16 WP 3 and ISO/IEC JTC 1/SC 29/WG 11, 17th Meeting: Brussels, BE, 7 Jan. 17, 2020, 6 pages.

B.Bross, et al, "Versatile Video Coding (Draft 7)", Editors, Joint Video Experts Team (JVET) of ITU-T SG 16 WP 3 and ISO/IEC JTC 1/SC 29/WG 11, 16th Meeting: Geneva, VET-P2001-vE, Oct. 1-11, 2019, total 489 pages.

* cited by examiner

10 determining whether a non-rectangular inter prediction mode is allowed for a group of blocks — S1201 obtaining one or more inter prediction mode parameters and weighted prediction parameters for the group of blocks — S1202 obtaining prediction value of a current block based on the one or more inter prediction mode parameters and weighted prediction parameters — S1203

Apparatus 1300

Non-transitory memory 1301

Processor 1302 parse a value of the weighted prediction
parameter, when
the value of the first indication is equal
to a first default value,
the value of the second indication is
equal to a second default value, and
the value of the third indication indicates
that weighted prediction is applicable to
the inter slice

1650 predict current block according to the
parsed value

1660

METHOD AND APPARATUS OF HARMONIZING WEIGHTED PREDICTION WITH NON-RECTANGULAR MERGE MODES

CROSS-REFERENCE TO RELATED APPLICATIONS

This application is a continuation of U.S. patent application Ser. No. 17/861,641, filed on Jul. 11, 2022, and issued as U.S. Pat. No. 12,075,045, which is a continuation of International Application No. PCT/RU2021/050003, filed on Jan. 12, 2021, which claims priority to U.S. Patent Application No. 62/960,134, filed on Jan. 12, 2020. All of the afore-mentioned patent applications are hereby incorporated by reference in their entireties.

TECHNICAL FIELD

Embodiments of the present application generally relate to the field of moving picture processing and more particularly to non-rectangular partitioning modes when they are used in a combination with weighted prediction for coding fades.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

In particular, with respect to the coding of images showing illumination changes weighted prediction may be advantageously used for motion compensation in the context of inter prediction. Non-rectangular partitioning, as the triangular partitioning/merge mode (TPM) and the geometric motion/merge partitioning (GEO), may be employed in order to cope with various kinds of motions in a manner that might be superior to inter prediction restricted to rectangular partitioning. However, for codecs allowing both weighted prediction and non-rectangular partitioning some harmonization is needed.

SUMMARY

Embodiments provide methods for coding a video sequence with weighted prediction parameters that are combined from fade weighting parameters and blending weighting parameters. The values of fade weighting parameters are determined by reference index values and reference picture lists, while blending weighting parameters are determined by a position of a predicted sample in a predicted block.

The foregoing and other objects are achieved by the subject matter of the independent claims. Further embodiment forms that might be combined with each other are apparent from the dependent claims, the description and the figures.

According to a first aspect, it is provided, a method of coding, the method being implemented by a decoding device and comprising the operations of:

obtaining a bitstream for a current picture (for example, of an encoded video sequence);

obtaining (for example, by parsing a respective syntax element comprised in the bitstream) a value of a first indicator for the current picture according to the bitstream, wherein the first indicator indicates a slice type (of a slice of the current picture);

obtaining (for example, by parsing a respective syntax element comprised in the bitstream) a value of a second indicator for the current picture according to the bitstream, wherein the second indicator indicates whether a weighted prediction parameter is present in a picture header of the bitstream or is present in a slice header of the bitstream;

parsing a value of the weighted prediction parameter for a current block from the bitstream, when the value of the first indicator is equal to a first preset value (for example, 1) and the value of the second indicator is equal to a second preset value (for example, 2), wherein the current block is comprised in a current slice of the current picture, the first preset value is an integer value, and the second preset value is an integer value; and predicting the current block (generating a prediction block for the current block) according to the value of the weighted prediction parameter.

Thus, based on the value of a second indicator that is valid for an entire current picture it can be determined whether or not inter prediction is to be performed for a current block of a current slice using weighted prediction by means of the value of a weighted prediction parameter that is (only) parsed for a particular slice type indicated by the value of the first indicator and when the second indicator indicates that a weighted prediction parameter is present in the picture header. The signaling on a relatively high level, i.e., a picture header level, allows for a definite decision on whether or not weighted prediction is to be used for a block (particularly, all blocks) of a slice (particularly, all slices) of the current picture. If weighted prediction is to be used, any non-rectangular partitioning may be not allowed.

According to an embodiment, the value of the first indicator is obtained according to a picture header (for example, parsed from the picture header) comprised in the bitstream. According to another embodiment, the value of the second indicator is obtained according to a picture parameter set (for example, parsed from the picture parameter set) comprised in the bitstream and according to, yet, another embodiment, the value of the weighted prediction parameter is parsed from a picture header comprised in the bitstream. Thus, all of the relevant values (or syntax elements having these values) under consideration can be obtained based on relatively high-level signaling (namely, in picture headers or a picture parameter set). Thereby, efficient signaling related to the employment of weighted interprediction is provided.

According to an embodiment, the value of the first indicator being equal to the first preset value represents that a slice type of at least one slice comprised in the current picture is an inter slice, for example, comprising or being a B slice or a P slice.

According to a second aspect, it is provided a method of coding, the method being implemented by a decoding device and comprising the operations of:

obtaining a bitstream for a current picture (for example, of an encoded video sequence);

obtaining (for example, by parsing a respective syntax element comprised in the bitstream) a value of a first indicator for the current picture according to the bitstream, wherein the first indicator indicates a slice type (of a slice of the current picture);

obtaining (for example, by parsing a respective syntax element comprised in the bitstream) a value of a second indicator for the current picture according to the bitstream, wherein the second indicator indicates whether a weighted prediction parameter is present in a picture header of the bitstream or is present in a slice header of the bitstream;

obtaining (for example, by parsing a respective syntax element comprised in the bitstream) a value of a third indicator for the current picture according to the bitstream, wherein the third indicator indicates whether weighted prediction is applicable to an inter slice, wherein the slice type of the inter slice is B slice or P slice;

parsing a value of the weighted prediction parameter for a current block from the bitstream, when the value of the first indicator is equal to a first preset value (for example, 1), the value of the second indicator is equal to a second preset value (for example 1) and the value of the third indicator indicates that weighted prediction is applicable to the inter slice, wherein the current block is comprised in a current slice of the current picture, the first preset value is an integer value, and the second preset value is an integer value; and predicting the current block (generating a prediction block for the current block) according to the value of the weighted prediction parameter.

According to alternative embodiments (that might be combined with each other) of the method according to the second aspect, the value of the first indicator is obtained according to a picture header (for example, parsed from the picture header) comprised in the bitstream, or the value of the second indicator is obtained according to a picture parameter set (for example, parsed from the picture parameter set) comprised in the bitstream, or the value of the weighted prediction parameter is obtained according to a picture header comprised in the bitstream, or the value of the third indicator is obtained according to a picture parameter set (for example, parsed from the picture parameter set) comprised in the bitstream.

According to an embodiment of the method according to the second aspect, the value of the first indicator equal to the first preset value represents that a slice type of at least one slice comprised in the current picture is an inter slice, for example, comprising or being a B slice or a P slice.

According to an embodiment of the method according to the second aspect, wherein the value of the third indicator being 1 indicates that weighted prediction is applicable to the inter slice.

The method according to the second aspect and the embodiments thereof provided similar or the same advantages as the method according to the first aspect and the embodiments thereof.

Further, it is provided a decoder comprising processing circuitry for carrying out the method according to any one of the above-described embodiments and a computer program product comprising program code for performing the method according to any one of the above-described embodiments when executed on a computer or a processor.

Further, it is provided a decoder, comprising: one or more processors; and a non-transitory computer-readable storage medium coupled to the processors and storing programming for execution by the processors, wherein the programming, when executed by the processors, configures the decoder to carry out the method according to any one of the above-described embodiments as well as a non-transitory computer-readable medium carrying a program code which, when executed by a computer device, causes the computer device to perform the method of any one of the above-described embodiments.

Furthermore, according to another aspect, it is provided a non-transitory storage medium comprising a bitstream coded by the method of any one of the above-described embodiments.

According to a further aspect, it is provided an encoded bitstream for a video signal, wherein the bitstream comprises a first indicator for a current picture indicating a slice type (of a slice of the current picture) and a second indicator for the current picture indicating whether a weighted prediction parameter is present in a picture header of the bitstream or is present in a slice header of the bitstream. The bitstream, further, comprises the weighted prediction parameter for a current block, particularly, when the value of the second indicator is equal to a second preset value (for example, 2), wherein the current block is comprised in a current slice of the current picture and the second preset value is an integer value.

According to an embodiment, the first indicator is comprised in a picture header and/or the second indicator is comprised in a picture parameter set and/or the weighted prediction parameter is comprised in a picture header comprised in the bitstream.

According to an embodiment, the value of the first indicator being equal to the first preset value represents that a slice type of at least one slice comprised in the current picture is an inter slice, for example, comprising or being a B slice or a P slice.

According to a further aspect, it is provided an encoded bitstream for a video signal, wherein the bitstream comprises a first indicator for a current picture indicating a slice type (of a slice of the current picture), a second indicator for the current picture indicating whether a weighted prediction parameter is present in a picture header of the bitstream or is present in a slice header of the bitstream, and a third indicator for the current picture indicating whether weighted prediction is applicable to an inter slice, wherein the slice type of the inter slice is B slice or P slice. The bitstream, further, comprises the weighted prediction parameter, particularly, when the value of the second indicator is equal to a second preset value (for example 1), wherein the current block is comprised in a current slice of the current picture and the second preset value is an integer value.

According to alternative embodiments the first indicator is comprised in a picture header and/or the second indicator is comprised in a picture parameter set and/or the weighted prediction parameter is comprised in a picture header and/or the third indicator is comprised in a picture parameter set comprised in the bitstream.

According to an embodiment, the value of the first indicator equal to the first preset value represents that a slice type of at least one slice comprised in the current picture is an inter slice, for example, comprising or being a B slice or a P slice and/or the value of the third indicator being 1 indicates that weighted prediction is applicable to the inter slice.

Furthermore, according to another aspect, it is provided a non-transitory storage medium which includes an encoded bitstream decoded (or to be decoded) by an image decoding device, the bit stream being generated by dividing a frame of a video signal or an image signal into a plurality blocks, and including a first indicator for a current picture indicating a slice type (of a slice of the current picture) and a second indicator for the current picture indicating whether a weighted prediction parameter is present in a picture header of the bitstream or is present in a slice header of the bitstream. The bitstream, further, comprises the weighted prediction parameter for a current block, particularly, when the value of the second indicator is equal to a second preset value (for example, 2), wherein the current block is comprised in a current slice of the current picture and the second preset value is an integer value.

According to an embodiment, the first indicator is comprised in a picture header and/or the second indicator is comprised in a picture parameter set and/or the weighted prediction parameter is comprised in a picture header comprised in the bitstream.

According to an embodiment, the value of the first indicator being equal to the first preset value represents that a slice type of at least one slice comprised in the current picture is an inter slice, for example, comprising or being a B slice or a P slice.

Furthermore, according to another aspect, it is provided a non-transitory storage medium which includes an encoded bitstream decoded (or to be decoded) by an image decoding device, the bit stream being generated by dividing a frame of a video signal or an image signal into a plurality blocks, and including a first indicator for a current picture indicating a slice type (of a slice of the current picture), a second indicator for the current picture indicating whether a weighted prediction parameter is present in a picture header of the bitstream or is present in a slice header of the bitstream, and a third indicator for the current picture indicating whether weighted prediction is applicable to an inter slice, wherein the slice type of the inter slice is B slice or P slice. The bitstream, further, comprises the weighted prediction parameter, particularly, when the value of the second indicator is equal to a second preset value (for example 1), wherein the current block is comprised in a current slice of the current picture and the second preset value is an integer value.

According to alternative embodiments the first indicator is comprised in a picture header and/or the second indicator is comprised in a picture parameter set and/or the weighted prediction parameter is comprised in a picture header and/or the third indicator is comprised in a picture parameter set comprised in the bitstream.

According to an embodiment, the value of the first indicator equal to the first preset value represents that a slice type of at least one slice comprised in the current picture is an inter slice, for example, comprising or being a B slice or a P slice and/or the value of the third indicator being 1 indicates that weighted prediction is applicable to the inter slice.

All of the above-described methods can be implemented in the decoding devices described below and these devices can be configured to carry out the procedural operations of the respective methods with the same advantages as discussed above. The following devices are provided:

A decoding device (configured for decoding an encoded video sequence) comprising:

a bitstream obtaining unit configured for obtaining a bitstream for a current picture;

an indicator value obtaining unit configured for a) obtaining a value of a first indicator for the current picture according to the bitstream, wherein the first indicator indicates a slice type; and b) obtaining a value of a second indicator for the current picture according to the bitstream, wherein the second indicator indicates whether a weighted prediction parameter is present in a picture header of the bitstream or is present in a slice header of the bitstream;

a parsing unit configured for parsing a value of the weighted prediction parameter for a current block from the bitstream, when the value of the first indicator is equal to a first preset value (for example 1) and the value of the second indicator is equal to a second preset value (for example 1), wherein the current block is comprised in a current slice of the current picture, the first preset value is an integer value, and the second preset value is an integer value; and a prediction unit configured for predicting the current block according to the value of the weighted prediction parameter.

In this decoding device, the indicator value obtaining unit may be configured for obtaining the value of the first indicator according to a picture header comprised in the bitstream or the value of the second indicator according to a picture parameter set comprised in the bitstream, or the parsing unit may be configured for parsing the value of the weighted prediction parameter from a picture header comprised in the bitstream.

The value of the first indicator being equal to the first preset value may represent that a slice type of at least one slice comprised in the current picture is an inter slice, for example, comprising or being a B slice or a P slice.

Furthermore, it is provided a decoding device (configured for decoding an encoded video sequence) comprising:

a bitstream obtaining unit configured for obtaining a bitstream for a current picture;

an indicator value obtaining unit configured for a) obtaining a value of a first indicator for the current picture according to the bitstream, wherein the first indicator indicates a slice type;

b) obtaining a value of a second indicator for the current picture according to the bitstream, wherein the second indicator indicates whether a weighted prediction parameter is present in a picture header of the bitstream or is present in a slice header of the bitstream; and c) obtaining a value of a third indicator for the current picture according to the bitstream, wherein the third indicator indicates whether weighted prediction is applicable to an inter slice, wherein the slice type of the inter slice is B slice or P slice;

a parsing unit configured for parsing a value of the weighted prediction parameter for a current block from the bitstream, when the value of the first indicator is equal to a first preset value (for example 1), the value of the second indicator is equal to a second preset value (for example 1) and the value of the third indicator indicates that weighted prediction is applicable to the inter slice, wherein the current block is comprised in a current slice of the current picture, the first preset value is an integer value, and the second preset value is an integer value; and a prediction unit configured for predicting the current block according to the value of the weighted prediction parameter.

In this decoding device the indicator value obtaining unit may be configured for obtaining the value of the first indicator according to a picture header comprised in the bitstream or the value of the second indicator according to a picture parameter set comprised in the bitstream or the value of the third indicator according to a picture parameter set comprised in the bitstream, or the parsing unit may be configured for parsing the weighted prediction parameter from a picture header comprised in the bitstream.

Again, the value of the first indicator equal to the first preset value may represent that a slice type of at least one slice comprised in the current picture is an inter slice, for example, comprising or being a B slice or a P slice.

The value of the third indicator being 1 may indicate that weighted prediction is applicable to the inter slice.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
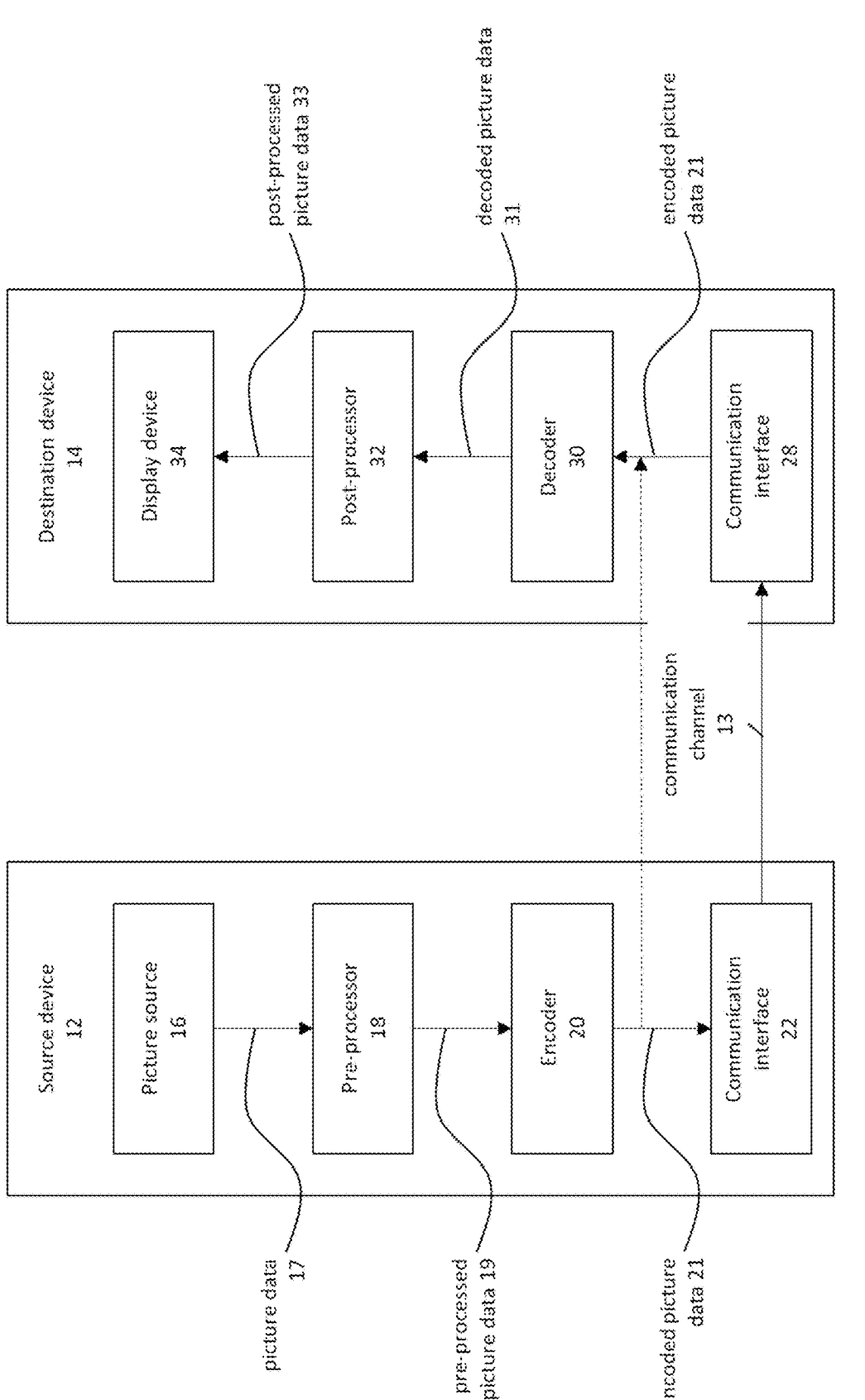
FIG. 1A is a block diagram showing an example of a video coding system configured to implement embodiments of the disclosure.

In the following identical reference signs refer to identical or at least functionally equivalent features, if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (e.g., Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 21.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 21 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
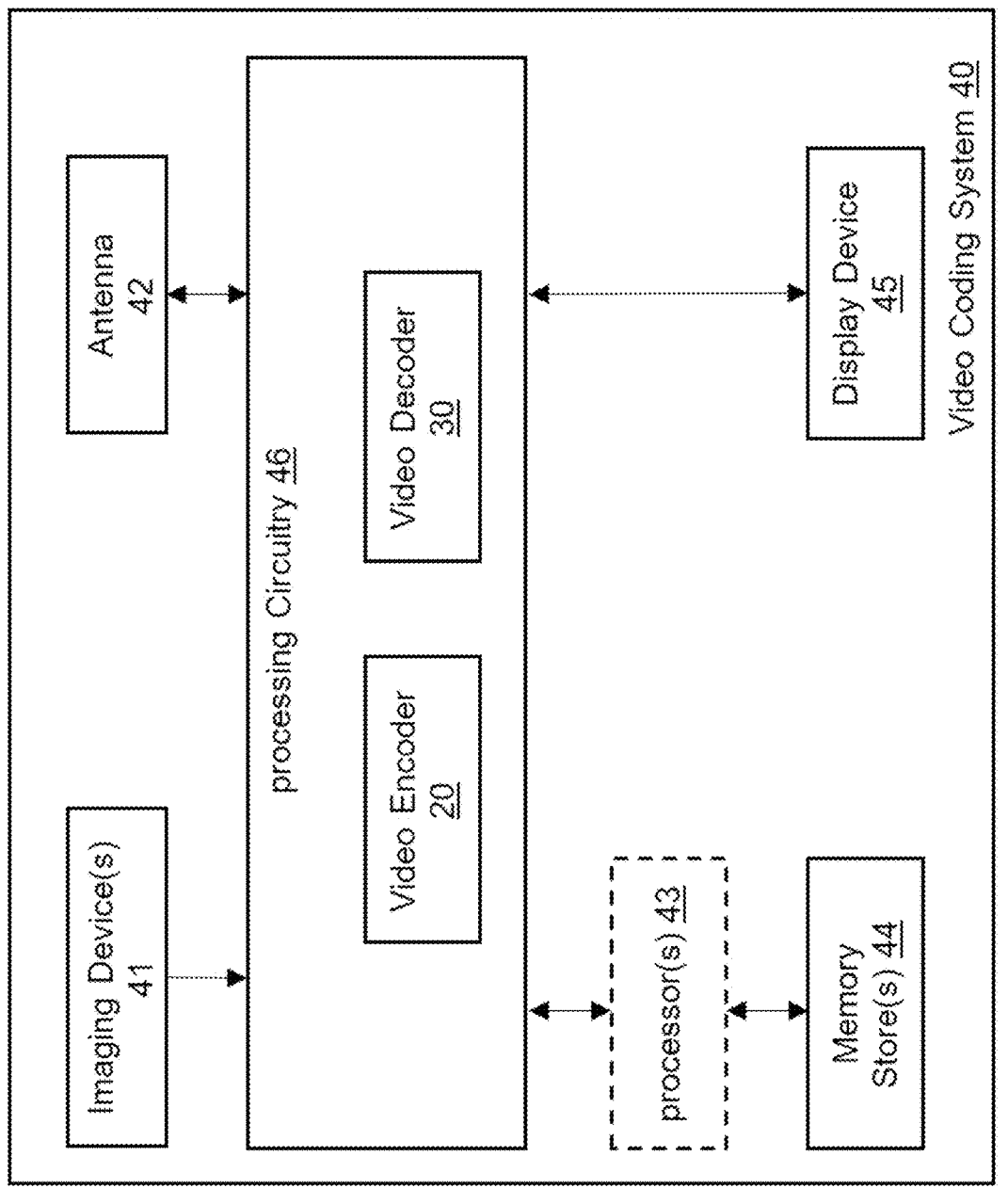
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
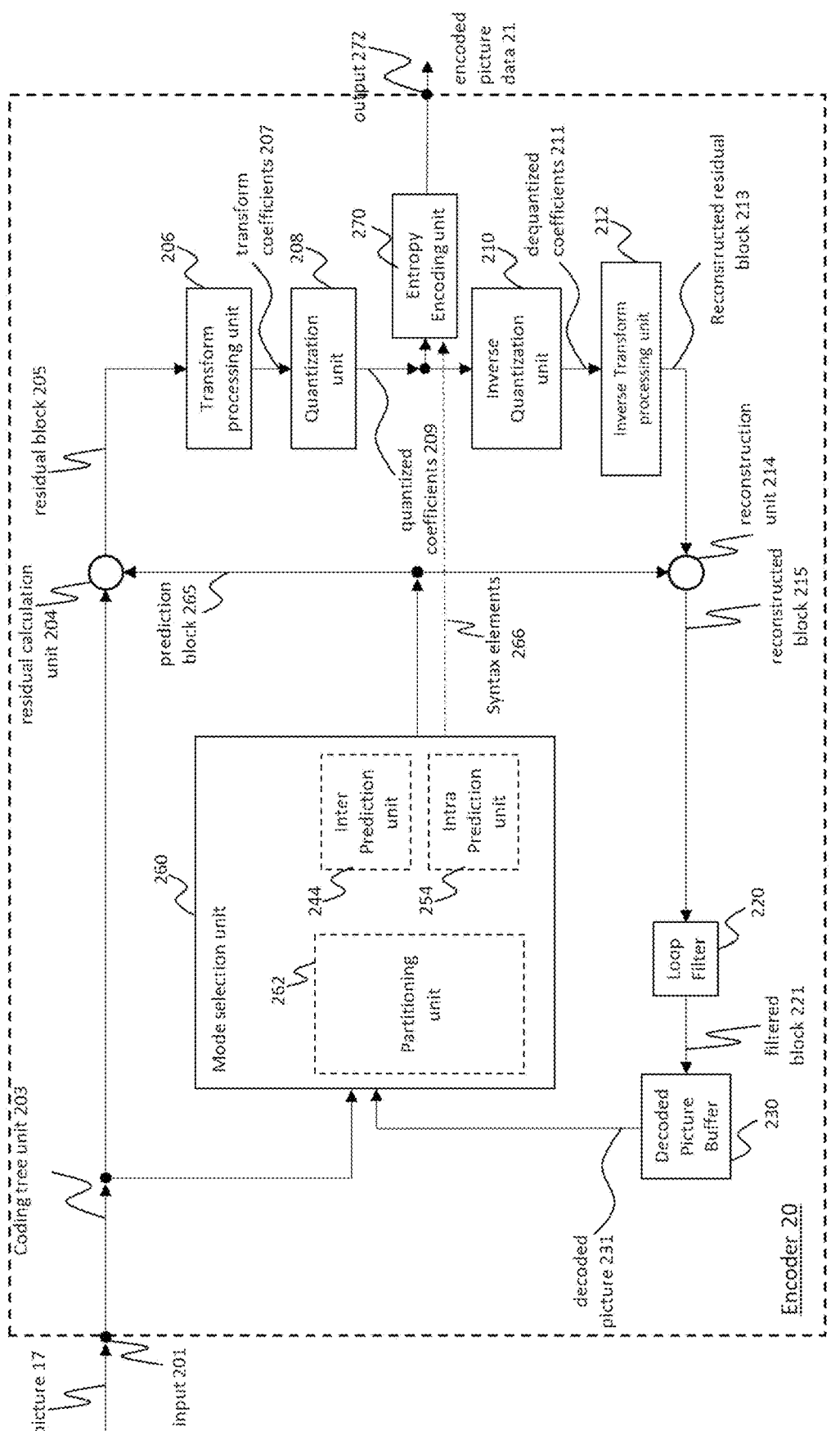
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
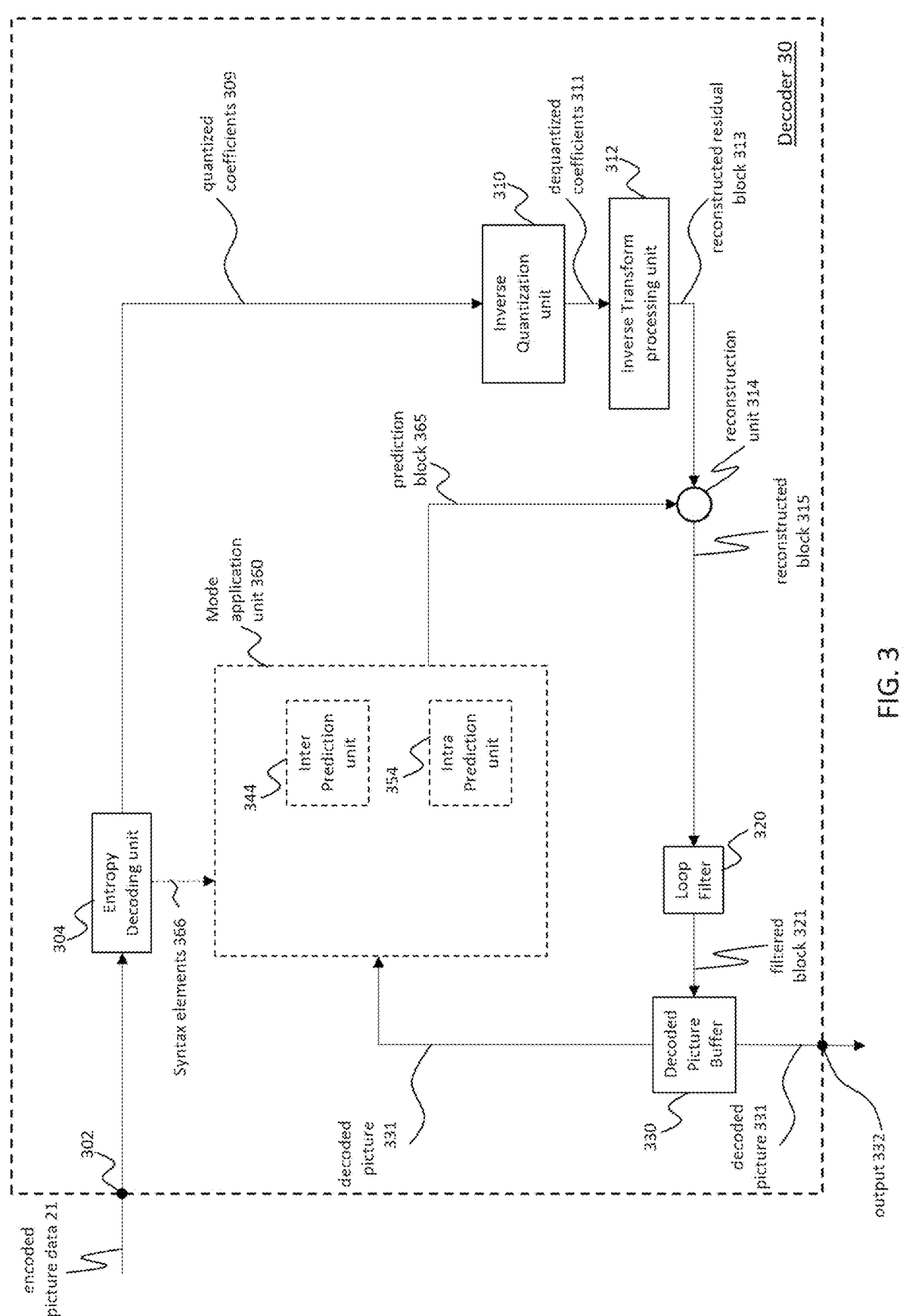
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and embodiment costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization operation sizes correspond to finer quantization, whereas larger quantization operation sizes correspond to coarser quantization. The applicable quantization operation size may be indicated by a quantization parameter (QP). The quantization parameter may for example be an index to a predefined set of applicable quantization operation sizes. For example, small quantization parameters may correspond to fine quantization (small quantization operation sizes) and large quantization parameters may correspond to coarse quantization (large quantization operation sizes) or vice versa. The quantization may include division by a quantization operation size and a corresponding and/or the inverse dequantization, e.g. by inverse quantization unit 210, may include multiplication by the quantization operation size. Embodiments according to some standards, e.g. HEVC, may be configured to use a quantization parameter to determine the quantization operation size. Generally, the quantization operation size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization operation size and quantization parameter. In one example embodiment, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization operation sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization operation size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 211) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DPB 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another embodiment, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 20 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 210, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 313 in the sample domain. The reconstructed residual blocks 313 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the intra prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using preset construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another embodiment, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^\wedge(\text{bitDepth}-1)\sim2^\wedge(\text{bitDepth}-1)-1$, where "^" means exponentiation. For example, if bitDepth is set equal to 16, the range is $-32768\sim32767$; if bitDepth is set equal to 18, the range is $-131072\sim131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = \left( mvx + 2^{bitDepth} \right) \% \ 2^{bitDepth} \tag{1}$$

$$mvx = \left( ux \ >= 2^{bitDepth-1} \right) ? \left( ux - 2^{bitDepth} \right) : ux \tag{2}$$

-continued $$uy = \left( mvy + 2^{bitDepth} \right) \% \ 2^{bitDepth} \tag{3}$$

$$mvy = \left( uy \ >= 2^{bitDepth-1} \right) ? \left( uy - 2^{bitDepth} \right) : uy \tag{4}$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux = \left( mvpx + mvdx + 2^{bitDepth} \right) \% \ 2^{bitDepth} \tag{5}$$

$$mvx = \left( ux \ >= 2^{bitDepth-1} \right) ? \left( ux - 2^{bitDepth} \right) : ux \tag{6}$$

$$uy = \left( mvpy + mvdy + 2^{bitDepth} \right) \% \ 2^{bitDepth} \tag{7}$$

$$mvy = \left( uy \ >= 2^{bitDepth1} \right) ? \left( uy - 2^{bitDepth} \right) : uy \tag{8}$$

The operations may be applied during the sum of mvp and mvd, as shown in formula (5) to (8).

Method 2: Remove the Overflow MSB by Clipping the Value $$vx = Clip3\left(-2^{bitDepth-1}, 2^{bitDepth-1} - 1, vx\right)$$

$$vy = Clip3\left(-2^{bitDepth-1}, 2^{bitDepth-1} - 1, vy\right)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$Clip3(x, y, z) = \begin{cases} x; & z < x \\ y; & z > y \\ z; & \text{otherwise} \end{cases}$$

Figure 4:
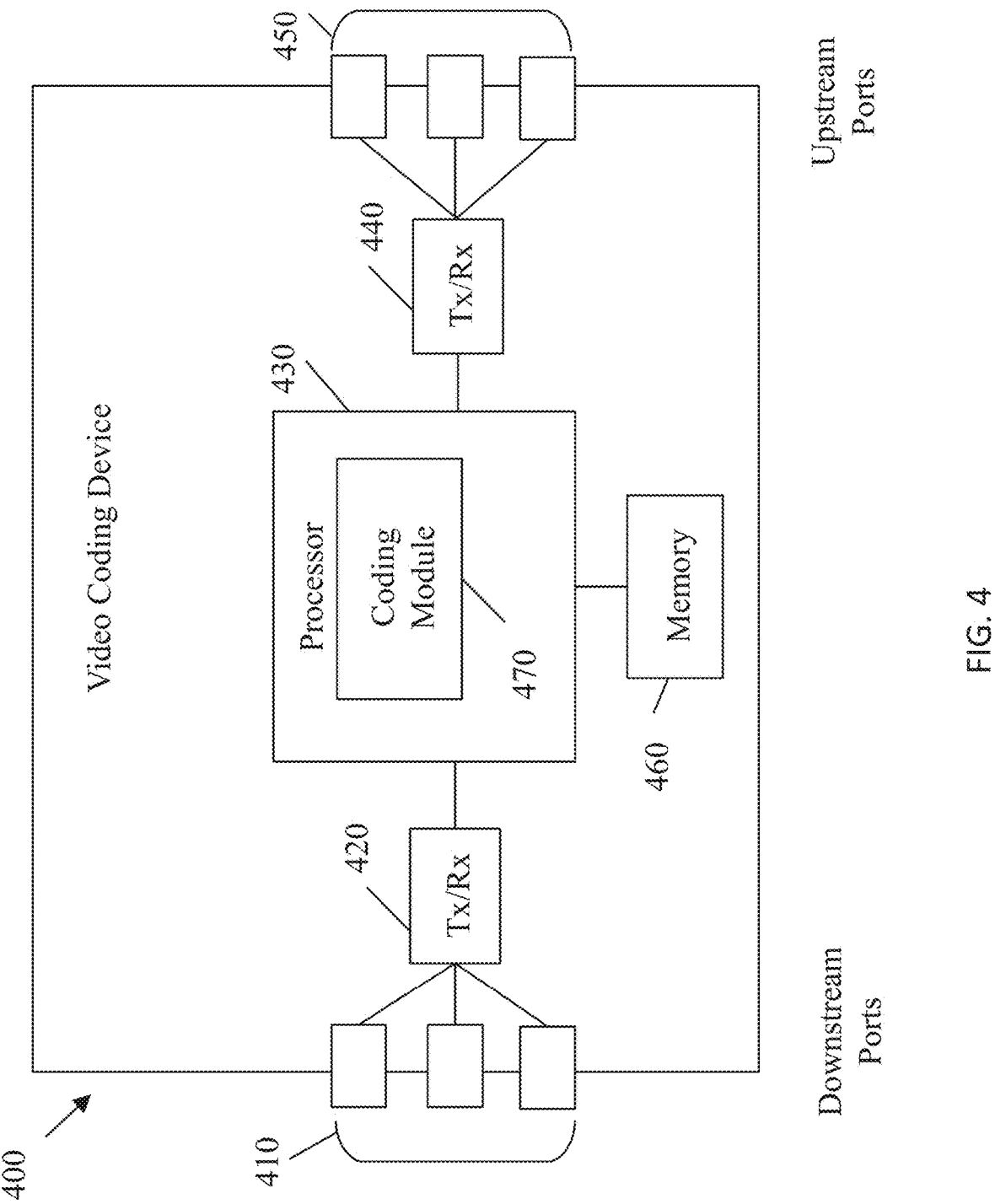
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICS, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
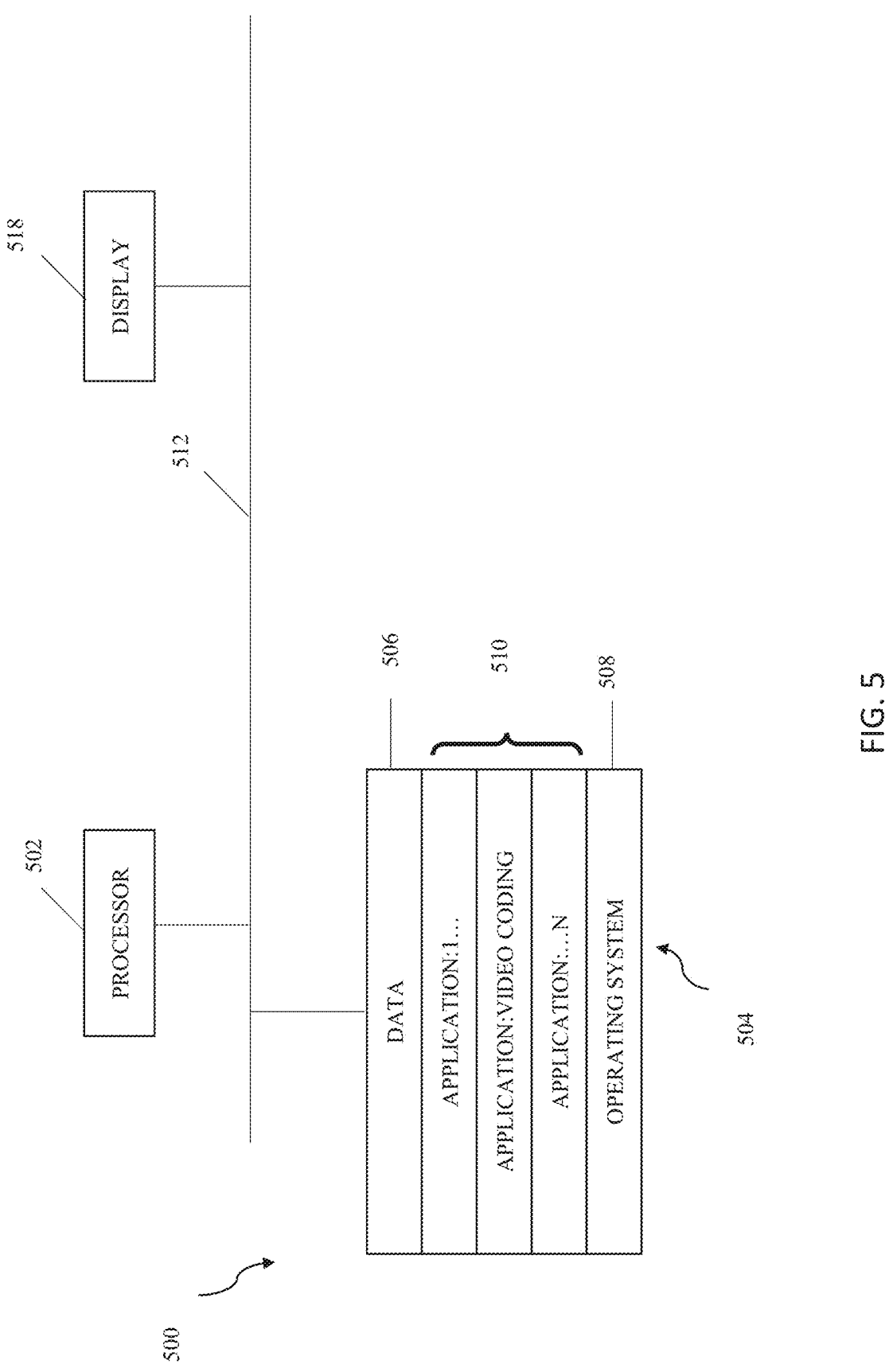
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed embodiments can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an embodiment. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

As mentioned in paper J. M. Boyce "Weighted prediction in the H.264/MPEG AVC video coding standard", IEEE International Symposium on Circuits and Systems, May 2004, Canada, pp. 789-792, Weighted Prediction (WP) is a tool, which is particularly useful for coding fades. The weighted prediction (WP) tool has been adopted in the H.264 video coding standard's Main and Extended profiles to improve coding efficiency by applying a multiplicative weighting factor and an additive offset to the motion compensated prediction to form a weighted prediction. In explicit mode, a weighting factor and offset may be coded in the slice header for each allowable reference picture index. In implicit mode, the weighting factors are not coded but are derived based on the relative picture order count (POC) distances of the two reference pictures. Experimental results are provided which measure the coding efficiency improvement using WP. When coding fade-to-black sequences, bitrate reductions of up to 67% were achieved.

Figure 6:
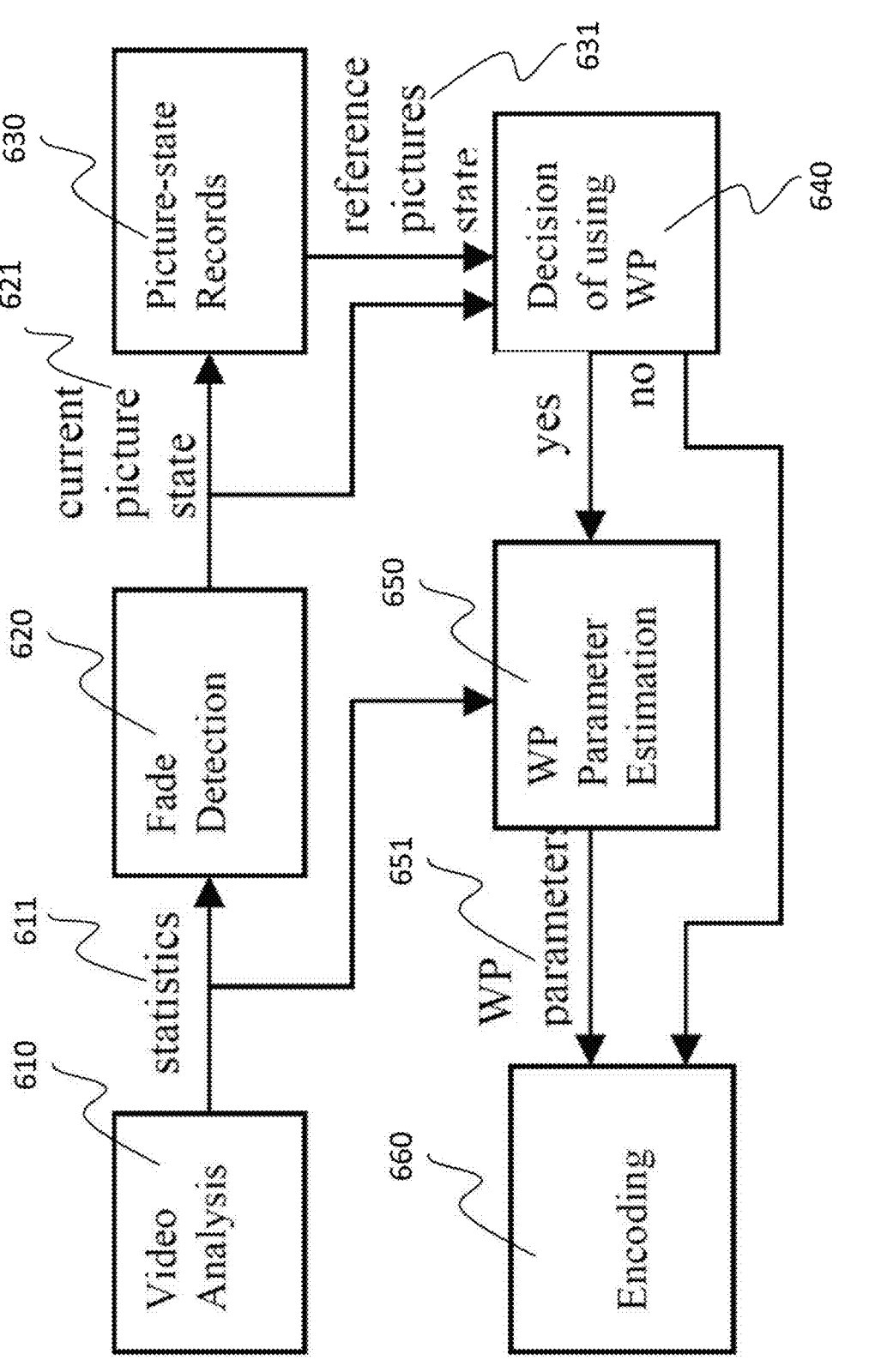
FIG. 6 is a flowchart for weighted prediction encoder-side decision making and parameter estimation.

When applied to a single prediction, as in P pictures, WP is similar to leaky prediction, which has been previously proposed for error resiliency. Leaky prediction becomes a special case of WP, with the scaling factor limited to the range $0 \leq \alpha \leq 1$. H.264 WP allows negative scaling factors, and scaling factors greater than one. A weighting-factor is applied pixel-by-pixel using a coded label field, for efficient compression of covered and uncovered regions. A key difference of H.264's WP tool from previous proposals involving weighted prediction for compression efficiency is the association of the reference picture index with the weighting factor parameters, which allows for efficient signaling of these parameters in a multiple reference picture environment. As written in paper R. Zhang and G. Cote "accurate parameter estimation and efficient fade detection for weighted prediction in H.264 video compression", 15th IEEE International Conference on Image Processing, October 2008, San Diego, California, US, pp. 2836-2839, the procedure of applying WP in a real-time encoding system can be formalized as a sequence of operations shown in FIG. 6. First, some statistics 611 are generated through video analysis 610. The statistics 611 within a small window, from several previous pictures till the current picture, are then used to detect fade. Each picture is assigned a state value 631 indicating if the picture is in the state of NORMAL or in the state of FADE. Such state values are saved for each picture. When encoding a picture, if there is a FADE state in either the current picture or one of its reference pictures, the WP will be used for this current-reference pair, and statistics of current picture and the corresponding reference picture are processed at operation 650 to estimate the WP parameters. These parameters are then passed on to the encoding engine 660. Otherwise, the normal encoding is done.

As mentioned in paper A. Leontaris and A. M. Tourapis "Weighted prediction methods for improved motion compensation", 16th IEEE International Conference on Image Processing (ICIP), November 2009, Cairo, Egypt, pp. 1029-1032, a macroblock in H.264 is divided into macroblock partitions. For each macroblock partition, a reference is selected from each one of the available reference lists (frequently denoted in specifications as RefPicList), list 0 for P or B-coded slices or reference list 1 for B-coded slices. The references used may be different for each partition. Using these references a prediction block is generated for each list, i.e. P for single list prediction and $P_O$ and $P_1$ for bi-prediction, using motion information with, optionally, subpixel precision. The prediction blocks may be further processed depending on the availability of weighted prediction for the current slice. For P slices, the WP parameters are transmitted at the slice header. For B slices, there are two options. In the explicit WP, the parameters are transmitted in the slice header, and in the implicit WP the parameters are derived based on the Picture Order Count (POC) number that is signaled in the slice header. In this paper we will only focus on explicit WP and how this method could be used to improve motion compensation performance. Note that in HEVC and VVC, PB is used similarly to macroblock partition in AVC.

For P slices or single-list explicit WP in B slices, the prediction block is drawn from a single reference. Let p denote a sample value in prediction block P. If weighted prediction is not used, then the final inter prediction sample is f=p. Otherwise the predicted sample is:

$$f = \begin{cases} \left( \left( p \times w_x + 2^{logWD-1} \right) >> logWD \right) + o_x, & logWD \geq 1 \\ \left( p \times w_x + o_x \right), & \text{otherwise} \end{cases}$$

Terms $w_x$ and $o_x$ are the WP gain and offset parameters for reference list x. Term log WD is transmitted in the bit stream and controls the mathematical precision of the weighted prediction process. For log WD$\geq$1, the expression above rounds away from zero. Similarly, for bi-prediction, two prediction blocks, one for each reference list, are considered. Let $p_0$ and $p_1$ denote samples in each of the two prediction blocks $P_0$ and $P_1$. If weighted prediction is not used, prediction is performed as:

$$f = (p_0 + p_1 + 1) >> 1$$

For weighted bi-prediction, prediction is performed as:

$$f = \left( \left( p_0 \times w_0 + p_1 \times w_1 + 2^{logWD} \right) >> (logWD + 1) \right) + ((o_0 + o_1 + 1) >> 1)$$

It is worth noting weighted prediction can compensate for illumination changes, such as a fade-in, fade-out, or a cross-fade.

On high level in VVC, weighted prediction is signaled in Sequence Parameter Set (SPS), Picture Parameter Set (PPS) and slice header. In SPS, the following syntax elements are used for that:

sps_weighted_pred_flag equal to 1 specifies that weighted prediction may be applied to P slices referring to the SPS. sps_weighted_pred_flag equal to 0 specifies that weighted prediction is not applied to P slices referring to the SPS;

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.

In PPS, the following syntax elements are used for that:

pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0;

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

In slice header, weighted prediction parameters are signaled as pred_weight_table( ) structured as in Table 1 and containing the following elements:

luma_log2_weight_denom is the base 2 logarithm of the denominator for all luma weighting factors. The value of luma_log2_weight_denom shall be in the range of 0 to 7, inclusive.

delta_chroma_log2_weight_denom is the difference of the base 2 logarithm of the denominator for all chroma weighting factors. When delta_chroma_log2_ weight_ denom is not present, it is inferred to be equal to 0.

The variable ChromaLog2WeightDenom is derived to be equal to luma_log2_weight_denom+delta_chroma_ log2_weight_denom and the value shall be in the range of 0 to 7, inclusive.

luma_weight_l0_flag[i] equal to 1 specifies that weighting factors for the luma component of list 0 prediction using RefPicList[0][i] are present. luma_weight_l0_flag[i] equal to 0 specifies that these weighting factors are not present.

chroma_weight_l0_flag[i] equal to 1 specifies that weighting factors for the chroma prediction values of list 0 prediction using RefPicList[0][i] are present. chroma_weight_l0_flag[i] equal to 0 specifies that these weighting factors are not present. When chroma_weight_l0_flag[i] is not present, it is inferred to be equal to 0.

delta_luma_weight_l0[i] is the difference of the weighting factor applied to the luma prediction value for list 0 prediction using RefPicList[0][i].

The variable LumaWeightL0[i] is derived to be equal to (1<<luma_log2_weight_denom)+delta_luma_weight_l0[i]. When luma_weight_l0_flag[i] is equal to 1, the value of delta_luma_weight_l0[i] shall be in the range of −128 to 127, inclusive. When luma_weight_l0_flag[i] is equal to 0, LumaWeightL0[i] is inferred to be equal to $2^{luma\_log2\_weight\_denom}$.

luma_offset_l0[i] is the additive offset applied to the luma prediction value for list 0 prediction using RefPicList[0][i]. The value of luma_offset_l0[i] shall be in the range of −128 to 127, inclusive. When luma_weight_l0_flag[i] is equal to 0, luma_offset_l0[i] is inferred to be equal to 0.

delta_chroma_weight_l0[i][j] is the difference of the weighting factor applied to the chroma prediction values for list 0 prediction using RefPicList[0][i] with j equal to 0 for Cb and j equal to 1 for Cr.

The variable ChromaWeightL0[i][j] is derived to be equal to (1<<ChromaLog2WeightDenom)+delta_chroma_ weight_l0[i][j]. When chroma_weight_l0_flag[i] is equal to 1, the value of delta_chroma_weight_l0[i][j] shall be in the range of −128 to 127, inclusive. When chroma_weight_l0_flag[i] is equal to 0, ChromaWeightL0 [i][j] is inferred to be equal to $2^{ChromaLog2WeightDenom}$.

delta_chroma_offset_l0[i][j] is the difference of the additive offset applied to the chroma prediction values for list 0 prediction using RefPicList[0][i] with j equal to 0 for Cb and j equal to 1 for Cr.

The variable ChromaOffsetL0[i][j] is derived as follows:

$$ChromaOffsetL0[i][j] =$$

$$Clip3(-128, 127, (128 + delta\_chroma\_offset\_10[i][j] -$$

$$((128 * ChromaWeightL0[i][j]) >> ChromaLog2WeightDenom)))$$

The value of delta_chroma_offset_l0[i][j] shall be in the range of −4*128 to 4*127, inclusive. When chroma_weight_l0_flag[i] is equal to 0, ChromaOffsetL0[i][j] is inferred to be equal to 0.

luma_weight_l1_flag[i], chroma_weight_l1_flag[i], delta_luma_weight_l1[i], luma_offset_l1[i], delta_chroma_weight_l1[i][j] and delta_chroma_offset_l1[i][j] have the same semantics as luma_weight_l0_flag[i], chroma_weight_l0_flag[i], delta_luma_weight_l0[i], luma_offset_l0[i], delta_chroma_weight_l0[i][j] and delta_chroma_offset_l0[i][j], respectively, with l0, L0, list 0 and List0 replaced by l1, L1, list 1 and List1, respectively.

The variable sumWeightL0Flags is derived to be equal to the sum of luma_weight_l0_flag[i]+2*chroma_weight_l0_flag[i], for i=0 . . . NumRefIdxActive[0]−1.

When slice_type is equal to B, the variable sumWeightL1Flags is derived to be equal to the sum of luma_weight_l1_flag[i]+2*chroma_weight_l1_flag[i], for i=0 . . . NumRefIdxActive[1]−1.

It is a requirement of bitstream conformance that, when slice_type is equal to P, sumWeightL0Flags shall be less than or equal to 24 and when slice_type is equal to B, the sum of sumWeightL0Flags and sumWeightL1Flags shall be less than or equal to 24.

TABLE 1

Weighted prediction parameters syntax

|  | Descriptor |
| --- | --- |
| pred_weight_table( ) { |  |
| luma_log2_weight_denom | ue(v) |
| if( ChromaArrayType != 0 ) |  |
| delta_chroma_log2_weight_denom | se(v) |
| for( i = 0; i < NumRefIdxActive[ 0 ]; i++ ) |  |
| luma_weight_l0_flag[ i ] | u(1) |
| if( ChromaArrayType != 0 ) |  |
| for( i = 0; i < NumRefIdxActive[ 0 ]; i++ ) |  |
| chroma_weight_l0_flag[ i ] | u(1) |

TABLE 1-continued

Weighted prediction parameters syntax

|  | Descriptor |
| --- | --- |
| for( i = 0; i < NumRefIdxActive[ 0 ]; i++ ) { |  |
| if( luma_weight_l0_flag[ i ] ) { |  |
| delta_luma_weight_l0[ i ] | se(v) |
| luma_offset_l0[ i ] | se(v) |
| } |  |
| if( chroma_weight_l0_flag[ i ] ) |  |
| for( j = 0; j < 2; j++ ) { |  |
| delta_chroma_weight_l0[ i ][ j ] | se(v) |
| delta_chroma_offset_l0[ i ][ j ] | se(v) |
| } |  |
| } |  |
| if( slice_type == B ) { |  |
| for( i = 0; i < NumRefIdxActive[ 1 ]; i++ ) |  |
| luma_weight_l1_flag[ i ] | u(1) |
| if( ChromaArrayType != 0 ) |  |
| for( i = 0; i < NumRefIdxActive[ 1 ]; i++ ) |  |
| chroma_weight_l1_flag[ i ] | u(1) |
| for( i = 0; i < NumRefIdxActive[ 1 ]; i++ ) { |  |
| if( luma_weight_l1_flag[ i ] ) { |  |
| delta_luma_weight_l1[ i ] | se(v) |
| luma_offset_l1[ i ] | se(v) |
| } |  |
| if( chroma_weight_l1_flag[ i ] ) |  |
| for( j = 0; j < 2; j++ ) { |  |
| delta_chroma_weight_l1[ i ][ j ] | se(v) |
| delta_chroma_offset_l1[ i ][ j ] | se(v) |
| } |  |
| } |  |
| } |  |
| } |  |

In contribution JVET-O0244 (V. Seregin et al "AHG17: On zero delta POC in reference picture structure," 15th JVET meeting, Gothenburg, Sweden), it was pointed out that in the current VVC specification draft, reference pictures are signaled in the reference picture structure (RPS), where abs_delta_poc_st represents the delta POC value, which can be equal to 0. RPS can be signalled in SPS and slice header. This functionality is needed to signal different weights for the same reference picture, and potentially is needed if layered scalability is supported with the same POC values used across layers in access unit. Therein, it is stated that the repeating reference pictures are not needed when weighted prediction is not enabled. Among others, in this contribution, it is proposed to disallow zero delta POC values when weighted prediction is not enabled.

TABLE 2

Sequence parameter set RBSP (Raw Byte Sequence Payload) syntax

|  | Descriptor |
| --- | --- |
| seq_parameter_set_rbsp( ) { |  |
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) |  |
| gdr_enabled_flag | u(1) |
| sps_seq_parameter_set_id | ue(v) |
| chroma_format_idc | ue(v) |
| if( chroma_format_idc == 3 ) |  |
| separate_colour_plane_flag | u(1) |
| pic_width_max_in_luma_samples | ue(v) |
| pic_height_max_in_luma_samples | ue(v) |
| subpics_present_flag | u(1) |

TABLE 2-continued

| Sequence parameter set RBSP (Raw Byte Sequence Payload) syntax | |
|---|---|
| | Descriptor |
| if( subpics_present_flag ) { | |
|   max_subpics_minus1 | u(8) |
|   subpic_grid_col_width_minus1 | u(v) |
|   subpic_grid_row_height_minus1 | u(v) |
|   for( i = 0; i < NumSubPicGridRows; i++ ) | |
|     for( j = 0; j < NumSubPicGridCols; j++ ) | |
|       subpic_grid_idx[ i ][ j ] | u(v) |
|   for( i = 0; i  <=  NumSubPics; i++ ) { | |
|     subpic_treated_as_pic_flag[ i ] | u(1) |
|     loop_filter_across_subpic_enabled_flag[ i ] | u(1) |
|   } | |
| } | |
| bit_depth_luma_minus8 | ue(v) |
| bit_depth_chroma_minus8 | ue(v) |
| min_qp_prime_ts_minus4 | ue(v) |
| log2_max_pic_order_cnt_lsb_minus4 | ue(v) |
| if( sps_max_sublayers_minus1 > 0 ) | |
|   sps_sublayer_ordering_info_present_flag | u(1) |
| for( i = ( sps_sub_layer_ordering_info_present_flag ? 0 : | |
| sps_max_sub_layers_minus1 ); | |
|     i <= sps_max_sub_layers_minus1; i++ ) { | |
|   sps_max_dec_pic_buffering_minus1[ i ] | ue(v) |
|   sps_max_num_reorder_pics[ i ] | ue(v) |
|   sps_max_latency_increase_plus1[ i ] | ue(v) |
| } | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_ctu_size_minus5 | u(2) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma  !=  0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slices  !=  0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma  !=  0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   same_qp_table_for_chroma | u(1) |
|   for( i = 0; i < same_qp_table_for_chroma ? 1 : 3; i++ ) { | |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_out_val[ i ][ j ] | ue(v) |
|     } | |
|   } | |
| } | |
| sps_weighted_pred_flag | u(1) |
| sps_weighted_bipred_flag | u(1) |
| sps_sao_enabled_flag | u(1) |
| sps_alf_enabled_flag | u(1) |
| sps_transform_skip_enabled_flag | u(1) |

TABLE 2-continued

Sequence parameter set RBSP (Raw Byte Sequence Payload) syntax

|  | Descriptor |
|---|---|
| if( sps_transform_skip_enabled_flag ) | |
|   sps_bdpcm_enabled_flag | u(1) |
| sps_joint_cbcr_enabled_flag | u(1) |
| sps_ref_wraparound_enabled_flag | u(1) |
| if( sps_ref_wraparound_enabled_flag ) | |
|   sps_ref_wraparound_offset_minus1 | ue(v) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_smvd_enabled_flag | u(1) |
| sps_dmvr_enabled_flag | u(1) |
| if( sps_bdof_enabled_flag \|\| sps_dmvr_enabled_flag) | |
|   sps_bdof_dmvr_slice_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
|   if( sps_cclm_enabled_flag && chroma_format_idc = = 1 ) | |
|   sps_cclm_colocated_chroma_flag | u(1) |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| if( sps_sbt_enabled_flag ) | |
|   sps_sbt_max_size_64_flag | u(1) |
| sps_affine_enabled_flag | u(1) |
| if( sps_affine_enabled_flag ) { | |
|   sps_affine_type_flag | u(1) |
|   sps_affine_amvr_enabled_flag | u(1) |
|   sps_affine_prof_enabled_flag | u(1) |
| } | |
| if( chroma_format_idc = = 3 ) | |
|   sps_palette_enabled_flag | u(1) |
| sps_bcw_enabled_flag | u(1) |
| sps_ibc_enabled_flag | u(1) |
| sps_ciip_enabled_flag | u(1) |
| if( sps_mmvd_enabled_flag ) | |
|   sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if ( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| sps_scaling_list_enabled_flag | u(1) |
| hrd_parameters_present_flag | u(1) |
| if( general_hrd_parameters_present_flag ) { | |
|   num_units_in_tick | u(32) |
|   time_scale | u(32) |
|   sub_layer_cpb_parameters_present_flag | u(1) |
|   if( sub_layer_cpb_parameters_present_flag ) | |
|     general_hrd_parameters( 0, sps_max_sub_layers_minus1 ) | |
|   else | |
|   general_hrd_parameters( sps_max_sub_layers_minus1, sps_max_sub_layers_minus1 ) | |
| } | |
| vui_parameters_present_flag | u(1) |
| if( vui_parameters_present_flag ) | |
|   vui_parameters( ) | |
| sps_extension_flag | u(1) |

TABLE 2-continued

| Sequence parameter set RBSP (Raw Byte Sequence Payload) syntax | |
| --- | --- |
| | Descriptor |
| if( sps_extension_flag ) | |
|    while( more_rbsp_data( ) ) | |
|       sps_extension_data_flag | u(1) |
|   rbsp_trailing_bits( ) | |
| } | |

TABLE 3

| Reference picture list structure syntax | |
| --- | --- |
| | Descriptor |
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, j = 0; i < num_ref_entries[ listIdx ][rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pics_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_slice_header_flag[ listIdx ][ rplsIdx ] ) | |
|         rpls_poc_lsb_lt[ listIdx ][ rplsIdx ][ j++ ] | u(v) |
|     } else | |
|       ilrp_idc[ listIdx ][ rplsIdx ][ i ] | ue(v) |
|   } | |
| } | |

The ref_pic_list_struct(listIdx, rplsIdx) syntax structure may be present in an SPS or in a slice header. Depending on whether the syntax structure is included in a slice header or an SPS, the following applies:

If present in a slice header, the ref_pic_list_struct(listIdx, rplsIdx) syntax structure specifies reference picture list listIdx of the current picture (the picture containing the slice).

Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that: (1) has one or more slices containing ref_pic_list_idx [listIdx] equal to an index into the list of the ref_pic_list_struct(listIdx, rplsIdx) syntax structures included in the SPS, and (2) is in a CVS that refers to the SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to sps_max_dec_pic_buffering_minus1+14, inclusive.

ltrp_in_slice_header_flag[listIdx][rplsIdx] equal to 0 specifies that the POC LSBs of the LTRP entries in the ref_pic_list_struct(listIdx, rplsIdx) syntax structure are present in the ref_pic_list_struct(listIdx, rplsIdx) syntax structure.

ltrp_in_slice_header_flag[listIdx][rplsIdx] equal to 1 specifies that the POC LSBs of the LTRP entries in the ref_pic_list_struct(listIdx, rplsIdx) syntax structure are not present in the ref_pic_list_struct(listIdx, rplsIdx) syntax structure.

inter_layer_ref_pic_flag[listIdx][rplsIdx][i] equal to 1 specifies that the i-th entry in the ref_pic_list_struct(listIdx, rplsIdx) syntax structure is an ILRP entry.

inter_layer_ref_pic_flag[listIdx][rplsIdx][i] equal to 0 specifies that the i-th entry in the ref_pic_list_struct(listIdx, rplsIdx) syntax structure is not an ILRP entry. When not present, the value of inter_layer_ref_pic_flag[listIdx][rplsIdx][i] is inferred to be equal to 0.

st_ref_pic_flag[listIdx][rplsIdx][i] equal to 1 specifies that the i-th entry in the ref_pic_list_struct(listIdx, rplsIdx) syntax structure is an STRP entry. st_ref_pic_flag[listIdx] [rplsIdx][i] equal to 0 specifies that the i-th entry in the ref_pic_list_struct(listIdx, rplsIdx) syntax structure is an LTRP entry. When inter_layer_ref_pic_flag[listIdx][rplsIdx] [i] is equal to 0 and st_ref_pic_flag[listIdx][rplsIdx][i] is not present, the value of st_ref_pic_flag[listIdx][rplsIdx][i] is inferred to be equal to 1.

The variable NumLtrpEntries[listIdx][rplsIdx] is derived as follows:

for(i=0, NumLtrpEntries[listIdx][rplsIdx]=0; i<num_ref_entries[listIdx][rplsIdx]; i++)
    if(!inter_layer_ref_pic_flag[listIdx][rplsIdx][i] &&!st_ref_pic_flag[listIdx][rpl sIdx][i])
      NumLtrpEntries[listIdx][rplsIdx]++abs_delta_poc_st[listIdx][rplsIdx][i] specifies the value of the variable AbsDeltaPocSt[listIdx][rplsIdx][i] as follows:

if(sps_weighted_pred_flag||sps_weighted_bipred_flag)
  AbsDeltaPocSt[listIdx][rplsIdx][i]=abs_delta_poc_st [listIdx][rplsIdx][i]
else
  AbsDeltaPocSt[listIdx][rplsIdx][i]=abs_delta_poc_st [listIdx][rplsIdx][i]+1

The value of abs_dZelta_poc_st[listIdx][rplsIdx][i] shall be in the range of 0 to 215−1, inclusive.

strp_entry_sign_flag[listIdx][rplsIdx][i] equal to 1 specifies that i-th entry in the syntax structure ref_pic_list_struct (listIdx, rplsIdx) has a value greater than or equal to 0. strp_entry_sign_flag[listIdx][rplsIdx][i] equal to 0 specifies that the i-th entry in the syntax structure ref_pic_list_struct (listIdx, rplsIdx) has a value less than 0. When not present, the value of strp_entry_sign_flag[listIdx][rplsIdx][i] is inferred to be equal to 1.

The list DeltaPocValSt[listIdx][rplsIdx] is derived as follows:

for(i=0; i<num_ref_entries[listIdx][rplsIdx]; i++)
    if(
  !inter_layer_ref_pic_flag[listIdx][rplsIdx][i] && st_ref_pic_flag[listIdx][rplsIdx][i])
    DeltaPocValSt[listIdx][rplsIdx][i]=(
  strp_entry_sign_flag[listIdx][rplsIdx][i])?
    AbsDeltaPocSt[listIdx][rplsIdx][i]: 0−
  AbsDeltaPocSt[listIdx][rplsIdx][i]

rpls_poc_lsb_lt[listIdx][rplsIdx][i] specifies the value of the picture order count modulo MaxPicOrderCntLsb of the picture referred to by the i-th entry in the ref_pic_list_struct (listIdx, rplsIdx) syntax structure. The length of the rpls_poc_lsb_lt[listIdx][rplsIdx][i] syntax element is log2_max_pic_order_cnt_lsb_minus4+4 bits. ilrp_idc[listIdx][rplsIdx][i] specifies the index, to the list of directly dependent layers, of the ILRP of i-th entry in ref_pic_list_struct(listIdx, rplsIdx) syntax structure to the list of directly dependent layers. The value of ilrp_idc[listIdx][rplsIdx][i] shall be in the range of 0 to the GeneralLayerIdx[nuh_layer_id]−1, inclusive.

In Table 2, weighted prediction parameters are signaled after reference picture list signaling. In Table 4, these syntax elements are reordered to restrict binarization of delta POC syntax element based on the values of the weighted prediction flags.

TABLE 4

| Modified syntax of sequence parameter set RBSP | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sublayers_minus1 ) | |
|   gdr_enabled_flag | u(1) |
|   sps_seq_parameter_set_id | ue(v) |
|   chroma_format_idc | ue(v) |
|   if( chroma_format_idc  = =  3 ) | |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i  <=  NumSubPics; i++ ) { | |
|       subpic_treated_as_pic_flag[ i ] | u(1) |
|       loop_filter_across_subpic_enabled_flag[ i ] | u(1) |
|     } | |
|   } | |
|   bit_depth_luma_minus8 | ue(v) |
|   bit_depth_chroma_minus8 | ue(v) |
|   min_qp_prime_ts_minus4 | ue(v) |
|   sps_weighted_pred_flag | u(1) |
|   sps_weighted_bipred_flag | u(1) |
|   log2_max_pic_order_cnt_lsb_minus4 | ue(v) |
|   if( sps_max_sub_layers_minus1 > 0 ) | |
|     sps_sub_layer_ordering_info_present_flag | u(1) |
|   for( i = ( sps_sub_layer_ordering_info_present_flag ? 0 : | |
|   sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   inter_layer_ref_pics_present_flag | u(1) |
|   sps_idr_rpl_present_flag | u(1) |
|   ... | |
|   rpl1_same_as_rpl0_flag | u(1) |

TABLE 4-continued

| Modified syntax of sequence parameter set RBSP | Descriptor |
|---|---|
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
| ... | |

And the value of delta POC (the variable AbsDeltaPocSt) is conditionally restored at the decoder side as follows:

abs_delta_poc_st[listIdx][rplsIdx][i] specifies the value of the variable AbsDeltaPocSt[listIdx][rplsIdx][i] as follows:

if(sps_weighted_pred_flag||sps_weighted_bipred_flag)

AbsDeltaPocSt[listIdx][rplsIdx][i]=abs_delta_poc_st [listIdx][rplsIdx][i]

else

AbsDeltaPocSt[listIdx][rplsIdx][i]=abs_delta_poc_st [listIdx][rplsIdx][i]+1

Triangular partitioning mode (TPM) and geometric motion partitioning (GEO) also known as triangular merge mode and geometric merge mode, respectively, are partitioning techniques that enable non-horizontal and non-vertical boundaries between prediction partitions, where prediction unit PU1 and prediction unit PU2 are combined in a region using a weighted averaging procedure of subsets of their samples related to different color components. TMP enables boundaries between prediction partitions only along a rectangular block diagonals, whereas boundaries according to GEO may be located at arbitrary positions. In the region that a weighted averaging procedure is applied to, integer numbers within squares denote weights $W_{PU1}$ applied to luma component of prediction unit PU1. In an example, weights $W_{PU2}$ applied to luma component of prediction unit PU2 are calculated as follows:

$$W_{PU2} = 8 - W_{PU1}.$$

Weights applied to chroma components of corresponding prediction units may differ from weights applied to luma components of corresponding prediction units.

The details on the syntax for TPM are presented in Table 5, where 4 syntax elements are used to signal information on TPM:

MergeTriangleFlag is a flag that identifies whether TPM is selected or not ("0" means that TPM is not selected; otherwise, TPM is chosen);

merge_triangle_split_dir is a split direction flag for TPM ("0" means the split direction from top-left corner to the below-right corner; otherwise. the split direction is from top-right corner to the below-left corner);

merge_triangle_idx0 and merge_triangle_idx1 are indices of merge candidates 0 and 1 used for TPM.

TABLE 5

| Merge data syntax including syntax for TPM | |
| --- | --- |
| | Descriptor |
| merge_data( x0, y0, cbWidth, cbHeight ) { | |
|   if ( CuPredMode[ x0 ][ y0 ]  = =  MODE_IBC ) { | |
|     if( MaxNumMergeCand > 1 ) | |
|       merge_idx[ x0 ][ y0 ] | ae(v) |
|   } else { | |
|     if( sps_mmvd_enabled_flag  \|\|  cbWidth * cbHeight != 32 ) | |
|       regular_merge_flag[ x0 ][ y0 ] | ae(v) |
|     if ( regular_merge_flag[ x0 ][ y0 ] = = 1 ){ | |
|       if( MaxNumMergeCand > 1 ) | |
|         merge_idx[ x0 ][ y0 ] | ae(v) |
|     } else { | |
|       if( sps_mmvd_enabled_flag  &&  cbWidth * cbHeight != 32 ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ]  = =  1 ) { | |
|         if( MaxNumSubblockMergeCand > 1 ) | |
|           merge_subblock_idx[ x0 ][ y0 ] | ae(v) |
|         } else { | |
|           if( sps_ciip_enabled_flag && cu_skip_flag[ x0 ][ y0 ] = = 0 && ( cbWidth * cbHeight ) >= 64 && cbWidth < 128 && cbHeight < 128 ) { | |
|             ciip_flag[ x0 ][ y0 ] | ae(v) |
|             if( ciip_flag[ x0 ][ y0 ]  && MaxNumMergeCand > 1 ) | |
|               merge_idx[ x0 ][ y0 ] | ae(v) |
|           } | |
|           if( MergeTriangleFlag[ x0 ][ y0 ] ) { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } | |
|   } | |
| } | |

In more detail, TPM is described in the following proposal: R-L. Liao and C. S. Lim "CE10.3.1.b: Triangular prediction unit mode," contribution JVET-L0124 to the 12th JVET meeting, Macao, China, October 2018. GEO is explained in the following paper: S. Esenlik, H. Gao, A. Filippov, V. Rufitskiy, A. M. Kotra, B. Wang, E. Alshina, M. Bläser, and J. Sauer, "Non-CE4: Geometrical partitioning for inter blocks," contribution JVET-O0489 to the 15th JVET meeting, Gothenburg, Sweden, July 2019.

The disclosed way to harmonize TPM and/or GEO with WP is to disable them when WP is applied. The 1$^{st}$ embodiment is shown in Table 6, it can be done by checking whether the value of the weightedPredFlag variable is equal to 0 for a coding unit.

The variable weightedPredFlag is derived as follows:

If slice_type is equal to P, weightedPredFlag is set equal to pps_weighted_pred_flag.

Otherwise (slice_type is equal to B), weightedPredFlag is set equal pps_weighted_bipred_flag.

Slice-level weighted prediction process could be switched at picture and slice levels using pps_weighted_pred_flag and sps_weighted_pred_flag syntax elements, respectively.

As disclosed above, the variable weightedPredFlag indicates whether slice-level weighted prediction should be used when obtaining inter predicted samples of the slice.

TABLE 6

| The disclosed merge data syntax to harmonize TPM with WP | |
|---|---|
| | Descriptor |
| merge_data( x0, y0, cbWidth, cbHeight, chType ) { | |
|   if ( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight | |
| >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( ( sps_ciip_enabled_flag && | |
|         cu_skip_flag[ x0 ][ y0 ] = = 0 && cbWidth <128 && cbHeight | |
| < 128 ) \| \| | |
|         ( sps_triangle_enabled_flag && MaxNumTriangleMergeCand > 1 | |
| && | |
|         slice_type = = B ) ) ) | |
|       regular_merge_flag[ x0 ][ y0 ] | ae(v) |
|     if ( regular_merge_flag[ x0 ][ y0 ] = = 1 ) { | |
|       if( sps_mmvd_enabled_flag ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumMergeCand > 1 ) | |
|           merge_idx[ x0 ][ y0 ] | ae(v) |
|       } | |
|     } else { | |
|       if( sps_ciip_enabled_flag && sps_triangle_enabled_flag && | |
|         MaxNumTriangleMergeCand > 1 && weightedPredFlag = = 0 && | |
|         slice_type = = B && cu_skip_flag[ x0 ][ y0 ] = = 0 && | |
|         ( cbWidth * cbHeight) >= 64 && cbWidth <128 && cbHeight | |
| < 128 ) { | |
|         ciip_flag[ x0 ][ y0 ] | ae(v) |
|         if( ciip_flag[ x0 ][ y0 ] && MaxNumMergeCand > 1 ) | |
|         merge_idx[ x0 ][ y0 ] | ae(v) |
|         if( !ciip_flag[ x0 ][ y0 ] && MaxNumTriangleMergeCand > 1 ) { | |
|         merge_triangle_split_dir[ x0 ][ y0 ] | ae(v) |
|         merge_triangle_idx0[ x0 ][ y0 ] | ae(v) |
|         merge_triangle_idx1[ x0 ][ y0 ] | ae(v) |
|         } | |
|       } | |
|     } | |
|   } | |
| } | | ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred as follows:

If all the following conditions are true, ciip_flag[x0][y0] is inferred to be equal to 1:

sps_ciip_enabled_flag is equal to 1.

general_merge_flag[x0][y0] is equal to 1.

merge_subblock_flag[x0][y0] is equal to 0.

regular_merge_flag[x0][y0] is equal to 0.

cbWidth is less than 128.

cbHeight is less than 128.

cbWidth*cbHeight is greater than or equal to 64.

Otherwise, ciip_flag[x0][y0] is inferred to be equal to 0.

When ciip_flag[x0][y0] is equal to 1, the variable IntraPredModeY[x][y] with x=x0 . . . x0+cbWidth−1 and y=y0 . . . y0+cbHeight−1 is set to be equal to INTRA_PLA-NAR.

The variable MergeTriangleFlag [x0][y0], which specifies whether triangular shape based motion compensation is used to generate the prediction samples of the current coding unit, when decoding a B slice, is derived as follows:

If all the following conditions are true, MergeTriangleFlag [x0][y0] is set equal to 1:

sps_triangle_enabled_flag is equal to 1.

slice_type is equal to B.

general_merge_flag[x0][y0] is equal to 1.

MaxNumTriangleMergeCand is greater than or equal to 2.

cbWidth*cbHeight is greater than or equal to 64.

regular_merge_flag[x0][y0] is equal to 0.

merge_subblock_flag[x0][y0] is equal to 0.

ciip_flag[x0][y0] is equal to 0.

weightedPredFlag is equal to 0.

Otherwise, MergeTriangleFlag [x0][y0] is set equal to 0.

The $2^{nd}$ embodiment is presented in Table 7. If weightedPredFlag is equal to 1, the syntax element max_num_merge_cand_minus_max_num_triangle_cand is not present and inferred with such a value that MaxNumTriangleMergeCand becomes less than 2.

TABLE 7

| The disclosed general slice header syntax to harmonize TPM with WP | |
| --- | --- |
| | Descriptor |
| slice_header( ) { | |
|   slice_pic_parameter_set_id | ue(v) |
|   if( rect_slice_flag  \|\|  NumBricksInPic > 1 ) | |
|     slice_address | u(v) |
|   if( !rect_slice_flag  &&  !single_brick_per_slice_flag ) | |
|     num_bricks_in_slice_minus1 | ue(v) |
|   non_reference_picture_flag | u(1) |
|   slice_type | ue(v) |
|   if( separate_colour_plane_flag = = 1 ) | |
|     colour_plane_id | u(2) |
|   slice_pic_order_cnt_lsb | u(v) |
|   if( nal_unit_type  = =  GDR_NUT ) | |
|     recovery_poc_cnt | ue(v) |
|   if( nal_unit_type = = IDR_W_RADL \|\| nal_unit_type = = IDR_N_LP \|\| | |
|     nal_unit_type = = CRA_NUT \|\| NalUnitType = = GDR_NUT ) | |
|     no_output_of_prior_pics_flag | u(1) |
|   if( output_flag_present_flag ) | |
|     pic_output_flag | u(1) |
|   if( ( nal_unit_type != IDR_W_RADL && nal_unit_type != IDR_N_LP ) \|\| | |
|      sps_idr_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 \|\| ( i = = 1 && rpl1_idx_present_flag ) ) ) | |
|         ref_pic_list_sps_flag[ i ] | u(1) |
|       if( ref_pic_list_sps_flag[ i ] ) { | |
|         if( num_ref_pic_lists_in_sps[ i ] > 1  && | |
|           ( i = = 0 \|\| ( i = = 1 && rpl1_idx_present_flag ) ) ) | |
|           ref_pic_list_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           slice_poc_lsb_lt[ i ][ j ] | u(v) |
|         delta_poc_msb_present_flag[ i ][ j ] | u(1) |
|         if( delta_poc_msb_present_flag[ i ][ j ] ) | |
|           delta_poc_msb_cycle_lt[ i ][ j ] | ue(v) |
|       } | |
|     } | |
|     if( ( slice_type != I && num_ref_entries[ 0 ][ RplsIdx[ 0 ] ] > 1 ) \|\| | |
|      ( slice_type = = B && num_ref_entries[ 1 ][ RplsIdx[ 1 ] ] > 1 ) | |
|     ) { | |
|       num_ref_idx_active_override_flag | u(1) |
|       if( num_ref_idx_active_override_flag ) | |
|         for( i = 0; i < ( slice_type  = =  B ? 2: 1 ); i++ ) | |
|           if( num_ref_entries[ i ][ RplsIdx[ i ] ] > 1 ) | |
|             num_ref_idx_active_minus1[ i ] | ue(v) |
|     } | |
|   } | |
|   if( partition_constraints_override_enabled_flag ) { | |
|     partition_constraints_override_flag | ue(v) |
|     if( partition_constraints_override_flag ) { | |
|       slice_log2_diff_min_qt_min_cb_luma | ue(v) |
|       slice_max_mtt_hierarchy_depth_luma | ue(v) |
|       if( slice_max_mtt_hierarchy_depth_luma != 0 ) | |
|         slice_log2_diff_max_bt_min_qt_luma | ue(v) |
|         slice_log2_diff_max_tt_min_qt_luma | ue(v) |
|     } | |

TABLE 7-continued

| The disclosed general slice header syntax to harmonize TPM with WP | |
|---|---|
| | Descriptor |
| if( slice_type = = I   &&   qtbtt_dual_tree_intra_flag ) { | |
| slice_log2_diff_min_qt_min_cb_chroma | ue(v) |
| slice_max_mtt_hierarchy_depth_chroma | ue(v) |
| if( slice_max_mtt_hierarchy_depth_chroma != 0 ) | |
| slice_log2_diff_max_bt_min_qt_chroma | ue(v) |
| slice_log2_diff_max_tt_min_qt_chroma | ue(v) |
| } | |
| } | |
| } | |
| } | |
| if ( slice_type   != I ) { | |
| if( sps_temporal_mvp_enabled_flag && | |
| !pps_temporal_mvp_enabled_idc ) | |
| slice_temporal_mvp_enabled_flag | u(1) |
| if( slice_type   = =   B   && !pps_mvd_l1_zero_idc ) | |
| mvd_l1_zero_flag | u(1) |
| if( cabac_init_present_flag ) | |
| cabac_init_flag | u(1) |
| if( slice_temporal_mvp_enabled_flag ) { | |
| if( slice_type   = =   B   && !pps_collocated_from_l0_idc ) | |
| collocated_from_l0_flag | u(1) |
| if( ( collocated_from_l0_flag && NumRefIdxActive[ 0 ] > 1 ) \| \| | |
| ( !collocated_from_l0_flag && NumRefIdxActive[ 1 ] > 1 ) ) | |
| collocated_ref_idx | ue(v) |
| } | |
| if( ( pps_weighted_pred_flag && slice_type = = P ) \| \| | |
| ( pps_weighted_bipred_flag && slice_type = = B ) ) | |
| pred_weight_table( ) | |
| if( !pps_six_minus_max_num_merge_cand_plus1 ) | |
| six_minus_max_num_merge_cand | ue(v) |
| if( sps_affine_enabled_flag && | |
| !pps_five_minus_max_num_subblock_merge_cand_plus1 ) | |
| five_minus_max_num_subblock_merge_cand | ue(v) |
| if( sps_fpel_mmvd_enabled_flag ) | |
| slice_fpel_mmvd_enabled_flag | u(1) |
| if( sps_bdof_dmvr_slice_present_flag ) | |
| slice_disable_bdof_dmvr_flag | u(1) |
| if( sps_triangle_enabled_flag && MaxNumMergeCand   >=   2   && | |
| slice_type = = B && !weightedPredFlag && | |
| !pps_max_num_merge_cand_minus_max_num_triangle_cand_minus1 ) { | |
| max_num_merge_cand_minus_max_num_triangle_cand | ue(v) |
| } | |
| } | |
| if ( sps_ibc_enabled_flag ) | |
| slice_six_minus_max_num_ibc_merge_cand | ue(v) |
| if( sps_joint_cbcr_enabled_flag ) | |
| slice_joint_cbcr_sign_flag | u(1) |
| slice_qp_delta | se(v) |
| if( pps_slice_chroma_qp_offsets_present_flag ) { | |
| slice_cb_qp_offset | se(v) |
| slice_cr_qp_offset | se(v) |
| if( sps_joint_cbcr_enabled_flag ) | |
| slice_joint_cbcr_qp_offset | se(v) |
| } | |
| if( sps_sao_enabled_flag ) { | |
| slice_sao_luma_flag | u(1) |
| if( ChromaArrayType   !=   0 ) | |
| slice_sao_chroma_flag | u(1) |
| } | |
| if( sps_alf_enabled_flag ) { | |
| slice_alf_enabled_flag | u(1) |
| if( slice_alf_enabled_flag ) { | |
| slice_num_alf_aps_ids_luma | u(3) |
| for( i = 0; i   <   slice_num_alf_aps_ids_luma; i++ ) | |
| slice_alf_aps_id_luma[ i ] | u(3) |
| if( ChromaArrayType   !=   0) | |
| slice_alf_chroma_idc | u(2) |
| if( slice_alf_chroma_idc ) | |
| slice_alf_aps_id_chroma | u(3) |
| } | |
| } | |
| if ( !pps_dep_quant_enabled_flag ) | |
| dep_quant_enabled_flag | u(1) |
| if( !dep_quant_enabled_flag ) | |
| sign_data_hiding_enabled_flag | u(1) |

TABLE 7-continued

The disclosed general slice header syntax to harmonize TPM with WP

|  | Descriptor |
|---|---|
| if( deblocking_filter_override_enabled_flag ) | |
|    deblocking_filter_override_flag | u(1) |
| if( deblocking_filter_override_flag ) { | |
|    slice_deblocking_filter_disabled_flag | u(1) |
|    if( !slice_deblocking_filter_disabled_flag ) { | |
|    slice_beta_offset_div2 | se(v) |
|    slice_tc_offset_div2 | se(v) |
|    } | |
| } | |
| if( sps_lmcs_enabled_flag ) { | |
|    slice_lmcs_enabled_flag | u(1) |
|    if( slice_lmcs_enabled_flag) { | |
|      slice_lmcs_aps_id | u(2) |
|     if( ChromaArrayType != 0 ) | |
|       slice_chroma_residual_scale_flag | u(1) |
|    } | |
| } | |
| if( sps_scaling_list_enabled_flag ) { | |
|    slice_scaling_list_present_flag | u(1) |
|    if( slice_scaling_list_present_flag ) | |
|      slice_scaling_list_aps_id | u(3) |
| } | |
| if( entry_point_offsets_present_flag && NumEntryPoints > 0 ) { | |
|    offset_len_minus1 | ue(v) |
|    for( i = 0; i < NumEntryPoints; i++ ) | |
|      entry_point_offset_minus1[ i ] | u(v) |
| } | |
| if( slice_header_extension_present_flag ) { | |
|    slice_header_extension_length | ue(v) |
|    for( i = 0; i < slice_header_extension_length; i++) | |
|      slice_header_extension_data_byte[ i ] | u(8) |
| } | |
|   byte_alignment( ) | |
| } | |

In particular, the following semantics can be used for the 2$^{nd}$ embodiment:

max_num_merge_cand_minus_max_num_triangle_cand specifies the maximum number of triangular merge mode candidates supported in the slice subtracted from MaxNumMergeCand.

When max_num_merge_cand_minus_max_num_triangle_cand is not present, and sps_triangle_enabled_flag is equal to 1, slice_type is equal to B, weightedPredFlag is equal to 0, and MaxNumMergeCand greater than or equal to 2, max_num_merge_cand_minus_max_num_triangle_cand is inferred to be equal to pps_max_num_merge_cand_minus_max_num_triangle_cand_minus1+1.

When max_num_merge_cand_minus_max_num_triangle_cand is not present, and sps_triangle_enabled_flag is equal to 1, slice_type is equal to B, weightedPredFlag is equal to 1, and MaxNumMergeCand greater than or equal to 2, max_num_merge_cand_minus_max_num_triangle_cand is inferred to be equal to MaxNumMergeCand or MaxNumMergeCand−1.

The maximum number of triangular merge mode candidates,

MaxNumTriangleMergeCand is derived as follows:
MaxNumTriangleMergeCand=
MaxNumMergeCand−max_num_merge_cand_minus_max_num_triangle_cand When max_num_merge_cand_minus_max_num_triangle_cand is present, the value of MaxNumTriangleMergeCand shall be in the range of 2 to MaxNumMergeCand, inclusive.

When max_num_merge_cand_minus_max_num_triangle_cand is not present, and (sps_triangle_enabled_flag is equal to 0 or MaxNumMergeCand is less than 2), MaxNumTriangleMergeCand is set equal to 0.

When MaxNumTriangleMergeCand is equal to 0, triangle merge mode is not allowed for the current slice.

The disclosed mechanisms are applicable not only TPM and GEO, but also other non-rectangular prediction and partitioning modes such as combined intra-inter prediction with triangular partitions.

Since TPM and GEO is only applied in B slice, the variable weightedPredFlag in aforementioned embodiments can be replaced by the variable pps_weighted_bipred_flag directly.

The 3$^{rd}$ embodiment is shown in Table 6, it can be done by checking whether the value of the weightedPredFlag variable is equal to 0 for a coding unit.

The variable weightedPredFlag is derived as follows:

If all of the following conditions are true, weightedPredFlag is set to 0
  luma_weight_l0_flag[i] is equal to 0 for i from 0 to NumRefIdxActive[0]
  luma_weight_l1_flag[i] is equal to 0 for i from 0 to NumRefIdxActive[1]
  chroma_weight_l0_flag[i] is equal to 0 for i from 0 to NumRefIdxActive[0]
  chroma_weight_l1_flag[i] is equal to 0 for i from 0 to NumRefIdxActive[1]

Otherwise, weightedPredFlag is set to 1

The derivation process of weightedPredFlag means: if all weighted flags for luma and chroma components, and for all reference index of current slice is 0, weighted prediction is disabled in current slice; Otherwise, weighted prediction may be used for current slice.

As disclosed above, the variable weightedPredFlag indicates whether slice-level weighted prediction should be used when obtaining inter predicted samples of the slice.

The 4th embodiment is shown in Table 6, with weightedPredFlag being replaced by slice_weighted_pred_flag, which is signaled in the slice header as shown in Table 8.

As disclosed above, the syntax slice_weighted_pred_flag indicates whether slice-level weighted prediction should be used when obtaining inter predicted samples of the slice.

TABLE 8

| The disclosed general slice header syntax to signal slice leve weighted prediction flag | |
| --- | --- |
| | Descriptor |
| slice_header( ) { | |
|   slice_pic_parameter_set_id | ue(v) |
|   if( rect_slice_flag  \|\|  NumBricksInPic > 1 ) | |
|     slice_address | u(v) |
|   if( !rect_slice_flag  &&  !single_brick_per_slice_flag ) | |
|     num_bricks_in_slice_minus1 | ue(v) |
|   non_reference_picture_flag | u(1) |
|   slice_type | ue(v) |
|   if( separate_colour_plane_flag = = 1 ) | |
|     colour_plane_id | u(2) |
|   slice_pic_order_cnt_lsb | u(v) |
|   if( nal_unit_type  = =  GDR_NUT ) | |
|     recovery_poc_cnt | ue(v) |
|   if( nal_unit_type = = IDR_W_RADL \|\| nal_unit_type = = IDR_N_LP \|\| | |
|     nal_unit_type = = CRA_NUT \|\| NalUnitType = = GDR_NUT ) | |
|     no_output_of_prior_pics_flag | u(1) |
|   if( output_flag_present_flag ) | |
|     pic_output_flag | u(1) |
|   if( ( nal_unit_type != IDR_W_RADL && nal_unit_type != IDR_N_LP ) \|\| | |
|     sps_idr_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 \|\| ( i = = 1 && rpl1_idx_present_flag ) ) ) | |
|         ref_pic_list_sps_flag[ i ] | u(1) |
|       if( ref_pic_list_sps_flag[ i ] ) { | |
|         if( num_ref_pic_lists_in_sps[ i ] > 1 && | |
|           ( i = = 0 \|\| ( i = = 1 && rpl1_idx_present_flag ) ) ) | |
|         ref_pic_list_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           slice_poc_lsb_lt[ i ][ j ] | u(v) |
|         delta_poc_msb_present_flag[ i ][ j ] | u(1) |
|         if( delta_poc_msb_present_flag[ i ][ j ] ) | |
|           delta_poc_msb_cycle_lt[ i ][ j ] | ue(v) |
|       } | |
|     } | |
|     if( ( slice_type != I && num_ref_entries[ 0 ][ RplsIdx[ 0 ] ] > 1 ) \|\| | |
|       ( slice_type = = B && num_ref_entries[ 1 ][ RplsIdx[ 1 ] ] > 1 ) | |
|     ) { | |
|       num_ref_idx_active_override_flag | u(1) |
|       if( num_ref_idx_active_override_flag ) | |
|         for( i = 0; i < ( slice_type  = =  B ? 2: 1 ); i++ ) | |
|           if( num_ref_entries[ i ][ RplsIdx[ i ] ] > 1 ) | |
|             num_ref_idx_active_minus1[ i ] | ue(v) |
|     } | |
|   } | |
|   if( partition_constraints_override_enabled_flag ) { | |
|     partition_constraints_override_flag | ue(v) |
|     if( partition_constraints_override_flag ) { | |
|       slice_log2_diff_min_qt_min_cb_luma | ue(v) |
|       slice_max_mtt_hierarchy_depth_luma | ue(v) |
|       if( slice_max_mtt_hierarchy_depth_luma != 0 ) | |
|         slice_log2_diff_max_bt_min_qt_luma | ue(v) |
|         slice_log2_diff_max_tt_min_qt_luma | ue(v) |
|     } | |

TABLE 8-continued

The disclosed general slice header syntax to signal slice leve weighted prediction flag

| | Descriptor |
|---|---|
| if( slice_type = = I && qtbtt_dual_tree_intra_flag ) { | |
| slice_log2_diff_min_qt_min_cb_chroma | ue(v) |
| slice_max_mtt_hierarchy_depth_chroma | ue(v) |
| if( slice_max_mtt_hierarchy_depth_chroma != 0 ) | |
| slice_log2_diff_max_bt_min_qt_chroma | ue(v) |
| slice_log2_diff_max_tt_min_qt_chroma | ue(v) |
| } | |
| } | |
| } | |
| } | |
| if (slice_type != I ) { | |
| if( sps_temporal_mvp_enabled_flag && | |
| !pps_temporal_mvp_enabled_idc ) | |
| slice_temporal_mvp_enabled_flag | u(1) |
| if( slice_type = = B && !pps_mvd_l1_zero_idc ) | |
| mvd_l1_zero_flag | u(1) |
| if( cabac_init_present_flag ) | |
| cabac_init_flag | u(1) |
| if( slice_temporal_mvp_enabled_flag ) { | |
| if( slice_type = = B && !pps_collocated_from_l0_idc ) | |
| collocated_from_l0_flag | u(1) |
| if( ( collocated_from_l0_flag && NumRefIdxActive[ 0 ] > 1 ) \| \| | |
| ( !collocated_from_l0_flag && NumRefIdxActive[ 1 ] > 1 ) ) | |
| collocated_ref_idx | ue(v) |
| } | |
| if( ( pps_weighted_pred_flag && slice_type = = P ) \| \| | |
| ( pps_weighted_bipred_flag && slice_type = = B ) ) | |
| slice_weighted_pred_flag | u(1) |
| if (slice_weighted_pred_flag) | |
| pred_weight_table( ) | |
| if( !pps_six_minus_max_num_merge_cand_plus1 ) | |
| six_minus_max_num_merge_cand | ue(v) |
| if( sps_affine_enabled_flag && | |
| !pps_five_minus_max_num_subblock_merge_cand_plus1 ) | |
| five_minus_max_num_subblock_merge_cand | ue(v) |
| if( sps_fpel_mmvd_enabled_flag ) | |
| slice_fpel_mmvd_enabled_flag | u(1) |
| if( sps_bdof_dmvr_slice_present_flag ) | |
| slice_disable_bdof_dmvr_flag | u(1) |
| if( sps_triangle_enabled_flag && MaxNumMergeCand >= 2 && | |
| !pps_max_num_merge_cand_minus_max_num_triangle_cand_minus1 ) { | |
| max_num_merge_cand_minus_max_num_triangle_cand | ue(v) |
| } | |
| } | |
| if ( sps_ibc_enabled_flag ) | |
| slice_six_minus_max_num_ibc_merge_cand | ue(v) |
| if( sps_joint_cbcr_enabled_flag ) | |
| slice_joint_cbcr_sign_flag | u(1) |
| slice_qp_delta | se(v) |
| if( pps_slice_chroma_qp_offsets_present_flag ) { | |
| slice_cb_qp_offset | se(v) |
| slice_cr_qp_offset | se(v) |
| if( sps_joint_cbcr_enabled_flag ) | |
| slice_joint_cbcr_qp_offset | se(v) |
| } | |
| if( sps_sao_enabled_flag ) { | |
| slice_sao_luma_flag | u(1) |
| if( ChromaArrayType != 0 ) | |
| slice_sao_chroma_flag | u(1) |
| } | |
| if( sps_alf_enabled_flag ) { | |
| slice_alf_enabled_flag | u(1) |
| if( slice_alf_enabled_flag ) { | |
| slice_num_alf_aps_ids_luma | u(3) |
| for( i = 0; i < slice_num_alf_aps_ids_luma; i++ ) | |
| slice_alf_aps_id_luma[ i ] | u(3) |
| if( ChromaArrayType != 0 ) | |
| slice_alf_chroma_idc | u(2) |
| if( slice_alf_chroma_idc ) | |
| slice_alf_aps_id_chroma | u(3) |
| } | |
| } | |
| if ( !pps_dep_quant_enabled_flag ) | |
| dep_quant_enabled_flag | u(1) |
| if( !dep_quant_enabled_flag ) | |
| sign_data_hiding_enabled_flag | u(1) |

TABLE 8-continued

The disclosed general slice header syntax to signal slice leve weighted prediction flag

|  | Descriptor |
|---|---|
| if( deblocking_filter_override_enabled_flag ) | |
|     deblocking_filter_override_flag | u(1) |
| if( deblocking_filter_override_flag ) { | |
|     slice_deblocking_filter_disabled_flag | u(1) |
|     if( !slice_deblocking_filter_disabled_flag ) { | |
|     slice_beta_offset_div2 | se(v) |
|     slice_tc_offset_div2 | se(v) |
|     } | |
| } | |
| if( sps_lmcs_enabled_flag ) { | |
|     slice_lmcs_enabled_flag | u(1) |
|     if( slice_lmcs_enabled_flag ) { | |
|       slice_lmcs_aps_id | u(2) |
|       if( ChromaArrayType != 0 ) | |
|         slice_chroma_residual_scale_flag | u(1) |
|     } | |
| } | |
| if( sps_scaling_list_enabled_flag ) { | |
|     slice_scaling_list_present_flag | u(1) |
|     if( slice_scaling_list_present_flag ) | |
|       slice_scaling_list_aps_id | u(3) |
| } | |
| if( entry_point_offsets_present_flag && NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
| } | |
| if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
| } | |
|     byte_alignment( ) | |
| } | |

In particular, the following semantics can be used for the 4th embodiment:

slice_weighted_pred_flag equal to 0 specifies that weighted prediction is not applied to current slice. slice_weighted_pred_flag equal to 1 specifies that weighted prediction is applied to current slice. When not presented, the value of slice_weighted_pred_flag is inferred to 0.

The 5$^{th}$ embodiment is to disable TPM in block level by conformance constraint. In the case of a TPM coded block, the weighing factors for the luma and chroma component of the reference pictures for inter-predictor P$_0$ 710 and P$_1$ 720 (as shown is FIG. 7) should not be present.

For more details, refIdxA and predListFlagA specific the reference index and reference picture list of the inter-predictor P0; refIdxB and predListFlagB specific the reference index and reference picture list of the inter-predictor P1.

The variable lumaWeightedFlag and chromaWeightedFlag are derived as follow:

lumaWeightedFlagA=predListFlagA? luma_weight_l1_flag[refIdxA]: luma_weight_l0_flag[refIdxA]

lumaWeightedFlagB=predListFlagB? luma_weight_l1_flag[refIdxB]: luma_weight_l0_flag[refIdxB]

chromaWeightedFlagA=predListFlagA?chroma_weight_l1_flag[refIdxA]:chroma weight_l0_flag[refIdxA]

chromaWeightedFlagB=predListFlagB? chroma_weight_l1_flag[refIdxB]:chroma weight_l0_flag[refIdxB]

lumaWeightedFlag=lumaWeightedFlagA||lumaWeightedFlagB chromaWeightedFlag=chromaWeightedFlagA||chromaWeightedFlagB.

It is a requirement of bitstream conformance that lumaWeightedFlag and chromaWeightedFlag should be equal to 0.

The 6$^{th}$ embodiment is to disable the blending weighted sample prediction process for TPM coded block when explicit weighted prediction is used.

Figure 7:
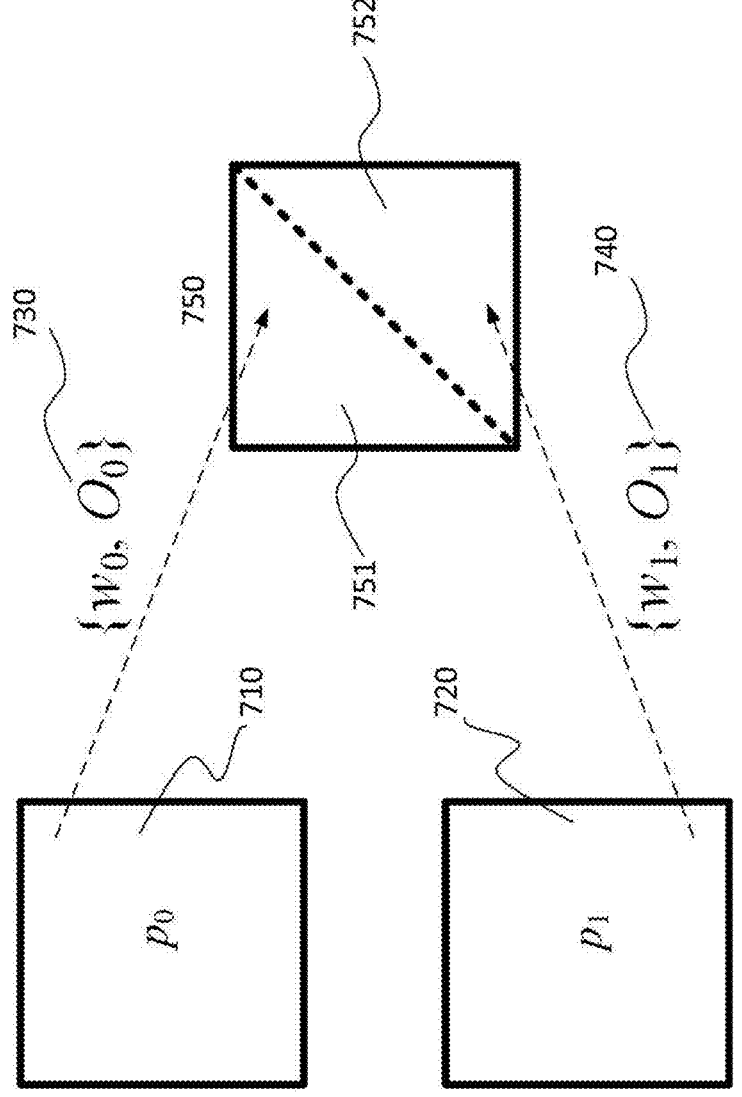
FIG. 7 illustrates an example of a triangle prediction mode.
Figure 8:
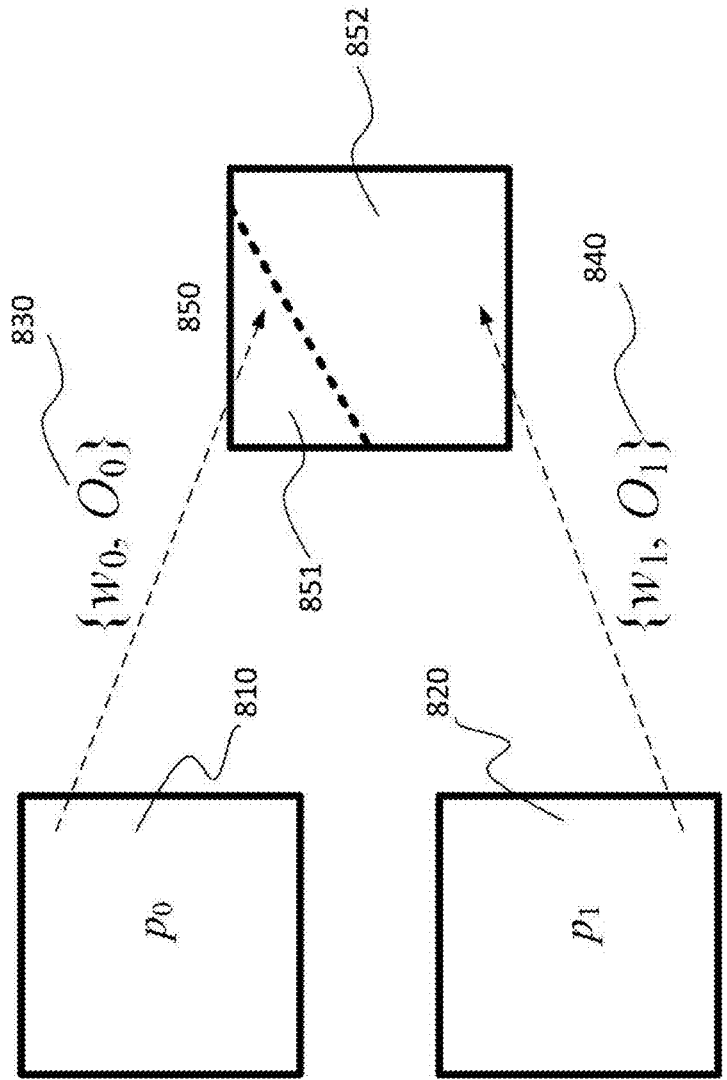
FIG. 8 illustrates an example of a geometric prediction mode.

FIG. 7 and FIG. 8 illustrate the basic idea behind the given disclosure for TPM and GEO, respectively. It is noted that the embodiments for TPM might be also implemented for GEO mode.

Figure 9:
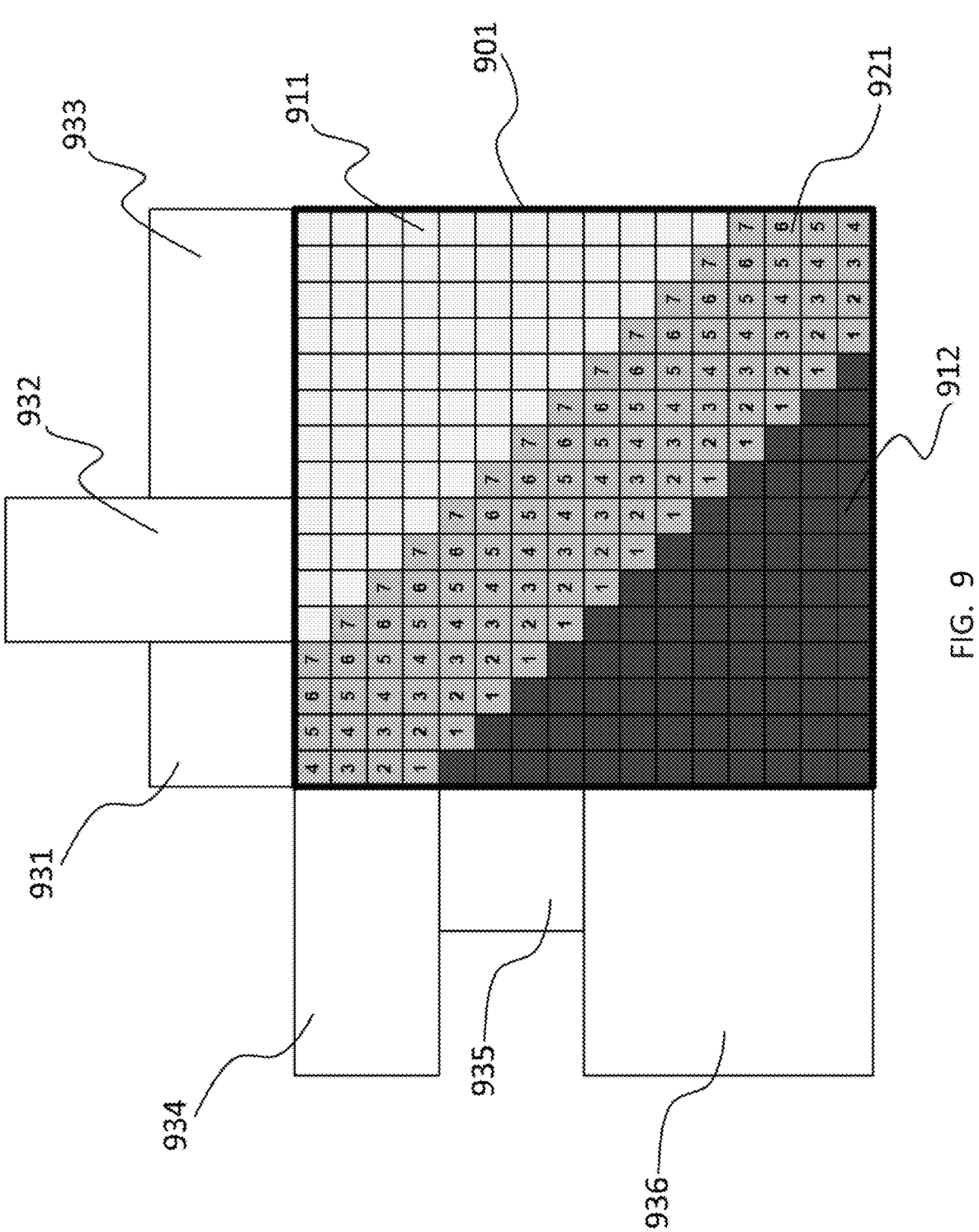
FIG. 9 illustrates another example of a geometric prediction mode.

In the case of a TPM coded block, if the weighing factors for the luma or chroma component of the reference picture for inter-predictor P$_0$ 710 or P$_1$ 720 are present, the weighted process in accordance with the WP parameters (WP parameters 730 {w$_0$, O$_0$} and WP parameters 740 {w$_1$, O$_1$} for P$_0$ and P$_1$, respectively) is used to generate the inter-predictor block; otherwise, the weighted process in accordance with the blending weighted parameter is used to generated the inter-predictor for block 750. As shown in FIG. 9, the inter-predictor 901 requires two prediction blocks P0 911 and P1 912 that have an overlapped area 921 where non-zero weights are applied to both blocks 911 and 912 to partially blend the predictors P0 911 and P1 912. Blocks neighboring to block 901 are denoted as 931, 932, 933, 934, 935, and 936 in FIG. 9. FIG. 8 illustrates the difference between TPM and GEO merge modes. In the case of GEO merge mode, the overlapped area between predictors 851 and 852 can be located not only along the diagonals of the inter-predicted block 850. Predictors P0 851 and P1 852 can be received by copying blocks 810 and 820 out of other pictures with or without applying weights and offsets {w$_0$, O$_0$} 830 and {w$_1$, O$_1$} 840 to blocks 810 and 820, respectively.

For more details, refIdxA and predListFlagA specific the reference index and reference picture list of the inter-predictor P0; refIdxB and predListFlagB specific the reference index and reference picture list of the inter-predictor P1.

The variable lumaWeightedFlag and chromaWeighted-Flag are derived as follow:

lumaWeightedFlagA=predListFlagA?luma_weight_
l1_flag[refIdxA]: luma_weight_l0_flag[refIdxA]
lumaWeightedFlagB=predListFlagB?luma_weight_
l1_flag[refIdxB]: luma_weight_l0_flag[refIdxB]
chromaWeightedFlagA=predListFlagA?chroma_
weight_l1_flag[refIdxA]: chroma weight_l0_flag[re-
fIdxA]
chromaWeightedFlagB=predListFlagB? chroma_weight_
l1_flag[refIdxB]: chroma weight_l0_flag[refIdxB]
lumaWeightedFlag=lumaWeightedFlagA||lumaWeighted-
FlagB
chromaWeightedFlag=chromaWeightedFlagA||chroma-
WeightedFlagB.

Then if lumaWeightedFlag is true, the explicit weighted process is invoked; if lumaWeightedFlag is false, the blending weighted process is invoked. As well, the chroma component is decided by chromaWeightedFlag.

For an alternative embodiment, the weighted flag for all components are considered jointly. If one of lumaWeightedFlag or chromaWeightedFlag is true, the explicit weighted process is invoked; if both lumaWeightedFlag and chromaWeightedFalg are false, the blending weighted process is invoked.

The explicit weighted process for a rectangular block predicted using bi-prediction mechanism, is performed as described below.

Inputs to this process are:

two variables nCbW and nCbH specifying the width and the height of the current coding block, two (nCbW)×(nCbH) arrays predSamplesA and predSamplesB, the prediction list flags, predListFlagA and predListFlagB, the reference indices, refIdxA and refIdxB, the variable cIdx specifying the colour component index, the sample bit depth, bitDepth.

Output of this process is the (nCbW)×(nCbH) array pbSamples of prediction sample values.

The variable shift1 is set equal to Max(2, 14−bitDepth).

The variables log2Wd, o0, o1, w0 and w1 are derived as follows:

If cIdx is equal to 0 for luma samples, the following applies:

log2Wd=luma_log2_weight_denom+shift1
w0=predListFlagA? LumaWeightL1[refIdxA]: Luma-
WeightL0[refIdxA]
w1=predListFlagB? LumaWeightL1[refIdxB]: Luma-
WeightL0[refIdxB]
o0=(predListFlagA? luma_offset_l1[refIdxA]:
luma_offset_l0[refIdxA])<< (BitDepth$_Y$−8)
o1=(predListFlagB? luma_offset_l1[refIdxB]:
luma_offset_l0[refIdxB])<< (BitDepth$_Y$−8)

Otherwise (cIdx is not equal to 0 for chroma samples), the following applies:

log2Wd=ChromaLog2WeightDenom+shift1
w0=predListFlagA? ChromaWeightL1 [refIdxA]
[cIdx−1]: ChromaWeightL0[refIdxA][cIdx−1]
w1=predListFlagA? ChromaWeightL1 [refIdxB]
[cIdx−1]: ChromaWeightL0[refIdxB][cIdx−1]

o0=(predListFlagA? ChromaOffsetL1 [refIdxA][cIdx−
1]: ChromaOffsetL0[refIdxA][cIdx−1])<< (Bit-
Depth$_C$−8)
o1=(predListFlagB? ChromaOffsetL1 [refIdxB][cIdx−
1]: ChromaOffsetL0[refIdxB][cIdx−1])<<(Bit-
Depth$_C$−8)

The prediction sample pbSamples[x][y] with x=0 . . . nCbW−1 and y=0 . . . nCbH−1 are derived as follows:

$$pbSamples[x][y] =$$
$$Clip3(0, (1 << bitDepth) - 1, (predSamplesA[x][y] * w0 +$$
$$predSamplesB[x][y] * w1 + ((o0 + o1 + 1) << log2Wd)) >> (log2Wd + 1))$$

Parameters of the slice-level weighted prediction could be represented as a set of variables, assigned for each element of a reference picture list. Index of the element is denoted further as "i". These parameters may comprise:

LumaWeightL0[i]

luma_offset_l0[i] is the additive offset applied to the luma prediction value for list 0 prediction using RefPicList [0][i]. The value of luma_offset_l0[i] shall be in the range of −128 to 127, inclusive. When luma_weight_l0_flag[i] is equal to 0, luma_offset_l0[i] is inferred to be equal to 0.

The variable LumaWeightL0[i] is derived to be equal to (1<<luma_log2_weight_denom)+delta_luma_weight_l0[i]. When luma_weight_l0_flag[i] is equal to 1, the value of delta_luma_weight_l0[i] shall be in the range of −128 to 127, inclusive. When luma_weight_l0_flag[i] is equal to 0, LumaWeightL0[i] is inferred to be equal to $2^{luma\_log2\_weight\_denom}$.

The blending weighted process for a rectangular block predicted using bi-prediction mechanism, the following process is performed as described below.

Inputs to this process are:

two variables nCbW and nCbH specifying the width and the height of the current coding block, two (nCbW)×(nCbH) arrays predSamplesLA and predSamplesLB, a variable triangleDir specifying the partition direction, a variable cIdx specifying colour component index.

Output of this process is the (nCbW)×(nCbH) array pbSamples of prediction sample values.

The variable nCbR is derived as follows:

$$nCbR = (nCbW > nCbH)?(nCbW / nCbH): (nCbH / nCbW)$$

The variable bitDepth is derived as follows:

If cIdx is equal to 0, bitDepth is set equal to BitDepth$_Y$.

Otherwise, bitDepth is set equal to BitDepth$_C$.

Variables shift1 and offset1 are derived as follows:

The variable shift1 is set equal to Max(5, 17−bitDepth).

The variable offset1 is set equal to 1<<(shift1−1).

Depending on the values of triangleDir, wS and cIdx, the prediction samples pbSamples[x][y] with x=0 . . . nCbW−1 and y=0 . . . nCbH−1 are derived as follows:

The variable wIdx is derived as follows:

If cIdx is equal to 0 and triangleDir is equal to 0, the following applies:

$$wIdx = (nCbW > nCbH)?(\text{Clip3}(0, 8, (x/nCbR - y) + 4)):(\text{Clip3}$$

$$(0, 8, (x - y/nCbR) + 4))$$

Otherwise, if cIdx is equal to 0 and triangleDir is equal to 1, the following applies:

$$wIdx = (nCbW > nCbH)?(\text{Clip3}(0, 8, (nCbH - 1 - x/nCbR - y) + 4))$$

$$(\text{Clip3}(0, 8, (nCbW - 1 - x - y/nCbR) + 4))$$

Otherwise, if cIdx is greater than 0 and triangleDir is equal to 0, the following applies:

$$wIdx = (nCbW > nCbH)?(\text{Clip3}(0, 4, (x/nCbR - y) + 2)):(\text{Clip3}$$

$$(0, 4, (x - y/nCbR) + 2))$$

Otherwise (if cIdx is greater than 0 and triangleDir is equal to 1), the following applies:

$$wIdx = (nCbW > nCbH)?(\text{Clip3}(0, 4, (nCbH - 1 - x/nCbR - y) + 2))$$

$$(\text{Clip3}(0, 4, (nCbW - 1 - x - y/nCbR) + 2))$$

The variable wValue specifying the weight of the prediction sample is derived using wIdx and cIdx as follows:

$$wValue = (cIdx == 0)?\text{Clip3}(0, 8, wIdx): \text{Clip3}(0, 8, wIdx * 2)$$

The prediction sample values are derived as follows:

$$pbSamples[x][y] =$$

$$\text{Clip3}(0, (1 << bitDepth) - 1, (predSamplesLA[x][y] * wValue +$$

$$predSamplesLB[x][y] * (8 - wValue) + \text{offset1}) >> shift1)$$

For geometric mode, the blending weighted process for a rectangular block predicted using bi-prediction mechanism, the following process is performed as described below.

Inputs to this process are:

two variables nCbW and nCbH specifying the width and the height of the current coding block, two (nCbW)×(nCbH) arrays predSamplesLA and predSamplesLB, a variable angleIdx specifying the angle index of the geometric partition, a variable distanceIdx specizing the distance idx of the geometric partition, a variable cIdx specifying colour component index.

Output of this process are the (nCbW)×(nCbH) array pbSamples of prediction sample values and the variable partIdx.

The variable bitDepth is derived as follows:

If cIdx is equal to 0, bitDepth is set equal to $BitDepth_Y$.

Otherwise, bitDepth is set equal to $BitDepth_C$.

Variables shift1 and offset1 are derived as follows:

The variable shift1 is set equal to Max(5, 17−bitDepth).

The variable offset1 is set equal to $1 << (\text{shift1}-1)$.

The weights array $sampleWeight_L[x][y]$ for luma and $sampleWeight_C[x][y]$ for chroma with x=0 . . . nCbW−1 and y=0 . . . nCbH−1 are derived as follows:

The value of the following variables are set:

hwRatio is set to nCbH/nCbW displacementX is set to angleIdx displacementY is set to (displacementX+8)%32 partIdx is set to angleIdx>=13 && angleIdx<=27? 1:0 rho is set to the following value using the look-up tables denoted as Dis, specified in Table 8-12:

$$rho = (Dis[displacementX] << 8) + (Dis[displacementY] << 8)$$

If one of the following conditons is true, variable shiftHor is set equal to 0:

angleIdx % 16 is equal to 8 angleIdx % 16 is not equal to 0 and hwRatio≥1

Otherwise, shiftHor is set equal to 1.

If shiftHor is equal to 0, offsetX and offsetY are derived as follows:

$$offsetX = (256 - nCbW) \gg 1$$

$$offsetY = (256 - nCbH) \gg 1 + angleIdx <$$

$$16 ? (distanceIdx * nCbH) \gg 3: - ((distanceIdx * nCbH) \gg 3)$$

Otherwise, if shiftHor is equal to 1, offsetX and offsetY are derived as follows:

$$offsetX = (256 - nCbW) \gg 1 + angleIdx <$$

$$16 ? (distanceIdx * nCbW) \gg 3: - ((distanceIdx * nCbW) \gg 3)$$

$$offsetY = (256 - nCbH) \gg 1$$

The variable weightIdx and weightIdxAbs are calculated using the look-up table Table 9 with x=0 . . . nCbW−1 and y=0 . . . nCbH−1 as following:

$$weightIdx = (((x + offsetX) \ll 1) + 1) * Dis[displacementX] +$$

$$(((y + offsetY) \ll 1) + 1)) * Dis[displacementY] - rho.$$

$$weightIdxAbs = \text{Clip3}(0, 26, \text{abs}(weightIdx)).$$

The value of $sampleWeight_L[x][y]$ with x=0 . . . nCbW−1 and y=0 . . . nCbH−1 is set according to Table 10 denoted as GeoFilter:

$$sampleWeight_L[x][y] =$$

$$weightIdx <= 0? GeoFilter[weightIdxAbs]: 8 - GeoFilter[weightIdxAbs]$$

The value sampleWeight$_C$[x][y] with x=0 . . . nCbW−1 and y=0 . . . nCbH−1 is set as follows:

$$sampleWeight_C[x][y] =$$

$$sampleWeight_L[(x << (SubWidthC - 1))][(y << (SubHeightC - 1))]$$

NOTE—The value of sample sampleWeight$_L$[x][y] can also be derived from sampleWeight$_L$[x−shiftX][y−shiftY]. If the angleIdx is larger than 4 and smaller than 12, or angleIdx is larger than 20 and smaller than 24, shiftX is the tangent of the split angle and shiftY is 1, otherwise shiftX is 1 of the split angle and shiftY is cotangent of the split angle. If tangent (resp. cotangent) value is infinity, shiftX is 1 (resp. 0) or shift Y is 0 (reps. 1).

The prediction sample values are derived as follows with X denoted as L or C with cIdx is equal to 0 or not equal to 0:

$$pbSamples[x][y] = partIdx? \ Clip3(0, (1 << bitDepth) - 1,$$

$$(predSamplesLA[x][y] * (8 - sampleWeight_X[x][y]) +$$

$$predSamplesLB[x][y] * sampleWeight_X[x][y] + offset1) >>$$

-continued $$shift1): \ Clip3(0, (1 << bitDepth) - 1,$$

$$(predSamplesLA[x][y] * sampleWeight_X[x][y]) +$$

$$predSamplesLB[x][y] * (8 - sampleWeight_X[x][y]) + offset1) >> shift1)$$

TABLE 9

Look-up table Dis for derivation of geometric partitioning distance.

| | idx | | | | | | | | | | | |
|---|---|---|---|---|---|---|---|---|---|---|---|---|
| | 0 | 1 | 2 | 4 | 6 | 7 | 8 | 9 | 10 | 12 | 14 | 15 |
| Dis[idx] | 8 | 8 | 8 | 8 | 4 | 2 | 0 | −2 | −4 | −8 | −8 | −8 |

| | idx | | | | | | | | | | | |
|---|---|---|---|---|---|---|---|---|---|---|---|---|
| | 16 | 17 | 18 | 20 | 22 | 23 | 24 | 25 | 26 | 28 | 30 | 31 |
| Dis[idx] | −8 | −8 | −8 | −8 | −4 | −2 | 0 | 2 | 4 | 8 | 8 | 8 |

TABLE 10

Filter weight look-up table GeoFilter for derivation of geometric partitioning filter weights.

| | idx | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| GeoFilter[idx] | 4 | 4 | 4 | 4 | 5 | 5 | 5 | 5 | 5 | 5 | 5 | 6 | 6 | 6 |

| | idx | | | | | | | | | | | | | |
|---|---|---|---|---|---|---|---|---|---|---|---|---|---|---|
| | 14 | 15 | 16 | 17 | 18 | 19 | 20 | 21 | 22 | 23 | 24 | 25 | 26 | |
| GeoFilter[idx] | 6 | 6 | 6 | 6 | 7 | 7 | 7 | 7 | 7 | 7 | 7 | 7 | 8 | |

In VVC specification Draft 7 (document JVET-P2001-vE: B. Bross, J. Chen, S. Liu, Y.-K. Wang, "Versatile Video Coding (Draft 7)," output document JVET-P2001 of the 16th JVET meeting, Geneva, Switzerland; this document is contained in file JVET-P2001-v14: http://phenix.it-sudparis.eu/jvet/doc_end_user/documents/16_Geneva/wg11/JVET-P2001-v14.zip), the concept of picture header (PH) was introduced by moving a part of syntax elements out of slice header (SH) to PH to reduce signaling overhead caused by assigning equal or similar values to same syntax elements in each SH associated with the PH. As presented in Table 11, syntax elements to control the maximum number of merge candidates for TPM merge mode are signaled in PH, whereas weighted prediction parameters are still in SH as shown in Table 12 and

TABLE 14

The semantics of syntax elements used in Table 12 and Table 13 is described below.

| Table 11 - Picture header RBSP syntaxpicture header rbsp( ) { | Descriptor |
|---|---|
| non_reference_picture_flag | u(1) |
| gdr_pic_flag | u(1) |
| no_output_of_prior_pics_flag | u(1) |
| if( gdr_pic_flag ) | |
|    recovery_poc_cnt | ue(v) |
| ph_pic_parameter_set_id | ue(v) |

TABLE 14-continued

The semantics of syntax elements used in Table 12 and Table 13 is described below.

| Table 11 - Picture header RBSP syntaxpicture header rbsp( ) { | Descriptor |
|---|---|
| if( sps_poc_msb_flag ) { | |
|   ph_poc_msb_present_flag | u(1) |
|   if( ph_poc_msb_present_flag ) | |
|     poc_msb_val | u(v) |
| } | |
| ... | |
| if( sps_triangle_enabled_flag && MaxNumMergeCand >= 2 && | |
|     !pps_max_num_merge_cand_minus_max_num_triangle_cand_plus1 ) | |
|     pic_max_num_merge_cand_minus_max_num_triangle_cand | ue(v) |
| ... | |
|   rbsp_trailing_bits( ) | |
| } | |

Picture Header RBSP Semantics

The PH contains information that is common for all slices of the coded picture associated with the PH.

non_reference_picture_flag equal to 1 specifies the picture associated with the PH is never used as a reference picture. non_reference_picture_flag equal to 0 specifies the picture associated with the PH may or may not be used as a reference picture.

gdr_pic_flag equal to 1 specifies the picture associated with the PH is a gradual decoding refresh (GDR) picture. gdr_pic_flag equal to 0 specifies that the picture associated with the PH is not a GDR picture.

no_output_of_prior_pics_flag affects the output of previously-decoded pictures in the decoded picture buffer (DPB) after the decoding of a coded layer video sequence start (CLVSS) picture that is not the first picture in the bitstream.

recovery_poc_cnt specifies the recovery point of decoded pictures in output order. If the current picture is a GDR picture that is associated with the PH and there is a picture picA that follows the current GDR picture in decoding order in the coded layer video sequence (CLVS) and that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCnt Val of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

NOTE 1—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous intra random access point (IRAP) picture, when present, preceding the associated GDR picture in decoding order.

ph_pic_parameter_set_id specifies the value of pps_pic_parameter_set_id for the PPS in use. The value of ph_pic_parameter_set_id shall be in the range of 0 to 63, inclusive.

It is a requirement of bitstream conformance that the value of TemporalId of the PH shall be greater than or equal to the value of TemporalId of the Picture Parameter Set (PPS) that has pps_pic_parameter_set_id equal to ph_pic_parameter_set_id.

sps_poc_msb_flag equal to 1 specifies that the ph_poc_msb_cycle_present_flag syntax element is present in PHs referring to the Sequence Parameter Set (SPS). sps_poc_msb_flag equal to 0 specifies that the ph_poc_msb_ cycle_present_flag syntax element is not present in PHs referring to the SPS.

ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[GeneralLayerIdx[nuh_layer_id]] is equal to 0 and there is a picture in the current Access Unit (AU) in a reference layer of the current layer, the value of ph_poc_msb_present_flag shall be equal to 0.

poc_msb_val specifies the picture order count (POC) most significant bit (MSB) value of the current picture. The length of the syntax element poc_msb_val is poc_msb_len_minus1+1 bits.

sps_triangle_enabled_flag specifics whether triangular shape based motion compensation can be used for inter prediction. sps_triangle_enabled_flag equal to 0 specifies that the syntax shall be constrained such that no triangular shape based motion compensation is used in the coded layer video sequence (CLVS), and merge_triangle_split_dir, merge_triangle_idx0, and merge_triangle_idx1 are not present in coding unit syntax of the CLVS. sps_triangle_enabled_flag equal to 1 specifies that triangular shape based motion compensation can be used in the CLVS.

pps_max_num_merge_cand_minus_max_num_triangle_cand_plus1 equal to 0 specifies that pic_max_num_merge_cand_minus_max_num_triangle_cand is present in PHs of slices referring to the Picture Parameter Set (PPS). pps_max_num_merge_cand_minus_max_num_triangle_cand_plus1 greater than 0 specifies that pic_max_num_merge_cand_minus_max_num_triangle_cand is not present in PHs referring to the PPS. The value of pps_max_num_merge_cand_minus_max_num_triangle_cand_plus1 shall be in the range of 0 to MaxNumMergeCand−1.

pps_max_num_merge_cand_minus_max_num_triangle_cand_plus1 equal to 0 specifies that pic_max_num_merge_cand_minus_max_num_triangle_cand is present in PHs of slices referring to the PPS. pps_max_num_merge_cand_minus_max_num_triangle_cand_plus1 greater than 0 specifies that pic_max_num_merge_cand_minus_max_num_triangle_cand is not present in PHs referring to the PPS. The value of pps_max_num_merge_cand_minus_max_num_triangle_cand_plus1 shall be in the range of 0 to MaxNumMergeCand−1.

pic_six_minus_max_num_merge_cand specifies the maximum number of merging motion vector prediction (MVP) candidates supported in the slices associated with the PH subtracted from 6. The maximum number of merging MVP candidates, MaxNumMergeCand is derived as follows:

$$MaxNumMergeCand = 6 - picsix\_minus\_max\_num\_merge\_cand$$

The value of MaxNumMergeCand shall be in the range of 1 to 6, inclusive. When not present, the value of pic_six_ minus_max_num_merge_cand is inferred to be equal to pps_six_minus_max_num_merge_cand_plus1−1.

General Slice Header Semantics

When present, the value of the slice header syntax element slice_pic_order_cnt_lsb shall be the same in all slice headers of a coded picture.

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$ quantization parameters for the coding unit containing cu_chroma_qp_offset_flag, are all set equal to 0.

TABLE 12

| General slice header syntax | |
|---|---|
| | Descriptor |
| slice_header( ) { | |
|   slice_pic_order_cnt_lsb | u(v) |
|   if( subpics_present_flag ) | |
|     slice_subpic_id | u(v) |
|   if( rect_slice_flag \|\| NumTilesInPic > 1 ) | |
|     slice_address | u(v) |
|   if( !rect_slice_flag && NumTilesInPic > 1 ) | |
|     num_tiles_in_slice_minus1 | ue(v) |
|   slice_type | ue(v) |
|   if( !pic_rpl_present_flag &&( ( nal_unit_type != IDR_W_RADL && nal_unit_type != | |
|     IDR_N_LP ) \|\| sps_idr_rpl_present_flag ) ) { | |
|     for( i = 0; i < 2; i++ ) { | |
|       if( num_ref_pic_lists_in_sps[ i ] > 0 | |
|   && !pps_ref_pic_list_sps_idc[ i ] && | |
|       ( i = = 0 \|\| ( i = = 1 && rpl1_idx_present_flag ) ) ) | |
|         slice_rpl_sps_flag[ i ] | u(1) |
|       if( slice_rpl_sps_flag[ i ] ) { | |
|         if( num_ref_pic_lists_in_sps[ i ] > 1 && | |
|           ( i = = 0 \|\| ( i = = 1 && rpl1_idx_present_flag | |
|   ) ) ) | |
|           slice_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           slice_poc_lsb_lt[ i ][ j ] | u(v) |
|         slice_delta_poc_msb_present_flag[ i ][ j ] | u(1) |
|         if( slice_delta_poc_msb_present_flag[ i ][ j ] ) | |
|           slice_delta_poc_msb_cycle_lt[ i ][ j ] | ue(v) |
|       } | |
|     } | |
|   } | |
|   if( pic_rpl_present_flag \|\| ( ( nal_unit_type != IDR_W_RADL && nal_unit_type != | |
|   IDR_N_LP ) \|\| sps_idr_rpl_present_flag ) ) { | |
|     if( ( slice_type != I && num_ref_entries[ 0 ][ RplsIdx[ 0 ] ] > 1 ) | |
|   \|\| | |
|     ( slice_type = = B && num_ref_entries[ 1 ][ RplsIdx[ 1 ] ] > 1 | |
|   ) ) { | |
|       num_ref_idx_active_override_flag | u(1) |
|       if( num_ref_idx_active_override_flag ) | |
|         for( i = 0; i < ( slice_type = = B ? 2: 1 ); i++ ) | |
|           if( num_ref_entries[ i ][ RplsIdx[ i ] ] > 1 ) | |
|             num_ref_idx_active_minus1[ i ] | ue(v) |
|     } | |
|   } | |
|   if( slice_type != I ) { | |
|     ... | |
|     if( ( pps_weighted_pred_flag && slice_type = = P ) \|\| | |
|       ( pps_weighted_bipred_flag && slice_type = = B ) ) | |
|       pred_weight_table( ) | |
|   } | |
|   ... | |
|   byte_alignment( ) | |
| } | | slice_pic_order_cnt_lsb specifies the picture order count modulo MaxPicOrderCntLsb for the current picture. The length of the slice_pic_order_cnt_lsb syntax element is log2_max_pic_order_cnt_lsb_minus4+4 bits. The value of the slice_pic_order_cnt_lsb shall be in the range of 0 to MaxPicOrderCntLsb−1, inclusive.

When the current picture is a GDR picture, the variable RpPicOrderCntVal is derived as follows:

RpPicOrderCntVal=PicOrderCntVal+recovery_poc_cnt.

slice_subpic_id specifies the subpicture identifier of the subpicture that contains the slice. If slice_subpic_id is present, the value of the variable SubPicIdx is derived to be such that SubpicIdList[SubPicIdx] is equal to slice_subpic_id. Otherwise (slice_subpic_id is not present), the variable SubPicIdx is derived to be equal to 0. The length of slice_subpic_id, in bits, is derived as follows:

If sps_subpic_id_signalling_present_flag is equal to 1, the length of slice_subpic_id is equal to sps_subpic_id_len_minus1+1.

Otherwise, if ph_subpic_id_signalling_present_flag is equal to 1, the length of slice_subpic_id is equal to ph_subpic_id_len_minus1+1.

Otherwise, if pps_subpic_id_signalling_present_flag is equal to 1, the length of slice_subpic_id is equal to pps_subpic_id_len_minus1+1.

Otherwise, the length of slice_subpic_id is equal to Ceil (Log2(sps_num_subpics_minus1+1)).

slice_address specifies the slice address of the slice. When not present, the value of slice_address is inferred to be equal to 0.

If rect_slice_flag is equal to 0, the following applies:

The slice address is the raster scan tile index.

The length of slice_address is Ceil (Log2(NumTilesIn-Pic)) bits.

The value of slice_address shall be in the range of 0 to NumTilesInPic−1, inclusive.

Otherwise (rect_slice_flag is equal to 1), the following applies:

The slice address is the slice index of the slice within the SubPicIdx-th subpicture.

The length of slice_address is Ceil (Log2(NumSlicesIn-Subpic[SubPicIdx])) bits.

The value of slice_address shall be in the range of 0 to NumSlicesInSubpic[SubPicIdx]−1, inclusive.

It is a requirement of bitstream conformance that the following constraints apply:

If rect_slice_flag is equal to 0 or subpics_present_flag is equal to 0, the value of slice_address shall not be equal to the value of slice_address of any other coded slice Network Abstraction Layer (NAL) unit of the same coded picture.

Otherwise, the pair of slice_subpic_id and slice_address values shall not be equal to the pair of slice_subpic_id and slice_address values of any other coded slice NAL unit of the same coded picture.

When rect_slice_flag is equal to 0, the slices of a picture shall be in increasing order of their slice_address values.

The shapes of the slices of a picture shall be such that each Coding Tree Unit (CTU), when decoded, shall have its entire left boundary and entire top boundary consisting of a picture boundary or consisting of boundaries of previously decoded CTU(s).

num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtuInCurrSlice, which specifies the number of CTUs in the current slice, and the list CtbAddrIn-CurrSlice[i], for i ranging from 0 to NumCtuInCurrSlice−1, inclusive, specifying the picture raster scan address of the i-th Coding Tree Block (CTB) within the slice, are derived as follows:

```
if( rect_slice_flag ) {
    picLevelSliceIdx = SliceSubpicToPicIdx[ SubPicIdx ][ slice_address ]
    NumCtuInCurrSlice = NumCtuInSlice[ picLevelSliceIdx ]
    for( i = 0; i < NumCtuInCurrSlice; i++ )
        CtbAddrInCurrSlice[ i ] = CtbAddrInSlice[ picLevelSliceIdx ][ i ]
} else {
    NumCtuInCurrSlice = 0
    for( tileIdx = slice_address; tileIdx   <=
slice_address + num_tiles_in_slice_minus1[ i ]; tileIdx++ ) {
        tileX = tileIdx % NumTileColumns
        tileY = tileIdx / NumTileColumns
        for( ctbY = tileRowBd[ tileY ]; ctbY < tileRowBd[ tileY + 1 ];
        ctbY++) {
            for( ctbX = tileColBd[ tileX ]; ctbX < tileColBd[ tileX + 1 ];
            ctbX++ ) {
                CtbAddrInCurrSlice[ NumCtuInCurrSlice ] =
ctbY * PicWidthInCtb + ctbX
                NumCtuInCurrSlice++
            }
        }
    }
}
```

The variables SubPicLeftBoundaryPos, SubPicTop-BoundaryPos, SubPicRightBoundaryPos, and SubPicBot-BoundaryPos are derived as follows:

```
if( subpic_treated_as_pic_flag[ SubPicIdx ] ) {
    SubPicLeftBoundaryPos = subpic_ctu_top_left_x[ SubPicIdx ] *
    CtbSizeY
    SubPicRightBoundaryPos = Min(
    pic_width_max_in_luma_samples − 1,
    ( subpic_ctu_top_left_x[ SubPicIdx ] + subpic_width_minus1[
SubPicIdx ] + 1 ) * CtbSizeY − 1)
    SubPicTopBoundaryPos = subpic_ctu_top_left_y[ SubPicIdx ]
    *CtbSizeY
    SubPicBotBoundaryPos = Min(
    pic_height_max_in_luma_samples − 1,
    ( subpic_ctu_top_left_y[ SubPicIdx ] + subpic_height_minus1[
SubPicIdx ] + 1 ) * CtbSizeY − 1)
}
``` slice_type specifies the coding type of the slice according to Table 13.

TABLE 13

| Name association to slice_type | |
|---|---|
| slice_type | Name of slice_type |
| 0 | B (B slice) |
| 1 | P (P slice) |
| 2 | I (I slice) | slice_rpl_sps_flag[i] equal to 1 specifies that reference picture list i of the current slice is derived based on one of the ref_pic_list_struct(listIdx, rplsIdx) syntax structures with listIdx equal to i in the SPS. slice_rpl_sps_flag[i] equal to 0 specifies that reference picture list i of the current slice is derived based on the ref_pic_list_struct(listIdx, rplsIdx) syntax structure with listIdx equal to i that is directly included in the slice headers of the current picture.

When slice_rpl_sps_flag[i] is not present, the following applies:

If pic_rpl_present_flag is equal to 1, the value of slice_rpl_sps_flag[i] is inferred to be equal to pic_rpl_sps_flag[i].

Otherwise, if num_ref_pic_lists_in_sps [i] is equal to 0, the value of ref_pic_list_sps_flag[i] is inferred to be equal to 0.

Otherwise, if num_ref_pic_lists_in_sps [i] is greater than 0 and if rpl1_idx_present_flag is equal to 0, the value of slice_rpl_sps_flag[1] is inferred to be equal to slice_rpl_sps_flag[0].

slice_rpl_idx[i] specifies the index, into the list of the ref_pic_list_struct(listIdx, rplsIdx) syntax structures with listIdx equal to i included in the SPS, of the ref_pic_list_struct(listIdx, rplsIdx) syntax structure with listIdx equal to i that is used for derivation of reference picture list i of the current picture. The syntax element slice_rpl_idx[i] is represented by Ceil (Log2 (num_ref_pic_lists_in_sps [i])) bits. When not present, the value of slice_rpl_idx[i] is inferred to be equal to 0. The value of slice_rpl_idx[i] shall be in the range of 0 to num_ref_pic_lists_in_sps [i]-1, inclusive. When slice_rpl_sps_flag[i] is equal to 1 and num_ref_pic_lists_in_sps [i] is equal to 1, the value of slice_rpl_idx[i] is inferred to be equal to 0. When slice_rpl_sps_flag[i] is equal to 1 and rpl1_idx_present_flag is equal to 0, the value of slice_rpl_idx[1] is inferred to be equal to slice_rpl_idx[0].

The variable RplsIdx [i] is derived as follows:
if(pic_rpl_present_flag)
    RplsIdx[i]=PicRplsIdx[i]
else
    RplsIdx[i]=slice_rpl_sps_flag[i]? slice_rpl_idx[i]:
    num_ref_pic_lists_in_sps [i]

slice_poc_lsb_lt[i][j] specifies the value of the picture order count modulo MaxPicOrderCntLsb of the j-th LTRP entry in the i-th reference picture list. The length of the slice_poc_lsb_lt[i][j] syntax element is log2_max_pic_order_cnt_lsb_minus4+4 bits.

The variable PocLsbLt[i][j] is derived as follows:
if(pic_rpl_present_flag)
    PocLsbLt[i][j]=PicPocLsbLt[i][j] (142)
else
    PocLsbLt[i][j]=ltrp_in_slice_header_flag[i][RplsIdx
    [i]]? (143)
        slice_poc_lsb_lt[i][j]: rpls_poc_lsb_lt[listIdx][Rpl-
        sIdx [i]][j]

slice_delta_poc_msb_present_flag[i][j] equal to 1 specifies that slice_delta_poc_msb_cycle_lt[i][j] is present. slice_delta_poc_msb_present_flag[i][j] equal to 0 specifies that slice_delta_poc_msb_cycle_lt[i][j] is not present.

Let prevTid0Pic be the previous picture in decoding order that has nuh_layer_id the same as the current picture, has TemporalId equal to 0, and is not a Random Access Skipped Leading (RASL) or Random Access Decodable Leading (RADL) picture. Let setOfPrevPocVals be a set consisting of the following:

the PicOrderCnt Val of prevTid0Pic, the PicOrderCntVal of each picture that is referred to by entries in RefPicList[0] or RefPicList[1] of prevTid0Pic and has nuh_layer_id the same as the current picture, the PicOrderCntVal of each picture that follows prevTid0Pic in decoding order, has nuh_layer_id the same as the current picture, and precedes the current picture in decoding order.

When pic_rpl_present_flag is equal to 0 and there is more than one value in setOfPrevPocVals for which the value modulo MaxPicOrderCntLsb is equal to PocLsbLt[i][j], the value of slice_delta_poc_msb_present_flag[i][j] shall be equal to 1.

slice_delta_poc_msb_cycle_lt[i][j] specifies the value of the variable FullPocLt[i][j] as follows:

```
if( pic_rpl_present_flag )
   FullPocLt[ i ][ j ] = PicFullPocLt[ i ][ j ]
else {
   if( j   = =   0 )
      DeltaPocMsbCycleLt[ i ][ j ] = delta_poc_msb_cycle_lt[ i ][ j ]
   else
      DeltaPocMsbCycleLt[ i ][ j ] = delta_poc_msb_cycle_lt[ i ][ j ] +
DeltaPocMsbCycleLt[ i ][ j – 1 ]
   FullPocLt[ i ][ j ] = PicOrderCntVal – DeltaPocMsbCycleLt[ i ][ j ] *
MaxPicOrderCntLsb   –
      ( PicOrderCntVal & ( MaxPicOrderCntLsb – 1 ) ) + PocLsbLt[ i ][
      j ]
}
```

The value of slice_delta_poc_msb_cycle_lt[i][j] shall be in the range of 0 to $2^{(32-log\ 2\_max\_pic\_order\_cnt\_lsb\_minus4-4)}$, inclusive. When not present, the value of slice_delta_poc_msb_cycle_lt[i][j] is inferred to be equal to 0.

num_ref_idx_active_override_flag equal to 1 specifies that the syntax element num_ref_idx_active_minus1[0] is present for P and B slices and that the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. When not present, the value of num_ref_idx_active_override_flag is inferred to be equal to 1.

num_ref_idx_active_minus1[i] is used for the derivation of the variable NumRefIdxActive[i] as specified by Equation 145. The value of num_ref_idx_active_minus1[i] shall be in the range of 0 to 14, inclusive.

For i equal to 0 or 1, when the current slice is a B slice, num_ref_idx_active_override_flag is equal to 1, and num_ref_idx_active_minus1[i] is not present, num_ref_idx_active_minus1[i] is inferred to be equal to 0.

When the current slice is a P slice, num_ref_idx_active_override_flag is equal to 1, and num_ref_idx_active_minus1[0] is not present, num_ref_idx_active_minus1[0] is inferred to be equal to 0.

The variable NumRefIdxActive[i] is derived as follows:

```
for( i = 0; i < 2; i++ ) {
   if( slice_type  = =  B  | |  ( slice_type  = =  P  &&
   i  = =  0 ) ) {
      if( num_ref_idx_active_override_flag )
         NumRefIdxActive[ i ] = num_ref_idx_active_minus1[        (145)
         i ] + 1
      else {
         if( num_ref_entries[ i ][ RplsIdx[ i ] ]  >=
num_ref_idx_preset_active_minus1[ i ] + 1 )
            NumRefIdxActive[ i ] = num_ref_idx_preset_active_minus1[
            i ] + 1
         else
            NumRefIdxActive[ i ] = num_ref_entries[ i ][ RplsIdx[ i ] ]
      }
   } else /* slice_type  = =  I  | |  ( slice_type  = =  P  &&
   i  = =  1 ) */
      NumRefIdxActive[ i ] = 0
}
```

The value of NumRefIdxActive[i]-1 specifies the maximum reference index for reference picture list i that may be used to decode the slice. When the value of NumRefIdx- Active[i] is equal to 0, no reference index for reference picture list i may be used to decode the slice.

When the current slice is a P slice, the value of NumRefIdxActive[0] shall be greater than 0.

When the current slice is a B slice, both NumRefIdxActive[0] and NumRefIdxActive[1] shall be greater than 0.

TABLE 14

Weighted prediction parameters syntax

| | Descriptor |
|---|---|
| pred_weight_table( ) { | |
| luma_log2_weight_denom | ue(v) |
| if( ChromaArrayType != 0 ) | |
| delta_chroma_log2_weight_denom | se(v) |
| for( i = 0; i < NumRefIdxActive[ 0 ]; i++ ) | |
| luma_weight_l0_flag[ i ] | u(1) |
| if( ChromaArrayType != 0 ) | |
| for( i = 0; i < NumRefIdxActive[ 0 ]; i++ ) | |
| chroma_weight_l0_flag[ i ] | u(1) |
| for( i = 0; i < NumRefIdxActive[ 0 ]; i++ ) { | |
| if( luma_weight_l0_flag[ i ] ) { | |
| delta_luma_weight_l0[ i ] | se(v) |
| luma_offset_l0[ i ] | se(v) |
| } | |
| if( chroma_weight_l0_flag[ i ] ) | |
| for( j = 0; j <2; j++ ) { | |
| delta_chroma_weight_l0[ i ][ j ] | se(v) |
| delta_chroma_offset_l0[ i ][ j ] | se(v) |
| } | |
| } | |
| if( slice_type == B ) { | |
| for( i = 0; i < NumRefIdxActive[ 1 ]; i++ ) | |
| luma_weight_l1_flag[ i ] | u(1) |
| if( ChromaArrayType != 0 ) | |
| for( i = 0; i < NumRefIdxActive[ 1 ]; i++ ) | |
| chroma_weight_l1_flag[ i ] | u(1) |
| for( i = 0; i < NumRefIdxActive[ 1 ]; i++ ) { | |
| if( luma_weight_l1_flag[ i ] ) { | |
| delta_luma_weight_l1[ i ] | se(v) |
| luma_offset_l1[ i ] | se(v) |
| } | |
| if( chroma_weight_l1_flag[ i ] ) | |
| for( j = 0; j < 2; j++) { | |
| delta_chroma_weight_l1[ i ][ j ] | se(v) |
| delta_chroma_offset_l1[ i ][ j ] | se(v) |
| } | |
| } | |
| } | |
| } | |

Weighted Prediction Parameters Semantics luma_log2_weight_denom is the base 2 logarithm of the denominator for all luma weighting factors. The value of luma_log2_weight_denom shall be in the range of 0 to 7, inclusive.

delta_chroma_log2_weight_denom is the difference of the base 2 logarithm of the denominator for all chroma weighting factors. When delta_chroma_log2_weight_denom is not present, it is inferred to be equal to 0.

The variable ChromaLog2WeightDenom is derived to be equal to luma_log2_weight_denom+delta_chroma_log2_weight_denom and the value shall be in the range of 0 to 7, inclusive.

luma_weight_l0_flag[i] equal to 1 specifies that weighting factors for the luma component of list 0 prediction using RefPicList[0][i] are present. luma_weight_l0_flag[i] equal to 0 specifies that these weighting factors are not present.

chroma_weight_l0_flag[i] equal to 1 specifies that weighting factors for the chroma prediction values of list 0 prediction using RefPicList[0][i] are present. chroma_weight_l0_flag[i] equal to 0 specifies that these weighting factors are not present. When chroma_weight_l0_flag[i] is not present, it is inferred to be equal to 0.

delta_luma_weight_l0[i] is the difference of the weighting factor applied to the luma prediction value for list 0 prediction using RefPicList[0][i].

The variable LumaWeightL0[i] is derived to be equal to (1<<luma_log2_weight_denom)+delta_luma_weight_l0[i]. When luma_weight_l0_flag[i] is equal to 1, the value of delta_luma_weight_l0[i] shall be in the range of −128 to 127, inclusive. When luma_weight_l0_flag[i] is equal to 0, LumaWeightL0[i] is inferred to be equal to 2luma_log2_weight_denom.

luma_offset_l0[i] is the additive offset applied to the luma prediction value for list 0 prediction using RefPicList[0][i]. The value of luma_offset_l0[i] shall be in the range of −128 to 127, inclusive. When luma_weight_l0_flag[i] is equal to 0, luma_offset_l0[i] is inferred to be equal to 0.

delta_chroma_weight_l0[i][j] is the difference of the weighting factor applied to the chroma prediction values for list 0 prediction using RefPicList[0][i] with j equal to 0 for Cb and j equal to 1 for Cr.

The variable ChromaWeightL0[i][j] is derived to be equal to (1<<ChromaLog2WeightDenom)+delta_chroma_weight_l0[i][j]. When chroma_weight_l0_flag[i] is equal to 1, the value of delta_chroma_weight_l0[i][j] shall be in the range of −128 to 127, inclusive. When chroma_weight_l0_flag[i] is equal to 0, ChromaWeightL0[i][j] is inferred to be equal to 2ChromaLog2WeightDenom.

delta_chroma_offset_l0[i][j] is the difference of the additive offset applied to the chroma prediction values for list 0 prediction using RefPicList[0][i] with j equal to 0 for Cb and j equal to 1 for Cr.

The variable ChromaOffsetL0[i][j] is derived as follows:

$$ChromaOffsetL0[i][j] =$$

$$Clip3(-128, 127, (128 + delta\_chroma\_offset\_l0[i][j] -$$

$$((128 * ChromaWeightL0[i][j]) \gg ChromaLog2WeightDenom)))$$

The value of delta_chroma_offset_l0[i][j] shall be in the range of −4*128 to 4*127, inclusive. When chroma_weight_l0_flag[i] is equal to 0, ChromaOffsetL0[i][j] is inferred to be equal to 0.

luma_weight_l1_flag[i], chroma_weight_l1_flag[i], delta_luma_weight_l1[i], luma_offset_l1[i], delta_chroma_weight_l1[i][j], and delta_chroma_offset_l1[i][j] have the same semantics as luma_weight_l0_flag[i], chroma_weight_l0_flag[i], delta_luma_weight_l0[i], luma_offset_l0[i], delta_chroma_weight_l0[i][j] and delta_chroma_offset_l0[i][j], respectively, with l0, L0, list 0 and List0 replaced by l1, L1, list 1 and List1, respectively.

The variable sumWeightL0Flags is derived to be equal to the sum of luma_weight_l0_flag[i]+2*chroma_weight_l0_flag[i], for i=0 . . . NumRefIdxActive[0]-1.

When slice_type is equal to B, the variable sumWeightL1Flags is derived to be equal to the sum of luma_weight_l1_flag[i]+2*chroma_weight_l1_flag[i], for i=0 . . . NumRefIdxActive[1]−1.

It is a requirement of bitstream conformance that, when slice_type is equal to P, sumWeightL0Flags shall be less than or equal to 24 and when slice_type is equal to B, the sum of sumWeightL0Flags and sumWeightL1Flags shall be less than or equal to 24.

Reference Picture List Structure Semantics

The ref_pic_list_struct(listIdx, rplsIdx) syntax structure may be present in an SPS or in a slice header. Depending on whether the syntax structure is included in a slice header or an SPS, the following applies:

If present in a slice header, the ref_pic_list_struct(listIdx, rplsIdx) syntax structure specifies reference picture list listIdx of the current picture (the picture containing the slice).

Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that 1) has one or more slices containing ref_pic_list_idx [listIdx] equal to an index into the list of the ref_pic_list_struct(listIdx, rplsIdx) syntax structures included in the SPS, and 2) is in a Coded Video Sequence (CVS) that refers to the SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to MaxDecPicBuffMinus1+14, inclusive.

ltrp_in_slice_header_flag[listIdx][rplsIdx] equal to 0 specifies that the POC LSBs of the LTRP entries in the ref_pic_list_struct(listIdx, rplsIdx) syntax structure are present in the ref_pic_list_struct(listIdx, rplsIdx) syntax structure.

ltrp_in_slice_header_flag[listIdx][rplsIdx] equal to 1 specifies that the POC LSBs of the Long-Term Reference Picture (LTRP) entries in the ref_pic_list_struct(listIdx, rplsIdx) syntax structure are not present in the ref_pic_list_struct(listIdx, rplsIdx) syntax structure.

inter_layer_ref_pic_flag[listIdx][rplsIdx][i] equal to 1 specifies that the i-th entry in the ref_pic_list_struct(listIdx, rplsIdx) syntax structure is an Inter-Layer Reference Picture (ILRP) entry. inter_layer_ref_pic_flag[listIdx][rplsIdx][i] equal to 0 specifies that the i-th entry in the ref_pic_list_struct(listIdx, rplsIdx) syntax structure is not an ILRP entry. When not present, the value of inter_layer_ref_pic_flag [listIdx][rplsIdx][i] is inferred to be equal to 0.

st_ref_pic_flag[listIdx][rplsIdx][i] equal to 1 specifies that the i-th entry in the ref_pic_list_struct(listIdx, rplsIdx) syntax structure is an STRP entry. st_ref_pic_flag[listIdx] [rplsIdx][i] equal to 0 specifies that the i-th entry in the ref_pic_list_struct(listIdx, rplsIdx) syntax structure is an LTRP entry. When inter_layer_ref_pic_flag[listIdx][rplsIdx] [i] is equal to 0 and st_ref_pic_flag[listIdx][rplsIdx][i] is not present, the value of st_ref_pic_flag[listIdx][rplsIdx][i] is inferred to be equal to 1.

The variable NumLtrpEntries[listIdx][rplsIdx] is derived as follows:

for(i=0, NumLtrpEntries[listIdx][rplsIdx]=0; i<
num_ref_entries[listIdx][rplsIdx]; i++)
if(
!inter_layer_ref_pic_flag[listIdx][rplsIdx][i] &&!st_re-
f_pic_flag[listIdx][rplsIdx][i]) (151)
NumLtrpEntries[listIdx][rplsIdx]++ abs_delta_poc_st[listIdx][rplsIdx][i] specifies the value of the variable AbsDeltaPocSt[listIdx][rplsIdx][i] as follows:

if(sps_weighted_pred_flag||sps_weighted_bipred_flag)
AbsDeltaPocSt[listIdx][rplsIdx][i]=abs_delta_poc_st
[listIdx][rplsIdx][i]
else
AbsDeltaPocSt[listIdx][rplsIdx][i]=abs_delta_poc_st
[listIdx][rplsIdx][i]+1

The value of abs_delta_poc_st[listIdx][rplsIdx][i] shall be in the range of 0 to $2^{15}-1$, inclusive.

strp_entry_sign_flag[listIdx][rplsIdx][i] equal to 1 specifies that i-th entry in the syntax structure ref_pic_list_struct (listIdx, rplsIdx) has a value greater than or equal to 0. strp_entry_sign_flag[listIdx][rplsIdx][i] equal to 0 specifies that the i-th entry in the syntax structure ref_pic_list_struct (listIdx, rplsIdx) has a value less than 0. When not present, the value of strp_entry_sign_flag[listIdx][rplsIdx][i] is inferred to be equal to 1.

The list DeltaPocValSt[listIdx][rplsIdx] is derived as follows:

for(i=0; i<num_ref_entries[listIdx][rplsIdx]; i++)
if(
!inter_layer_ref_pic_flag[listIdx][rplsIdx][i] && st_re-
f_pic_flag[listIdx][rplsIdx][i])
DeltaPocValSt[listIdx][rplsIdx][i]=(
strp_entry_sign_flag[listIdx][rplsIdx][i])?
AbsDeltaPocSt[listIdx][rplsIdx][i]: 0−
AbsDeltaPocSt[listIdx][rplsIdx][i]

rpls_poc_lsb_lt[listIdx][rplsIdx][i] specifies the value of the picture order count modulo MaxPicOrderCntLsb of the picture referred to by the i-th entry in the ref_pic_list_struct (listIdx, rplsIdx) syntax structure. The length of the rpls_poc_lsb_lt[listIdx][rplsIdx][i] syntax element is log2_max_pic_order_cnt_lsb_minus4+4 bits.

ilrp_idx[listIdx][rplsIdx][i] specifies the index, to the list of the direct reference layers, of the ILRP of the i-th entry in the ref_pic_list_struct(listIdx, rplsIdx) syntax structure. The value of ilrp_idx[listIdx][rplsIdx][i] shall be in the range of 0 to NumDirectRefLayers[GeneralLayerIdx [nuh_layer_id]]−1, inclusive.

Thus, different mechanisms can be used to enable controlling the GEO/TPM merge modes subject to whether WP is applied to the reference pictures where reference blocks P0 and P1 are taken from, namely:

Moving WP parameters listed in Table 14 from SH to PH;

Moving GEO/TPM parameters from PH back to SH;

Changing the semantics of MaxNumTriangleMergeCand, i.e. by setting MaxNumTriangleMergeCand equal to 0 or 1 for such slices when reference pictures with WP can be used (e.g., where at least one of the flags lumaWeightedFlag or is equal to true).

For TPM merge mode, exemplary reference blocks P0 and P1 are denoted by 710 and 720 in FIG. 7, respectively. For GEO merge mode, exemplary reference blocks P0 and P1 are denoted by 810 and 820 in FIG. 8, respectively.

In an embodiment, when WP parameters and enabling of non-rectangular modes (e.g. GEO and TPM) are signalled in picture header, the following syntax may be used, as shown in the table below:

TABLE 11

| Picture header RBSP syntax | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|        ... | |
|   pic_rpl_present_flag | u(1) |
|   if( pic_rpl_present_flag ) { | |
|     for( i = 0; i < 2; i++ ) { | |
|       if( num_ref_pic_lists_in_sps[ i ] > 0 | |
| && !pps_ref_pic_list_sps_idc[ i ] && | |
|         ( i = = 0 \| \| ( i = = 1 && rpl1_idx_present_flag ) ) ) | |
|         pic_rpl_sps_flag[ i ] | u(1) |
|       if( pic_rpl_sps_flag[ i ] ) { | |
|         if( num_ref_pic_lists_in_sps[ i ] > 1 && | |
|           ( i = = 0 \| \| ( i = = 1 && rpl1_idx_present_flag | |
| ) ) ) | |
|           pic_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|       pic_delta_poc_msb_present_flag[ i ][ j ] | u(1) |
|         if( pic_delta_poc_msb_present_flag[ i ][ j ] ) | |
|           pic_delta_poc_msb_cycle_lt[ i ][ j ] | ue(v) |
|       } | |
|     } | |
|   } | |
|   ... | |
|     if( ( pps_weighted_pred_flag && slice_type = = P ) \| \| | |
|     ( pps_weighted_bipred_flag && slice_type = = B ) ) | |
|     pred_weight_table( ) | |
|   ... | |
|   ... | |
|   if( sps_triangle_enabled_flag && MaxNumMergeCand >= 2 && | |
|     !pps_max_num_merge_cand_minus_max_num_triangle_cand_plus1 | |
| && WPDisabled) | |
|     pic_max_num_merge_cand_minus_max_num_triangle_cand | ue(v) |
|   ... | |
|   rbsp_trailing_bits( ) | |
| } | |
| .... | |

The variable WPDisabled is set equal to 1 when all the values of luma_weight_l0_flag[i], chroma_weight_l0_flag[i], luma_weight_l1_flag[j] and chroma_weight_l1_flag[j] are set to zero, the value of i=0 . . . NumRefIdxActive[0]; and the value of j=0 . . . NumRefIdxActive[1]; otherwise, the value of WPDisabled is set equal to 0.

When the variable WPDisabled is set equal to 0, the value of pic_max_num_merge_cand_minus_max_num_triangle_cand is set equal to MaxNumMergeCand In the second embodiment, signaling of WP parameters and enabling of non-rectangular modes (e.g. GEO and TPM) is performed in the slice header. Exemplary syntax is given in the table below:

| | Descriptor |
|---|---|
| slice_header( ) { | |
|   slice_pic_parameter_set_id | ue(v) |
|   if( rect_slice_flag  \| \|  NumBricksInPic > 1 ) | |
|     slice_address | u(v) |
|   if( !rect_slice_flag  &&  !single_brick_per_slice_flag ) | |
|     num_bricks_in_slice_minus1 | ue(v) |
|   non_reference_picture_flag | u(1) |
|   slice_type | ue(v) |

-continued

|  | Descriptor |
|---|---|
| if( separate_colour_plane_flag = = 1 ) | |
|   colour_plane_id | u(2) |
| slice_pic_order_cnt_lsb | u(v) |
| if( nal_unit_type  = =  GDR_NUT ) | |
|   recovery_poc_cnt | ue(v) |
| if( nal_unit_type = = IDR_W_RADL \| \| nal_unit_type = = | |
| IDR_N_LP \| \| | |
|   nal_unit_type = = CRA_NUT \| \| NalUnitType = = | |
| GDR_NUT ) | |
|   no_output_of_prior_pics_flag | u(1) |
| if( output_flag_present_flag ) | |
|   pic_output_flag | u(1) |
| if( (nal_unit_type != IDR_W_RADL && nal_unit_type != | |
| IDR_N_LP ) \| \| | |
|   sps_idr_rpl_present_flag ) { | |
|   for( i = 0; i < 2; i++ ) { | |
|    if( num_ref_pic_lists_in_sps[ i ] > 0 | |
| && !pps_ref_pic_list_sps_idc[ i ] && | |
|      ( i = = 0 \| \| ( i = = 1 && | |
| rpl1_idx_present_flag ) ) ) | |
|     ref_pic_list_sps_flag[ i ] | u(1) |
|    if( ref_pic_list_sps_flag[ i ] ) { | |
|     if( num_ref_pic_lists_in_sps[ i ] > 1   && | |
|       ( i = = 0 \| \| ( i = = 1 && rpl1_idx_present_flag | |
| ) ) ) | |
|      ref_pic_list_idx[ i ] | u(v) |
|    } else | |
|     ref_pic_list_struct( i, num_ref_pic_lists_in_sps[ i ] ) | |
|    for( j = 0; j < NumLtrpEntries[ i ][ RplsIdx[ i ] ]; j++ ) { | |
|     if( ltrp_in_slice_header_flag[ i ][ RplsIdx[ i ] ] ) | |
|      slice_poc_lsb_lt[ i ][ j ] | u(v) |
|     delta_poc_msb_present_flag[ i ][ j ] | u(1) |
|     if( delta_poc_msb_present_flag[ i ][ j ] ) | |
|      delta_poc_msb_cycle_lt[ i ][ j ] | ue(v) |
|    } | |
|   } | |
|   if( ( slice_type != I && num_ref_entries[ 0 ][ RplsIdx[ 0 ] ] > 1 ) | |
| \| \| | |
|    ( slice_type = = B && num_ref_entries[ 1 ][ RplsIdx[ 1 ] ] > 1 ) ) | |
| { | |
|    num_ref_idx_active_override_flag | u(1) |
|    if( num_ref_idx_active_override_flag ) | |
|     for( i = 0; i < ( slice_type  = =  B ? 2: 1 ); i++ ) | |
|      if( num_ref_entries[ i ][ RplsIdx[ i ] ] > 1 ) | |
|       num_ref_idx_active_minus1[ i ] | ue(v) |
|   } | |
| } | |
| if( partition_constraints_override_enabled_flag ) { | |
|   partition_constraints_override_flag | ue(v) |
|   if( partition_constraints_override_flag ) { | |
|    slice_log2_diff_min_qt_min_cb_luma | ue(v) |
|    slice_max_mtt_hierarchy_depth_luma | ue(v) |
|    if( slice_max_mtt_hierarchy_depth_luma != 0 ) | |
|     slice_log2_diff_max_bt_min_qt_luma | ue(v) |
|     slice_log2_diff_max_tt_min_qt_luma | ue(v) |
|    } | |
|    if( slice_type = = I   &&   qtbtt_dual_tree_intra_flag ) { | |
|     slice_log2_diff_min_qt_min_cb_chroma | ue(v) |
|     slice_max_mtt_hierarchy_depth_chroma | ue(v) |
|     if( slice_max_mtt_hierarchy_depth_chroma != 0 ) | |
|      slice_log2_diff_max_bt_min_qt_chroma | ue(v) |
|      slice_log2_diff_max_tt_min_qt_chroma | ue(v) |
|     } | |
|    } | |
|   } | |
| } | |
| if ( slice_type  !=  I ) { | |
|   if( sps_temporal_mvp_enabled_flag && | |
| !pps_temporal_mvp_enabled_idc ) | |
|    slice_temporal_mvp_enabled_flag | u(1) |
|   if( slice_type  = =  B  &&  !pps_mvd_l1_zero_idc ) | |
|    mvd_l1_zero_flag | u(1) |
|   if( cabac_init_present_flag ) | |
|    cabac_init_flag | u(1) |
|   if( slice_temporal_mvp_enabled_flag ) { | |
|    if( slice_type  = =  B  && !pps_collocated_from_l0_idc ) | |
|     collocated_from_l0_flag | u(1) |

-continued

|  | Descriptor |
|---|---|
| if( ( collocated_from_10_flag && NumRefIdxActive[ 0 ] > 1 ) \| \|<br>   ( !collocated_from_l0_flag && NumRefIdxActive[ 1 ] > 1 ) )<br>    collocated_ref_idx | ue(v) |
| } |  |
| if( ( pps_weighted_pred_flag && slice_type = = P ) \| \|<br>   ( pps_weighted_bipred_flag && slice_type = = B ) )<br>   slice_weighted_pred_flag | u(1) |
| if (slice_weighted_pred_flag)<br>   pred_weight_table( ) |  |
| if( !pps_six_minus_max_num_merge_cand_plus1 )<br>   six_minus_max_num_merge_cand | ue(v) |
| if( sps_affine_enabled_flag &&<br>    !pps_five_minus_max_num_subblock_merge_cand_plus1 )<br>   five_minus_max_num_subblock_merge_cand | ue(v) |
| if( sps_fpel_mmvd_enabled_flag )<br>   slice_fpel_mmvd_enabled_flag | u(1) |
| if( sps_bdof_dmvr_slice_present_flag )<br>   slice_disable_bdof_dmvr_flag | u(1) |
| if( sps_triangle_enabled_flag && MaxNumMergeCand >= 2 &&<br>    !pps_max_num_merge_cand_minus_max_num_triangle_cand_minus1<br>&& WPDisabled ) {<br>   max_num_merge_cand_minus_max_num_triangle_cand | ue(v) |
|   } |  |
| } |  |
| if ( sps_ibc_enabled_flag )<br>  slice_six_minus_max_num_ibc_merge_cand | ue(v) |
| if( sps_joint_cbcr_enabled_flag)<br>  slice_joint_cbcr_sign_flag | u(1) |
| slice_qp_delta | se(v) |
| if( pps_slice_chroma_qp_offsets_present_flag ) {<br>  slice_cb_qp_offset | se(v) |
|   slice_cr_qp_offset | se(v) |
|   if( sps_joint_cbcr_enabled_flag )<br>    slice_joint_cbcr_qp_offset | se(v) |
| } |  |
| if( sps_sao_enabled_flag ) {<br>  slice_sao_luma_flag | u(1) |
|   if( ChromaArrayType   !=   0 )<br>    slice_sao_chroma_flag | u(1) |
| } |  |
| if( sps_alf_enabled_flag ) {<br>  slice_alf_enabled_flag | u(1) |
|   if( slice_alf_enabled_flag ) {<br>    slice_num_alf_aps_ids_luma | u(3) |
|     for( i = 0; i   <   slice_num_alf_aps_ids_luma; i++ )<br>      slice_alf_aps_id_luma[ i ] | u(3) |
|     if( ChromaArrayType   !=   0 )<br>      slice_alf_chroma_idc | u(2) |
|     if( slice_alf_chroma_idc )<br>      slice_alf_aps_id_chroma | u(3) |
|   } |  |
| } |  |
| if ( !pps_dep_quant_enabled_flag )<br>  dep_quant_enabled_flag | u(1) |
| if( !dep_quant_enabled_flag )<br>  sign_data_hiding_enabled_flag | u(1) |
| if( deblocking_filter_override_enabled_flag )<br>  deblocking_filter_override_flag | u(1) |
| if( deblocking_filter_override_flag ) {<br>  slice_deblocking_filter_disabled_flag | u(1) |
|   if( !slice_deblocking_filter_disabled_flag ) {<br>  slice_beta_offset_div2 | se(v) |
|   slice_tc_offset_div2 | se(v) |
|   } |  |
| } |  |
| if( sps_lmcs_enabled_flag ) {<br>  slice_lmcs_enabled_flag | u(1) |
|   if( slice_lmcs_enabled_flag ) {<br>    slice_lmcs_aps_id | u(2) |
|     if( ChromaArrayType != 0 )<br>      slice_chroma_residual_scale_flag | u(1) |
|   } |  |
| } |  |
| if( sps_scaling_list_enabled_flag ) {<br>  slice_scaling_list_present_flag | u(1) |

-continued

|  | Descriptor |
|---|---|
|     if( slice_scaling_list_present_flag ) | |
|       slice_scaling_list_aps_id | u(3) |
|   } | |
|   if( entry_point_offsets_present_flag  &&  NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

....

The variable WPDisabled is set equal to 1 when all the values of luma_weight_l0_flag[i], chroma_weight_l0_flag[i], luma_weight_l1_flag[j] and chroma_weight_l1_flag[j] are set to zero, the value of i=0 . . . NumRefIdxActive[0]; and the value of j=0 . . . NumRefIdxActive[1]; otherwise, the value of WPDisabled is set equal to 0.

When the variable WPDisabled is set equal to 0, the value of max_num_merge_cand_minus_max_num_triangle_cand is set equal to MaxNumMergeCand In the embodiment discloses above weighted prediction parameters may be signaled in either picture header or in a slice header.

In the third embodiment, determination of whether a TPM or GEO is enabled is performed with consideration of the reference picture lists that a block may use for non-rectangular weighted prediction. When a merge list for a block contains elements from only one reference picture list k, a value of variable WPDisabled [k] determines whether this merge mode is enabled or not.

In a forth embodiment, merge list for non-rectangular inter-prediction mode is constructed in such a way that it contains only elements for which weighted prediction is not enabled.

The following part of specification exemplifies the fourth embodiment:

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are as follows, with X being 0 or 1:

the availability flags availableFlagA$_0$, availableFlagA$_1$, availableFlagB$_0$, availableFlagB$_1$ and availableFlagB$_2$ of the neighbouring coding units, the reference indices refIdxLXA$_0$, refIdxLXA$_1$, refIdxLXB$_0$, refIdxLXB$_1$ and refIdxLXB$_2$ of the neighbouring coding units, the prediction list utilization flags predFlagLXA$_0$, predFlagLXA$_1$, predFlagLXB$_0$, predFlagLXB$_1$ and predFlagLXB$_2$ of the neighbouring coding units, the motion vectors in 1/16 fractional-sample accuracy mvLXA$_0$, mvLXA$_1$, mvLXB$_0$, mvLXB$_1$ and mvLXB$_2$ of the neighbouring coding units, the half sample interpolation filter indices hpelIfIdxA$_0$, hpelIfIdxA$_1$, hpelIfIdxB$_0$, hpelIfIdxB$_1$, and hpelIfIdxB$_2$, the bi-prediction weight indices bcwIdxA$_0$, bcwIdxA$_1$, bcwIdxB$_0$, bcwIdxB$_1$, and bcwIdxB$_2$.

For the derivation of availableFlagB$_1$, refIdxLXB$_1$, predFlagLXB$_1$, mvLXB$_1$, hpelIfIdxB$_1$ and bcwIdxB$_1$ the following applies:

The luma location (xNbB$_1$, yNbB$_1$) inside the neighbouring luma coding block is set equal to (xCb+cbWidth−1, yCb−1).

The derivation process for neighbouring block availability as specified in clause 6.4.4 is invoked with the current luma location (xCurr, yCurr) set equal to (xCb, yCb), the neighbouring luma location (xNbB$_1$, yNbB$_1$), checkPredModeY set equal to TRUE, and cIdx set equal to 0 as inputs, and the output is assigned to the block availability flag availableB$_1$.

The variables availableFlagB$_1$, refIdxLXB$_1$, predFlagLXB$_1$, mvLXB$_1$, hpelIfIdxB$_1$ and bcwIdxB$_1$ are derived as follows:

If availableB$_1$ is equal to FALSE, availableFlagB$_1$ is set equal to 0, both components of mvLXB$_1$ are set equal to 0, refIdxLXB$_1$ is set equal to −1 and predFlagLXB$_1$ is set equal to 0, with X being 0 or 1, hpelIfIdxB$_1$ is set equal to 0, and bcwIdxB$_1$ is set equal to 0.

Otherwise, availableFlagB$_1$ is set equal to 1 and the following assignments are made:

$$mvLXB_1 = MvLX[xNbB_1][yNbB_1] \quad (501)$$

$$refIdxLXB_1 = RefIdxLX[xNbB_1][yNbB_1] \quad (502)$$

$$predFlagLXB_1 = PredFlagLX[xNbB_1][yNbB_1] \quad (503)$$

$$hpelIfIdxB_1 = HpelIfIdx[xNbB_1][yNbB_1] \quad (504)$$

$$bcwIdxB_1 = BcwIdx[xNbB_1][yNbB_1] \quad (505)$$

For the derivation of availableFlagA$_1$, refIdxLXA$_1$, predFlagLXA$_1$, mvLXA$_1$, hpelIfIdxA$_1$ and bcwIdxA$_1$ the following applies:

The luma location (xNbA$_1$, yNbA$_1$) inside the neighbouring luma coding block is set equal to (xCb−1, yCb+cbHeight−1).

The derivation process for neighbouring block availability as specified in clause 6.4.4 is invoked with the current luma location (xCurr, yCurr) set equal to (xCb, yCb). the neighbouring luma location (xNbA$_1$, yNbA$_1$), checkPredModeY set equal to TRUE, and cIdx set equal to 0 as inputs, and the output is assigned to the block availability flag availableA$_1$.

The variables availableFlagA$_1$, refIdxLXA$_1$, pred-FlagLXA$_1$, mvLXA$_1$, hpelIfIdxA$_1$ and bcwIdxA$_1$ are derived as follows:

If one or more of the following conditions are true, availableFlagA$_1$ is set equal to 0, both components of mvLXA$_1$ are set equal to 0, refIdxLXA$_1$ is set equal to −1 and predFlagLXA$_1$ is set equal to 0, with X being 0 or 1, hpelIfIdxA$_1$ is set equal to 0, and bcwIdxA$_1$ is set equal to 0:

availableA$_1$ is equal to FALSE.

availableB$_1$ is equal to TRUE and the luma locations (xNbA$_1$, yNbA$_1$) and (xNbB$_1$, yNbB$_1$) have the same motion vectors and the same reference indices.

WPDisabledX[RefIdxLX[xNbA$_1$][yNbA$_1$]] is set to 0 and merge mode is non-rectangular (e.g. triangle flag is set equal to 1 for the blook in the current luma location (xCurr, yCurr))

WPDisabledX[RefIdxLX[xNbB$_1$][yNbB$_1$]] is set to 0 and merge mode is non-rectangular (e.g. triangle flag is set equal to 1 for the blook in the current luma location (xCurr, yCurr))

Otherwise, availableFlagA$_1$ is set equal to 1 and the following assignments are made:

$$mvLXA_1 = MvLX[xNbA_1][yNbA_1] \qquad (506)$$

$$refIdxLXA_1 = RefIdxLX[xNbA_1][yNbA_1] \qquad (507)$$

$$predFlagLXA_1 = PredFlagLX[xNbA_1][yNbA_1] \qquad (508)$$

$$hpelIfIdxA_1 = HpelIfIdx[xNbA_1][yNbA_1] \qquad (509)$$

$$bcwIdxA_1 = BcwIdx[xNbA_1][yNbA_1] \qquad (510)$$

For the derivation of availableFlagB$_0$, refIdxLXB$_0$, predFlagLXB$_0$, mvLXB$_0$, hpelIfIdxB$_0$ and bcwIdxB$_0$ the following applies:

The luma location (xNbB$_0$, yNbB$_0$) inside the neighbouring luma coding block is set equal to (xCb+cbWidth, yCb−1).

The derivation process for neighbouring block availability as specified in clause 6.4.4 is invoked with the current luma location (xCurr, yCurr) set equal to (xCb, yCb), the neighbouring luma location (xNbB$_0$, yNbB$_0$), checkPredModeY set equal to TRUE, and cIdx set equal to 0 as inputs, and the output is assigned to the block availability flag availableB$_0$.

The variables availableFlagB$_0$, refIdxLXB$_0$, pred-FlagLXB$_0$, mvLXB$_0$, hpelIfIdxB$_0$ and bcwIdxB$_0$ are derived as follows:

If one or more of the following conditions are true, availableFlagB$_0$ is set equal to 0, both components of mvLXB$_0$ are set equal to 0, refIdxLXB$_0$ is set equal to −1 and predFlagLXB$_0$ is set equal to 0, with X being 0 or 1, hpelIfIdxB$_0$ is set equal to 0, and bcwIdxB$_0$ is set equal to 0:

availableB$_0$ is equal to FALSE.

availableB$_1$ is equal to TRUE and the luma locations (xNbB$_1$, yNbB$_1$) and (xNbB$_0$, yNbB$_0$) have the same motion vectors and the same reference indices.

WPDisabledX[RefIdxLX[xNbB$_0$][yNbB$_0$]] is set to 0 and merge mode is non-rectangular (e.g. triangle flag is set equal to 1 for the blook in the current luma location (xCurr, yCurr))

WPDisabledX[RefIdxLX[xNbB$_1$][yNbB$_1$]] is set to 0 and merge mode is non-rectangular (e.g. triangle flag is set equal to 1 for the blook in the current luma location (xCurr, yCurr))

Otherwise, availableFlagB$_0$ is set equal to 1 and the following assignments are made:

$$mvLXB_0 = MvLX[xNbB_0][yNbB_0] \qquad (511)$$

$$refIdxLXB_0 = RefIdxLX[xNbB_0][yNbB_0] \qquad (512)$$

$$predFlagLXB_0 = PredFlagLX[xNbB_0][yNbB_0] \qquad (513)$$

$$hpelIfIdxB_0 = HpelIfIdx[xNbB_0][yNbB_0] \qquad (514)$$

$$bcwIdxB_0 = BcwIdx[xNbB_0][yNbB_0] \qquad (515)$$

For the derivation of availableFlagA$_0$, refIdxLXA$_0$, predFlagLXA$_0$, mvLXA$_0$, hpelIfIdxA$_0$ and bcwIdxA$_0$ the following applies:

The luma location (xNbA$_0$, yNbA$_0$) inside the neighbouring luma coding block is set equal to (xCb−1, yCb+cbWidth).

The derivation process for neighbouring block availability as specified in clause 6.4.4 is invoked with the current luma location (xCurr, yCurr) set equal to (xCb, yCb). the neighbouring luma location (xNbA$_0$, yNbA$_0$), checkPredModeY set equal to TRUE, and cIdx set equal to 0 as inputs, and the output is assigned to the block availability flag availableA$_0$.

The variables availableFlagA$_0$, refIdxLXA$_0$, pred-FlagLXA$_0$, mvLXA$_0$, hpelIfIdxA$_0$ and bcwIdxA$_0$ are derived as follows:

If one or more of the following conditions are true, availableFlagA$_0$ is set equal to 0, both components of mvLXA$_0$ are set equal to 0, refIdxLXA$_0$ is set equal to −1 and predFlagLXA$_0$ is set equal to 0, with X being 0 or 1, hpelIfIdxA$_0$ is set equal to 0, and bcwIdxA$_0$ is set equal to 0:

availableA$_0$ is equal to FALSE.

availableA$_1$ is equal to TRUE and the luma locations (xNbA$_1$, yNbA$_1$) and (xNbA$_0$, yNbA$_0$) have the same motion vectors and the same reference indices.

WPDisabledX[RefIdxLX[xNbA$_0$][yNbA$_0$]] is set to 0 and merge mode is non-rectangular (e.g. triangle flag is set equal to 1 for the blook in the current luma location (xCurr, yCurr))

WPDisabledX[RefIdxLX[xNbA$_1$][yNbA$_1$]] is set to 0 and merge mode is non-rectangular (e.g. triangle flag is set equal to 1 for the blook in the current luma location (xCurr, yCurr))

Otherwise, availableFlagA$_0$ is set equal to 1 and the following assignments are made:

$$mvLXA_0 = MvLX[xNbA_0][yNbA_0] \qquad (516)$$

$$refIdxLXA_0 = RefIdxLX[xNbA_0][yNbA_0] \qquad (517)$$

$$predFlagLXA_0 = PredFlagLX[xNbA_0][yNbA_0] \qquad (518)$$

-continued $$hpelIfIdxA_0 = HpelIfIdx[xNbA_0][yNbA_0] \quad (519)$$

$$bcwIdxA_0 = BcwIdx[xNbA_0][yNbA_0] \quad (520)$$

For the derivation of availableFlagB$_2$, refIdxLXB$_2$, predFlagLXB$_2$, mvLXB$_2$, hpelIfIdxB$_2$ and bcwIdxB$_2$ the following applies:

The luma location (xNbB$_2$, yNbB$_2$) inside the neighbouring luma coding block is set equal to (xCb−1, yCb−1).

The derivation process for neighbouring block availability as specified in clause 6.4.4 is invoked with the current luma location (xCurr, yCurr) set equal to (xCb, yCb), the neighbouring luma location (xNbB$_2$, yNbB$_2$), checkPredModeY set equal to TRUE, and cIdx set equal to 0 as inputs, and the output is assigned to the block availability flag availableB$_2$.

The variables availableFlagB$_2$, refIdxLXB$_2$, predFlagLXB$_2$, mvLXB$_2$, hpelIfIdxB$_2$ and bcwIdxB$_2$ are derived as follows:

If one or more of the following conditions are true, availableFlagB$_2$ is set equal to 0, both components of mvLXB$_2$ are set equal to 0, refIdxLXB$_2$ is set equal to −1 and predFlagLXB$_2$ is set equal to 0, with X being 0 or 1, hpelIfIdxB$_2$ is set equal to 0, and bcwIdxB$_2$ is set equal to 0:

availableB$_2$ is equal to FALSE.

availableA$_1$ is equal to TRUE and the luma locations (xNbA$_1$, yNbA$_1$) and (xNbB$_2$, yNbB$_2$) have the same motion vectors and the same reference indices.

availableB$_1$ is equal to TRUE and the luma locations (xNbB$_1$, yNbB$_1$) and (xNbB$_2$, yNbB$_2$) have the same motion vectors and the same reference indices.

availableFlagA$_0$+availableFlagA$_1$+availableFlagB$_0$+availableFlagB$_1$ is equal to 4.

WPDisabledX[RefIdxLX[xNbB$_1$][yNbB$_1$]] is set to 0 and merge mode is non-rectangular (e.g. triangle flag is set equal to 1 for the blook in the current luma location (xCurr, yCurr))

WPDisabledX[RefIdxLX[xNbB$_2$][yNbB$_2$]] is set to 0 and merge mode is non-rectangular (e.g. triangle flag is set equal to 1 for the blook in the current luma location (xCurr, yCurr))

Otherwise, availableFlagB$_2$ is set equal to 1 and the following assignments are made:

$$mvLXB_2 = MvLX[xNbB_2][yNbB_2] \quad (521)$$

$$refIdxLXB_2 = RefIdxLX[xNbB_2][yNbB_2] \quad (522)$$

$$predFlagLXB_2 = PredFlagLX[xNbB_2][yNbB_2] \quad (523)$$

$$hpelIfIdxB_2 = HpelIfIdx[xNbB_2][yNbB_2] \quad (524)$$

$$bcwIdxB_2 = BcwIdx[xNbB_2][yNbB_2] \quad (525)$$

In the embodiment disclosed above the following variable definition is used:

The variable WPDisabled0[i] is set equal to 1 when all the values of luma_weight_l0_flag[i] and chroma_weight_l0_flag[i] are set to zero, the value of i=0 . . . NumRefIdxActive[0]. Otherwise, the value of WPDisabled0[i] is set equal to 0.

The variable WPDisabled1[i] is set equal to 1 when all the values of luma_weight_l1_flag[i] and chroma_weight_l1_flag[i] are set to zero, the value of i=0 . . . NumRefIdxActive[1]. Otherwise, the value of WPDisabled1[i] is set equal to 0.

In another embodiments, variable SliceMaxNumTriangleMergeCand is defined at slice header in accordance with one of the following:

SliceMaxNumTriangleMergeCand=(lumaWeightedFlag||chromaWeightedFlag)?0: MaxNumTriangleMergeCand;

SliceMaxNumTriangleMergeCand=(lumaWeightedFlag||chromaWeightedFlag)? 1: MaxNumTriangleMergeCand;

SliceMaxNumTriangleMergeCand=slice_weighted_pred_flag? 0: MaxNumTriangleMergeCand;

or

SliceMaxNumTriangleMergeCand=slice_weighted_pred_flag? 1: MaxNumTriangleMergeCand Different embodiments use different cases listed above.

The value of this variable is further used in parsing of the merge information at the block level. Exemplary syntax is given in the table below:

|  | Descriptor |
|---|---|
| merge_data( x0, y0, cbWidth, cbHeight, chType ) { | |
|   if ( CuPredMode[ chType ][ x0 ][ y0 ]  = =  MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ]  = =  1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( (sps_ciip_enabled_flag && cu_skip_flag[ x0 ][ y0 ] = = 0 && cbWidth < 128 && cbHeight < 128)|| | |
|       ( sps_triangle_enabled_flag && SliceMaxNumTriangleMergeCand > 1 && slice_type = = B ) ) ) | |
|         regular_merge_flag[ x0 ][ y0 ] | ae(v) |
|       if ( regular_merge_flag[ x0 ][ y0 ] = = 1 ){ | |
|         if( sps_mmvd_enabled_flag ) | |
|           mmvd_merge_flag[ x0 ][ y0 ] | ae(v) |

|  | Descriptor |
|---|---|
| if( mmvd_merge_flag[ x0 ][ y0 ] = = 1 ) { |  |
| if( MaxNumMergeCand > 1 ) |  |
| mmvd_cand_flag[ x0 ][ y0 ] | ae(v) |
| mmvd_distance_idx[ x0 ][ y0 ] | ae(v) |
| mmvd_direction_idx[ x0 ][ y0 ] | ae(v) |
| } else { |  |
| if( MaxNumMergeCand > 1 ) |  |
| merge_idx[ x0 ][ y0 ] | ae(v) |
| } |  |
| } else { |  |
| if( sps_ciip_enabled_flag && sps_triangle_enabled_flag && |  |
| SliceMaxNumTriangleMergeCand > 1 && weightedPredFlag = = |  |
| 0 && |  |
| slice_type = = B && cu_skip_flag[ x0 ][ y0 ] = = 0 && |  |
| ( cbWidth * cbHeight ) >= 64 && cbWidth < 128 && |  |
| cbHeight < 128 ) { |  |
| ciip_flag[ x0 ][ y0 ] | ae(v) |
| if( ciip_flag[ x0 ][ y0 ]   &&   MaxNumMergeCand > 1 ) |  |
| merge_idx[ x0 ][ y0 ] | ae(v) |
| if( !ciip_flag[ x0 ][ y0 ] && SliceMaxNumTriangleMergeCand > 1 ) |  |
| { |  |
| merge_triangle_split_dir[ x0 ][ y0 ] | ae(v) |
| merge_triangle_idx0[ x0 ][ y0 ] | ae(v) |
| merge_triangle_idx1[ x0 ][ y0 ] | ae(v) |
| } |  |
| } |  |
| } |  |
| } |  |
| } |  |

For the cases whe non-rectangular inter prediction mode is a GEO mode, the following embodiments are described further.

Thus, different mechanisms can be used to enable controlling the GEO/TPM merge modes subject to whether WP is applied to the reference pictures where reference blocks P0 and P1 are taken from, namely:

Moving WP parameters listed in Table 14 from SH to PH;
  Moving GEO parameters from PH back to SH;
  Changing the semantics of MaxNumGeoMergeCand, i.e. by setting MaxNumGeoMergeCand equal to 0 or 1 for such slices when reference pictures with WP can be used (e.g., where at least one of the flags lumaWeightedFlag or is equal to true).

For GEO merge mode, exemplary reference blocks P0 and P1 are denoted by 810 and 820 in FIG. 8, respectively.

In an embodiment, when WP parameters and enabling of non-rectangular modes (e.g. GEO and TPM) are signalled in picture header, the following syntax may be used, as shown in the table below:

TABLE 11

| Picture header RBSP syntax | |
|---|---|
|  | Descriptor |
| picture_header_rbsp( ) { |  |
| non_reference_picture_flag | u(1) |
| gdr_pic_flag | u(1) |
| no_output_of_prior_pics_flag | u(1) |
| if( gdr_pic_flag ) |  |
| recovery_poc_cnt | ue(v) |
| ph_pic_parameter_set_id | ue(v) |
| if( sps_poc_msb_flag ) { |  |
| ph_poc_msb_present_flag | u(1) |
| if( ph_poc_msb_present_flag ) |  |
| poc_msb_val | u(v) |
| } |  |
| ... |  |
| pic_rpl_present_flag | u(1) |
| if( pic_rpl_present_flag ) { |  |
| for( i = 0; i < 2; i++ ) { |  |
| if( num_ref_pic_lists_in_sps[ i ] > 0 |  |
| && !pps_ref_pic_list_sps_idc[ i ] && |  |
| ( i = = 0 | | ( i = = 1 && rpl1_idx_present_flag ) ) ) |  |
| pic_rpl_sps_flag[ i ] | u(1) |

TABLE 11-continued

| Picture header RBSP syntax | |
| --- | --- |
| | Descriptor |
| if( pic_rpl_sps_flag[ i ] ) { | |
| if( num_ref_pic_lists_in_sps[ i ] > 1 && | |
| ( i = = 0 \| \| ( i = = 1 && rpl1_idx_present_flag | |
| ) ) ) | |
| pic_rpl_idx[ i ] | u(v) |
| } else | |
| ref_pic_list_struct( i, num_ref_pic_lists_in_sps[ i ] ) | |
| for( j = 0; j < NumLtrpEntries[ i ][ RplsIdx[ i ] ]; j++ ) { | |
| if( ltrp_in_slice_header_flag[ i ][ RplsIdx[ i ] ] ) | |
| pic_poc_lsb_lt[ i ][ j ] | u(v) |
| pic_delta_poc_msb_present_flag[ i ][ j ] | u(1) |
| if( pic_delta_poc_msb_present_flag[ i ][ j ] ) | |
| pic_delta_poc_msb_cycle_lt[ i ][ j ] | ue(v) |
| } | |
| } | |
| } | |
| ... | |
| if( ( pps_weighted_pred_flag && slice_type = = P ) \| \| | |
| ( pps_weighted_bipred_flag && slice_type = = B ) ) | |
| pred_weight_table( ) | |
| ... | |
| ... | |
| if( sps_triangle_enabled_flag && MaxNumMergeCand >= 2 && | |
| !pps_max_num_merge_cand_minus_max_num_triangle_cand_plus1 | |
| && WPDisabled) | |
| pic_max_num_merge_cand_minus_max_num_triangle_cand | ue(v) |
| ... | |
| rbsp_trailing_bits( ) | |
| } | |

The variable WPDisabled is set equal to 1 when all the values of luma_weight_l0_flag[i]. chroma_weight_l0_flag[i]. luma_weight_l1_flag[j] and chroma_weight_l1_flag[j] are set to zero, the value of i=0 . . . NumRefIdxActive[0]; and the value of j=0 . . . NumRefIdxActive[1]; otherwise, the value of WPDisabled is set equal to 0.

When the variable WPDisabled is set equal to 0, the value of pic_max_num_merge_cand_minus_max_num_geo_cand is set equal to MaxNumMergeCand.

In another embodiment, pic_max_num_merge_cand_minus_max_num_geo_cand is set equal to MaxNumMergeCand−1.

In the second embodiment, signaling of WP parameters and enabling of non-rectangular modes (e.g. GEO and TPM) is performed in the slice header. Exemplary syntax is given in the table below:

| | Descriptor |
| --- | --- |
| slice_header( ) { | |
| slice_pic_order_cnt_lsb | u(v) |
| if( subpics_present_flag ) | |
| slice_subpic_id | u(v) |
| if( rect_slice_flag \| \| NumTilesInPic > 1 ) | |
| slice_address | u(v) |
| if( !rect_slice_flag && NumTilesInPic > 1 ) | |
| num_tiles_in_slice_minus1 | ue(v) |
| slice_type | ue(v) |
| if( !pic_rpl_present_flag &&( ( nal_unit_type != IDR_W_RADL && nal_unit_type != | |
| IDR_N_LP ) \| \| sps_idr_rpl_present_flag ) ) { | |
| for( i = 0; i < 2; i++ ) { | |
| if( num_ref_pic_lists_in_sps[ i ] > 0 && !pps_ref_pic_list_sps_idc[ i ] && | |
| ( i = = 0 \| \| ( i = = 1 && rpl1_idx_present_flag ) ) ) | |
| slice_rpl_sps_flag[ i ] | u(1) |
| if( slice_rpl_sps_flag[ i ] ) { | |
| if( num_ref_pic_lists_in_sps[ i ] > 1 && | |
| ( i = = 0 \| \| ( i = = 1 && rpl1_idx_present_flag ) ) ) | |
| slice_rpl_idx[ i ] | u(v) |
| } else | |
| ref_pic_list_struct( i, num_ref_pic_lists_in_sps[ i ] ) | |
| for( j = 0; j < NumLtrpEntries[ i ][ RplsIdx[ i ] ]; j++ ) { | |
| if( ltrp_in_slice_header_flag[ i ][ RplsIdx[ i ] ] ) | |
| slice_poc_lsb_lt[ i ][ j ] | u(v) |
| slice_delta_poc_msb_present_flag[ i ][ j ] | u(1) |

-continued

| | Descriptor |
|---|---|
|       if( slice_delta_poc_msb_present_flag[ i ][ j ] ) | |
|         slice_delta_poc_msb_cycle_lt[ i ][ j ] | ue(v) |
|       } | |
|     } | |
|   } | |
|   if( pic_rpl_present_flag \|\| ( ( nal_unit_type != IDR_W_RADL && | |
| nal_unit_type != | |
|     IDR_N_LP ) \|\| sps_idr_rpl_present_flag ) ) { | |
|     if( ( slice_type != I && num_ref_entries[ 0 ][ RplsIdx[ 0 ] ] > 1 ) \|\| | |
|     ( slice_type = = B && num_ref_entries[ 1 ][ RplsIdx[ 1 ] ] > 1 ) ) { | |
|       num_ref_idx_active_override_flag | u(1) |
|       if( num_ref_idx_active_override_flag ) | |
|         for( i = 0; i < ( slice_type  = =  B ? 2: 1 ); i++ ) | |
|           if( num_ref_entries[ i ][ RplsIdx[ i ] ] > 1 ) | |
|             num_ref_idx_active_minus1[ i ] | ue(v) |
|     } | |
|   } | |
|   if( slice_type  !=  I ) { | |
|     if( cabac_init_present_flag ) | |
|       cabac_init_flag | u(1) |
|     if( pic_temporal_mvp_enabled_flag ) { | |
|       if( slice_type  = =  B  && !pps_collocated_from_l0_idc ) | |
|         collocated_from_l0_flag | u(1) |
|       if( ( collocated_from_l0_flag && NumRefIdxActive[ 0 ] > 1 ) \|\| | |
|       ( !collocated_from_l0_flag && NumRefIdxActive[ 1 ] > 1 ) ) | |
|         collocated_ref_idx | ue(v) |
|     } | |
|     if (slice_weighted_pred_flag) | |
|       pred_weight_table( ) | |
|     if( !pps_six_minus_max_num_merge_cand_plus1 ) | |
|       six_minus_max_num_merge_cand | ue(v) |
|     if( sps_affine_enabled_flag && | |
|         !pps_five_minus_max_num_subblock_merge_cand_plus1 ) | |
|       five_minus_max_num_subblock_merge_cand | ue(v) |
|     if( sps_fpel_mmvd_enabled_flag ) | |
|       slice_fpel_mmvd_enabled_flag | u(1) |
|     if( sps_bdof_dmvr_slice_present_flag ) | |
|       slice_disable_bdof_dmvr_flag | u(1) |
|     if( sps_triangle_enabled_flag && MaxNumMergeCand >= 2 && | |
|   !pps_max_num_merge_cand_minus_max_num_triangle_cand_minus1 && | |
| WPDisabled ) { | |
|       max_num_merge_cand_minus_max_num_geo_cand | ue(v) |
|     } | |
| ... | |
|   } | |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   if( pps_cu_chroma_qp_offset_list_enabled_flag ) | |
|     cu_chroma_qp_offset_enabled_flag | u(1) |
|   if( sps_sao_enabled_flag  &&  !pic_sao_enabled_present_flag ) { | |
|     slice_sao_luma_flag | u(1) |
|     if( ChromaArrayType  !=  0 ) | |
|       slice_sao_chroma_flag | u(1) |
|   } | |
|   if( sps_alf_enabled_flag  &&  !pic_alf_enabled_present_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType  !=  0 ) | |
|         slice_alf_chroma_idc | u(2) |
|       if( slice_alf_chroma_idc ) | |
|         slice_alf_aps_id_chroma | u(3) |
|     } | |
|   } | |
|   if( deblocking_filter_override_enabled_flag && | |
|         !pic_deblocking_filter_override_present_flag ) | |
|     slice_deblocking_filter_override_flag | u(1) |
|   if( slice_deblocking_filter_override_flag ) { | |
|     slice_deblocking_filter_disabled_flag | u(1) |

-continued

|                                                                                      | Descriptor |
|--------------------------------------------------------------------------------------|------------|
|    if( !slice_deblocking_filter_disabled_flag ) {                     |            |
|    slice_beta_offset_div2                                             | se(v)      |
|    slice_tc_offset_div2                                               | se(v)      |
|    }                                                                  |            |
|  }                                                                              |            |
| if( entry_point_offsets_present_flag  &&  NumEntryPoints > 0 ) {                     |            |
|   offset_len_minus1                                                        | ue(v)      |
|   for( i = 0; i < NumEntryPoints; i++ )                                    |            |
|     entry_point_offset_minus1[ i ]                               | u(v)       |
|  }                                                                              |            |
| if( slice_header_extension_present_flag ) {                                          |            |
|   slice_header_extension_length                                            | ue(v)      |
|   for( i = 0; i < slice_header_extension_length; i++)                      |            |
|     slice_header_extension_data_byte[ i ]                        | u(8)       |
|  }                                                                              |            |
|  byte_alignment( )                                                              |            |
| }                                                                                    |            |

The variable WPDisabled is set equal to 1 when all the values of luma_weight_l0_flag[i], chroma_weight_l0_flag [i], luma_weight_l1_flag[j] and chroma_weight_l1_flag[j] are set to zero, the value of i=0 . . . NumRefIdxActive[0]; and the value of j=0 . . . NumRefIdxActive[1]; otherwise, the value of WPDisabled is set equal to 0.

When the variable WPDisabled is set equal to 0, the value of max_num_merge_cand_minus_max_num_geo_cand is set equal to MaxNumMergeCand.

In another embodiment, when the variable WPDisabled is set equal to 0, the value of max_num_merge_cand_minus_ max_num_geo_cand is set equal to MaxNumMergeCand−1.

In the embodiment discloses above weighted prediction paramters may be signaled in either picture header or in a slice header.

In another embodiments, variable SliceMaxNumGeoMergeCand is defined at slice header in accordance with one of the following:

SliceMaxNumGeoMergeCand=(lumaWeighted-Flag||chromaWeightedFlag)? 0: MaxNumGeoMerge-Cand;

SliceMaxNumGeoMergeCand=(lumaWeighted-Flag||chromaWeightedFlag)? 1: MaxNumGeoMerge-Cand;

SliceMaxNumGeoMergeCand=slice_weighted_pred_flag? 0: MaxNumGeoMergeCand;

or

SliceMaxNumGeoMergeCand=slice_weighted_pred_flag? 1: MaxNumGeoMergeCand

Different embodiments use different cases listed above.

The value of this variable is further used in parsing of the merge information at the block level. Exemplary syntax is given in the table below:

7.3.9.7 Merge Data Syntax

|                                                                                               | Descriptor |
|-----------------------------------------------------------------------------------------------|------------|
| merge data( x0, y0, cbWidth, cbHeight, chType ) {                                             |            |
|  if( CuPredMode[ chType ][ x0 ][ y0 ]  ==  MODE_IBC ) {                                  |            |
|   if( MaxNumIbcMergeCand > 1 )                                                      |            |
|    merge_idx[ x0 ][ y0 ]                                                       | ae(v)      |
|  } else {                                                                                |            |
|   if( MaxNumSubblockMergeCand > 0 && cbWidth >= 8 &&                                |            |
| cbHeight >= 8 )                                                                               |            |
|    merge_subblock_flag[ x0 ][ y0 ]                                             | ae(v)      |
|    if( merge_subblock_flag[ x0 ][ y0 ]  ==  1 ) {                              |            |
|     if( MaxNumSubblockMergeCand > 1 )                                     |            |
|      merge_subblock_idx[ x0 ][ y0 ]                                  | ae(v)      |
|    } else {                                                                    |            |
|     if( (sps_ciip_enabled_flag &&                                         |            |
|      cu_skip_flag[ x0 ][ y0 ] == 0 && ( cbWidth *cbHeight ) >= 64    |            |
| && cbWidth < 128 && cbHeight < 128 ) ||                                                       |            |
|      ( sps_geo_enabled_flag && SliceMaxNumGeoMergeCand > 1 &&        |            |
|       cbWidth>=8 && cbHeight >=8 && slice_type == B ) )         |            |
|      regular_merge_flag[ x0 ][ y0 ]                                  | ae(v)      |
|     if( regular_merge_flag[ x0 ][ y0 ]  ==  1 ) {                         |            |
|      if( sps_mmvd_enabled_flag )                                     |            |
|       mmvd_merge_flag[ x0 ][ y0 ]                               | ae(v)      |

-continued

| | Descriptor |
|---|---|
| if( mmvd_merge_flag[ x0 ][ y0 ]  = =  1 ) { | |
|    if( MaxNumMergeCand > 1 ) | |
|       mmvd_cand_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|    } else if( MaxNumMergeCand > 1 ) | |
|       merge_idx[ x0 ][ y0 ] | ae(v) |
|    } else { | |
|     if( sps_ciip_enabled_flag && sps_geo_enabled_flag && | |
|       SliceMaxNumGeoMergeCand > 1 && slice_type = = B && | |
|       cu_skip_flag[ x0 ][ y0 ] = = 0 && | |
|       cbWidth >= 8 && cbHeight  >= 8 && cbWidth < 128 && | |
| cbHeight < 128 ) | |
|       ciip_flag[ x0 ][ y0 ] | ae(v) |
|     if( ciip_flag[ x0 ][ y0 ]  && | |
|     MaxNumMergeCand > 1 ) | |
|       merge_idx[ x0 ][ y0 ] | ae(v) |
|     if( !ciip_flag[ x0 ][ y0 ]  &&  SliceMaxNumGeoMergeCand > 1 ) { | |
|       merge_geo_partition_idx[ x0 ][ y0 ] | ae(v) |
|       merge_geo_idx0[ x0 ][ y0 ] | ae(v) |
|       if( SliceMaxNumGeoMergeCand > 2 ) | |
|          merge_geo_idx1[ x0 ][ y0 ] | ae(v) |
|     } | |
|    } | |
|   } | |
|  } | |
| } | |

Related picture header semantics is as follows:

pic_max_num_merge_cand_minus_max_num_geo_cand specifies the maximum number of geo merge mode candidates supported in the slices associated with the pictur header subtracted from MaxNumMergeCand.

When pic_max_num_merge_cand_minus_max_num_geo_cand is not present, and sps_geo_enabled_flag is equal to 1 and MaxNumMergeCand greater than or equal to 2, pic_max_num_merge_cand_minus_max_num_geo_cand is inferred to be equal to pps_max_num_merge_cand_minus_max_num_geo_cand_plus1−1.

The maximum number of geo merge mode candidates, MaxNumGeoMergeCand is derived as follows:

$$MaxNumGeoMergeCand = MaxNumMergeCand -$$ (87)

$$pic\_max\_num\_merge\_cand\_minus\_max\_num\_geo\_cand$$

When pic_max_num_merge_cand_minus_max_num_geo_cand is present, the value of MaxNumGeoMergeCand shall be in the range of 2 to MaxNumMergeCand, inclusive.

When pic_max_num_merge_cand_minus_max_num_geo_cand is not present, and (sps_geo_enabled_flag is equal to 0 or MaxNumMergeCand is less than 2), MaxNumGeoMergeCand is set equal to 0.

When MaxNumGeoMergeCand is equal to 0, geo merge mode is not allowed for the slices associated with the PH.

In the following embodiments, several signaling-related aspects are considered. Namely, these aspects are as follows:

syntax elements related to number of candidates for merge mode ( ) are signaled in the sequence parameter set (SPS), that makes it possible for particular embodiments to derive number of non-rectangular mode merge candidates (MaxNumGeoMergeCand) at the SPS level;

PH could be signaled in SH, when a picture comprises just one slice;

Define a PH/SH parameter override mechanism with the following as follow:

The PPS flags that specify whether a syntax element of a related coding tool is present in either PH or SH (but not both).

Particularly, reference picture list and weighted prediction table could use this mechanism the prediction weight table a fifth type of data that can be signaled either in the PH or SH (like ALF, deblocking, RPL, and SAO);

when weighted prediction is enabled for a picture, all slices of the picture would be required to have the same reference picture lists;

inter- and intra-related syntax elements are conditionally signaled if only certain slice types are used in the picture associated with the PH.

In particular, two flags, pic_inter_slice_present_flag and pic_intra_slice_present_flag are introduced.

In the Embodiment 1, syntax elements related to number of candidates for merge mode ( ) are signaled in the sequence parameter set (SPS), that makes it possible for particular embodiments to derive number of non-rectangular mode merge candidates (MaxNumGeoMergeCand) at the SPS level. This aspect could be implemented by an encoding or decoding process based on the following syntax 7.3.2.3 Sequence Parameter Set RBSP Syntax

| | Descriptor |
|---|---|
| seq_parameter_set_rbsp( ) { | |
|   sps_decoding_parameter_set_id | u(4) |
|   sps_video_parameter_set_id | u(4) |

-continued

| | Descriptor |
|---|---|
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
|    profile_tier_level( 1, sps_max_sublayers_minus1 ) | |
| gdr_enabled_flag | u(1) |
| sps_seq_parameter_set_id | u(4) |
|       ... | |
| sps_sbt_enabled_flag | u(1) |
| sps_affine_enabled_flag | u(1) |
| if( sps_affine_enabled_flag ) { | |
|   sps_affine_type_flag | u(1) |
|   sps_affine_amvr_enabled_flag | u(1) |
|   sps_affine_prof_enabled_flag | u(1) |
|   if( sps_affine_prof_enabled_flag ) | |
|     sps_prof_pic_present_fl ag | u(1) |
| } | |
| if( chroma_format_idc = = 3 ) { | |
|   sps_palette_enabled_flag | u(1) |
|   sps_act_enabled_fl ag | u(1) |
| } | |
| sps_bcw_enabled_flag | u(1) |
| sps_ibc_enabled_flag | u(1) |
| sps_ciip_enabled_flag | u(1) |
| if( sps_mmvd_enabled_flag ) | |
|   sps_fpel_mmvd_enabled_flag | u(1) |
| sps_geo_enabled_flag | u(1) |
| sps_six_minus_max_num_merge_cand_plus1 | ue(v) |
| if (sps_geo_enabled_flag) | |
|   sps_max_num_merge_cand_minus_max_num_geo_cand_plus1 | ue(v) |
| sps_lmcs_enabled_flag | u(1) |
| sps_lfnst_enabled_flag | u(1) |
| sps_ladf_enabled_flag | u(1) |
|       ... | |

Syntax described above have the following semantics.

sps_six_minus_max_num_merge_cand_plus1 equal to 0 specifies that pic_six_minus_max_num_merge_cand is present in PHs referring to the PPS. sps_six_minus_max_num_merge_cand_plus1 greater than 0 specifies that pic_six_minus_max_num_merge_cand is not present in PHs referring to the PPS. The value of sps_six_minus_max_num_merge_cand_plus1 shall be in the range of 0 to 6, inclusive.

sps_max_num_merge_cand_minus_max_num_geo_cand_plus1 equal to 0 specifies that pic_max_num_merge_cand_minus_max_num_geo_cand is present in PHs of slices referring to the PPS. sps_max_num_merge_cand_minus_max_num_geo_cand_plus1 greater than 0 specifies that pic_max_num_merge_cand_minus_max_num_geo_cand is not present in PHs referring to the PPS. The value of sps_max_num_merge_cand_minus_max_num_geo_cand_plus1 shall be in the range of 0 to MaxNumMergeCand−1.

Semantics of the corresponding elements of the PH is as follows:

pic_six_minus_max_num_merge_cand specifies the maximum number of merging motion vector prediction (MVP) candidates supported in the slices associated with the PH subtracted from 6. The maximum number of merging MVP candidates, MaxNumMergeCand is derived as follows:

$$MaxNumMergeCand = 6 - pic\_six\_minus\_max\_num\_merge\_cand \quad (85)$$

The value of MaxNumMergeCand shall be in the range of 1 to 6, inclusive. When not present, the value of pic_six_minus_max_num_merge_cand is inferred to be equal to sps_six_minus_max_num_merge_cand_plus1−1.

pic_max_num_merge_cand_minus_max_num_geo_cand specifies the maximum number of geo merge mode candidates supported in the slices associated with the picture header subtracted from MaxNumMergeCand.

When sps_max_num_merge_cand_minus_max_num_geo_cand is not present, and sps_geo_enabled_flag is equal to 1 and MaxNumMergeCand greater than or equal to 2, pic_max_num_merge_cand_minus_max_num_geo_cand is inferred to be equal to sps_max_num_merge_cand_minus_max_num_geo_cand_plus1−1.

The maximum number of geo merge mode candidates, MaxNumGeoMergeCand is derived as follows:

$$MaxNumGeoMergeCand = MaxNumMergeCand - \quad (87)$$
$$pic\_max\_num\_merge\_cand\_minus\_max\_num\_geo\_cand$$

When pic_max_num_merge_cand_minus_max_num_geo_cand is present, the value of MaxNumGeoMergeCand shall be in the range of 2 to MaxNumMergeCand, inclusive.

When pic_max_num_merge_cand_minus_max_num_geo_cand is not present, and (sps_geo_enabled_flag is equal to 0 or MaxNumMergeCand is less than 2), MaxNumGeoMergeCand is set equal to 0.

When MaxNumGeoMergeCand is equal to 0, geo merge mode is not allowed for the slices associated with the PH.

Alternative syntax and semantics for this embodiment are as follows:

| | |
|---|---|
| ... | |
| sps_geo_enabled_flag | u(1) |
| sps_six_minus_max_num_merge_cand | ue(v) |
| if (sps_geo_enabled_flag) | |
| sps_max_num_merge_cand_minus_max_num_geo_cand | ue(v) |
| ... | | sps_six_minus_max_num_merge_cand specifies the maximum number of merging motion vector prediction (MVP) candidates supported in the slices associated with the PH subtracted from 6. The maximum number of merging MVP candidates, MaxNumMergeCand is derived as follows:

$$\text{Max}NumMergeCand = 6 - \text{sps\_six\_minus\_max\_num\_merge\_cand} \quad (85)$$

The value of MaxNumMergeCand shall be in the range of 1 to 6, inclusive.

sps_max_num_merge_cand_minus_max_num_geo_cand specifies the maximum number of geo merge mode candidates supported in the slices associated with the picture header subtracted from MaxNumMergeCand.

The maximum number of geo merge mode candidates, MaxNumGeoMergeCand is derived as follows:

$$\text{Max}NumGeoMergeCand = \text{Max}NumMergeCand - \quad (87)$$
$$\text{sps\_max\_num\_merge\_cand\_minus\_max\_num\_geo\_cand}$$

When sps_max_num_merge_cand_minus_max_num_geo_cand is present, the value of MaxNumGeoMergeCand shall be in the range of 2 to MaxNumMergeCand, inclusive.

When sps_max_num_merge_cand_minus_max_num_geo_cand is not present, and (sps_geo_enabled_flag is equal to 0 or MaxNumMergeCand is less than 2), MaxNumGeoMergeCand is set equal to 0.

When MaxNumGeoMergeCand is equal to 0, geo merge mode is not allowed.

For the embodiment described above and for both alternative syntax definitions, a check is performed on whether weighted prediction is enabled. This check affects derivation of MaxNumGeoMergeCand variable and the value of MaxNumGeoMergeCand is set to zero in one of the following cases:

when for the value of i=0 . . . NumRefIdxActive[0] and the value of j=0 . . . NumRefIdxActive[1] all the values of luma_weight_l0_flag[i], chroma_weight_l0_flag[i], luma_weight_l1_flag[j] and chroma_weight_l1_flag[j] are either set to zero or not present;

when a flag in SPS or PPS indicates the presence of bi-directional weighted prediction (pps_weighted_bi-pred_flag);

when the presence of bi-directional weighted prediction is indicated in either a picture header (PH) or a slice header (SH).

An SPS-level flag indicating the presence of weighted prediction parameters could be signalled as follows:

| | |
|---|---|
| sps_bcw_enabled_flag | u(1) |
| sps_ibc_enabled_flag | u(1) |
| sps_ciip_enabled_flag | u(1) |
| if( sps_mmvd_enabled_flag ) | |
| sps_fpel_ mmvd_enabled_flag | u(1) |
| sps_wp_enabled_flag | |
| if (!sps_wp_enabled_flag ) | |
| sps_geo_enabled_flag | u(1) |
| sps_six_minus_max_num_merge_cand_plus1 | ue(v) |
| if (sps_geo_enabled_flag ) | |
| sps_max_num_merge_cand_minus_max_num_geo_cand_plus1 | ue(v) |
| sps_lmcs_enabled_flag | u(1) |
| sps_lfnst_enabled_flag | u(1) |
| sps_ladf_enabled_flag | u(1) |
| ... | |

Syntax element "sps_wp_enabled_flag" determines whether weighted prediction could be enabled on a lower level (PPS. PH or SH). Exemplary embodiment is given below:

| | |
|---|---|
| if( pps_cu_chroma_qp_offset_list_enabled_flag ) { | |
| chroma_qp_offset_list_len_minus1 | ue(v) |
| for( i = 0; i <= chroma_qp_offset_list_len_minus1; i++ ) { | |
| cb_qp_offset_list[ i ] | se(v) |
| cr_qp_offset_list[ i ] | se(v) |
| if( pps_joint_cbcr_qp_offset_present_flag ) | |
| joint_cbcr_qp_offset_list[ i ] | se(v) |
| } | |
| } | |
| if (sps_wp_enabled_flag) { | |
| pps_weighted_pred_flag | u(1) |
| pps_weighted_bipred_flag | u(1) |
| } | |

In the table above, pps_weighted_pred_flag and pps_weighted_bipred_flag are flags in the bitstream indicating whether weighted prediction is enabled for uni- and bi-predicted blocks.

In an embodiment, where weighted prediction flags are specified in a picture header, e.g. as pic_weighted_pred_flag and pic_weighted_bipred_flag, the following dependency on sps_wp_enabled_flag may be specified in bitstream syntax:

| |
|---|
| ... |
| if (sps_wp_enabled_flag) { |
| pic_weighted_pred_flag |
| pic_weighted_bipred_flag |
| } |
| ... |

In an embodiment, where weighted prediction flags are specified in a slice header, e.g. as weighted_pred_flag and weighted_bipred_flag, the following dependency on sps_wp_enabled_flag may be specified in bitstream syntax:

```
...
if (sps_wp_enabled_flag) {
weighted_pred_flag
weighted_bipred_flag
}
...
```

In Embodiment 2, reference picture lists may be indicated either in PPS or in either PH or SH (but not both). As it is known from the state-of-the-art, signaling of a reference picture list is dependent from the syntax elements that indicate presence of weighted prediction (e.g. pps_weighted_pred_flag and pps_weighted_bipred_flag). Hence, depending on whether reference picture list is indicated in PPS, PH or SH, weighted prediction parameters are signaled before reference picture list correspondingly in PPS, PH or SH.

The following syntax could be specified for this embodiment:

Picture Parameter Set Syntax

|  | Descriptor |
|---|---|
| pic_parameter_set_rbsp( ) { | |
| ... | |
|   rpl_present_in_ph_flag | u(1) |
|   sao_present_in_ph_flag | u(1) |
|   alf_present_in_ph_flag | u(1) |
| ... | |
|   pps_weighted_pred_flag | u(1) |
|   pps_weighted_bipred_flag | u(1) |
|   if( pps_weighted_pred_flag \|\| pps_weighted_bipred_flag \|\| rpl_present_in_ph_flag ) | |
|     weighted_pred_table_present_in_ph_flag | u(1) |
|   deblocking_filter_control_present_flag | u(1) |
|   if( deblocking_filter_control_present_flag ) { | |
|     deblocking_filter_override_enabled_flag | u(1) |
|     if( deblocking_filter_override_enabled_flag ) | |
|       deblocking_filter_override_present_in_ph_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|     } | |
|   } | |
|   constant_slice_header_params_enabled_flag | u(1) |
|   ... | |
| } | | rpl_present_in_ph_flag equal to 1 specifies the reference picture list signalling is not present in the slice headers referring to the PPS but may be present in the PHs referring to the PPS. rpl_present_in_ph_flag equal to 0 specifies the reference picture list signalling is not present in the PHs referring to the PPS but may be present in the slice headers referring to the PPS.

sao_present_in_ph_flag equal to 1 specifies the syntax elements for enabling SAO use is not present in the slice headers referring to the PPS but may be present in the PHs referring to the PPS. sao_present_in_ph_flag equal to 0 specifies the syntax elements for enabling SAO use is not present in the PHs referring to the PPS but may be present in the slice headers referring to the PPS.

alf_present_in_ph_flag equal to 1 specifies the syntax elements for enabling ALF use is not present in the slice headers referring to the PPS but may be present in the PHs referring to the PPS. alf_present_in_ph_flag equal to 0 specifies the syntax elements for enabling ALF use is not present in the PHs referring to the PPS but may be present in the slice headers referring to the PPS.

weighted_pred_table_present_in_ph_flag equal to 1 specifies that weighted prediction table is not present in the slice headers referring to the PPS but may be present in the PHs referring to the PPS. weighted_pred_table_present_in_ph_flag equal to 0 specifies that weighted prediction table is not present in the PHs referring to the PPS but may be present in the slice headers referring to the PPS. When not present, the value of weighted_pred_table_present_in_ph_flag is inferred to be equal to 0.

deblocking_filter_override_enabled_flag equal to 1 specifies that deblocking filter override may be present in PHs or in slice headers referring to the PPS. deblocking_filter_override_enabled_flag equal to 0 specifies that that deblocking filter override is not present in PHs nor in slice headers referring to the PPS. When not present, the value of deblocking_filter_override_enabled_flag is inferred to be equal to 0.

deblocking_filter_override_present_in_ph_flag equal to 1 specifies that deblocking filter override is not present in the slice headers referring to the PPS but may be present in the PHs referring to the PPS. deblocking_filter_override_present_in_ph_flag equal to 0 specifies that deblocking filter override is not present in the PHs referring to the PPS but may be present in slice headers referring to the PPS.

|  | Descriptor |
|---|---|
| picture_header_rbsp( ) { | |
|   ... | |
|   ... | |
|   if( ( pps_weighted_pred_flag \|\| pps_weighted_bipred_flag ) && | |
|     weighted_pred_table_present_in_ph_flag ) | |
|     pred_weight_table( ) | |
|   ... | |
|   if( rpl_present_in_ph_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i == 0 \|\| ( i == 1 && rpl1_idx_present_flag ) ) ) | |
|       pic_rpl_sps_flag[ i ] | u(1) |
|       if( pic_rpl_sps_flag[ i ] ) { | |
|         if( num_ref_pic_lists_in_sps[ i ] > 1 && | |
|           ( i == 0 \|\| ( i == 1 && rpl1_idx_present_flag ) ) ) | |
|         pic_rpl_idx[ i ] | u(v) |
|       } else | |
|         ref_pic_list_struct( i, num_ref_pic_lists_in_sps[ i ] ) | |

-continued

| | Descriptor |
|---|---|
| for( j = 0; j < NumLtrpEntries[ i ][ RplsIdx[ i ] ]; j++ ) { | |
|   if( ltrp_in_slice_header_flag[ i ][ | |
|   RplsIdx[ i ] ] ) | |
|     pic_poc_lsb_lt[ i ][ j ] | u(v) |
|   pic_delta_poc_msb_present_flag[ i ][ j ] | u(1) |
|   if( pic_delta_poc_msb_present_flag[ i ][ j ] ) | |
|     pic_delta_poc_msb_cycle_lt[ i ][ j ] | ue(v) |
|   } | |
|  } | |
| } | |
| if( sps_sao_enabled_flag  &&  sao_present_in_ph_flag ) { | |
|  pic_sao_luma_enabled_flag | u(1) |
|  if(ChromaArrayType  !=  0 ) | |
|   pic_sao_chroma_enabled_flag | u(1) |
| } | |
| if( sps_alf_enabled_flag  &&  alf_present_in_ph_flag ) { | |
|  pic_alf_enabled_flag | u(1) |
|  if( pic_alf_enabled_flag ) { | |
|   pic_num_alf_aps_ids_luma | u(3) |
|   for( i = 0; i < pic_num_alf_aps_ids_luma ;i++ ) | |
|     pic_alf_aps_id_luma[ i ] | u(3) |
|   if( ChromaArrayType  !=  0 ) | |
|     pic_alf_chroma_idc | u(2) |
|   if( pic_alf_chroma_idc ) | |
|     pic_alf_aps_id_chroma | u(3) |
|   } | |
|  } | |
| ... | |
| if( deblocking_filter_override_enabled_flag && | |
|   deblocking_filter_override_present_in_ph_flag ) | |
|   pic_deblocking_filter_override_flag | u(1) |
| if( pic_deblocking_filter_override_flag ) { | |
|  pic_deblocking_filter_disabled_flag | u(1) |
|  if( !pic_deblocking_filter_disabled_flag ) { | |
|   pic_beta_offset_div2 | se(v) |
|   pic_tc_offset_div2 | se(v) |
|   } | |
|  } | |
| ... | |
| } | |

| | Descriptor |
|---|---|
| slice_header( ) { | |
|  ... | |
|  if( !rpl_present_in_ph_flag &&( ( nal_unit_type != IDR_W_RADL && nal_unit_type != | |
|         IDR_N_LP ) ǀ ǀ sps_idr_rpl_present_flag ) ) { | |
|   for( i = 0; i < 2; i++ ) { | |
|    if( num_ref_pic_lists_in_sps[ i ] > 0 && !pps_ref_pic_list_sps_idc[ i ] && | |
|         ( i = = 0 ǀ ǀ ( i = = 1 && rpl1_idx_present_flag ) ) ) | |
|     slice_rpl_sps_flag[ i ] | u(1) |
|    if( slice_rpl_sps_flag[ i ] ) { | |
|     if( num_ref_pic_lists_in_sps[ i ] >  1 && | |
|         ( i = = 0 ǀ ǀ ( i = = 1  &&  rpl1_idx_present_flag ) ) ) | |
|      slice_rpl_idx[ i ] | u(v) |
|    } else | |
|     ref_pic_list_struct( i ,num_ref_pic_lists_in_sps[ i ] ) | |
|    for( j = 0; j < NumLtrpEntries[ i ][ RplsIdx[ i ] ]; j++ ) { | |
|     if( ltrp_in_slice_header_flag[ i ][ RplsIdx[ i ] ] ) | |
|      slice_poc_lsb_lt[ i ][ j ] | u(v) |
|     slice_delta_poc_msb_present_flag[ i ][ j ] | u(1) |
|     if( slice_delta_poc_msb_present_flag[ i ][ j ] ) | |
|      slice_delta_poc_msb_cycle_lt[ i ][ j ] | ue(v) |
|     } | |
|    } | |
|   } | |

-continued

| | Descriptor |
|---|---|
| if( rpl_present_in_ph_flag \| \| ( ( nal_unit_type != IDR_W_RADL &&<br>nal_unit_type !=<br>        IDR_N_LP ) \| \| sps_idr_rpl_present_flag ) ) { | |
|   if( ( slice_type != I && num_ref_entries[ 0 ][ RplsIdx[ 0 ] ] > 1 ) \| \| | |
|     ( slice_type = = B && num_ref_entries[ 1 ][ RplsIdx[ 1 ] ] > 1 ) ) { | |
|     num_ref_idx_active_override_flag | u(1) |
|     if( num_ref_idx_active_override_flag ) | |
|       for( i = 0; i < ( slice_type  = =  B ? 2: 1 ); i++ ) | |
|         if( num_ref_entries[ i ][ RplsIdx[ i ] ] > 1 ) | |
|           num_ref_idx_active_minus1[ i ] | ue(v) |
|   } | |
| } | |
| ... | |
| if( slice_type  !=  I ) { | |
|   ... | |
|   if( ( ( pps_weighted_pred_flag && slice_type = = P ) \| \| | |
|     ( pps_weighted_bipred_flag && slice_type = = B ) ) && | |
|     !weighted_pred_table_present_in_ph_flag ) | |
|     pred_weight_table( ) | |
| } | |
| if( sps_sao_enabled_flag  &&  !sao_present_in_ph_flag ) { | |
|   slice_sao_luma_flag | u(1) |
|   if( ChromaArrayType  !=  0 ) | |
|     slice_sao_chroma_flag | u(1) |
| } | |
| if( sps_alf_enabled_flag  &&  !alf_present_in_ph_flag ) { | |
|   slice_alf_enabled_flag | u(1) |
|   if( slice_alf_enabled_flag ) { | |
|     slice_num_alf_aps_ids_luma | u(3) |
|     for( i = 0; i < slice_num_alf_aps_ids_luma; i++ ) | |
|       slice_alf_aps_id_luma[ i ] | u(3) |
|     if( ChromaArrayType  !=  0 ) | |
|       slice_alf_chroma_idc | u(2) |
|     if( slice_alf_chroma_idc ) | |
|       slice_alf_aps_id_chroma | u(3) |
|   } | |
| } | |
| if( deblocking_filter_override_enabled_flag && | |
|     !deblocking_filter_override_present_in_ph_flag ) | |
|   slice_deblocking_filter_override_flag | u(1) |
| if( slice_deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|   } | |
| } | |
| ... | |
| } | |

45

An alternative syntax for picture header is as follows:

| | Descriptor |
|---|---|
| picture_header_rbsp( ) { | |
|   ... | |
|   if( rpl_present_in_ph_flag ) { | |
|     for( i = 0; i < 2; i++ ) { | |
|       if( num_ref_pic_lists_in_sps[ i ] > 0 && !pps_ref_pic_list_sps_idc[ i ]<br>&& | |
|         ( i = = 0 \| \| ( i = = 1 && rpl1_idx_present_flag ) ) ) | |
|         pic_rpl_sps_flag[ i ] | u(1) |
|       if( pic_rpl_sps_flag[ i ] ) { | |
|         if( num_ref_pic_lists_in_sps[ i ] > 1 && | |
|           ( i = = 0 \| \| ( i = = 1 && rpl1_idx_present_flag ) ) ) | |
|           pic_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|         pic_delta_poc_msb_present_flag[ i ][ j ] | u(1) |

-continued

| | Descriptor |
|---|---|
|      if( pic_delta_poc_msb_present_flag[ i ][ j ] ) | |
|       pic_delta_poc_msb_cycle_lt[ i ][ j ] | ue(v) |
|     } | |
|    } | |
|  } | |
| ... | |
| if( ( pps_weighted_pred_flag \|\| pps_weighted_bipred_flag ) && | |
|    weighted_pred_table_present_in_ph_flag ) | |
|   pred_weight_table( ) | |
| ... | |
| if( sps_sao_enabled_flag && sao_present_in_ph_flag ) { | |
|   pic_sao_luma_enabled_flag | u(1) |
|   if(ChromaArrayType != 0 ) | |
|     pic_sao_chroma_enabled_flag | u(1) |
| } | |
| if( sps_alf_enabled_flag && alf_present_in_ph_flag ) { | |
|   pic_alf_enabled_flag | u(1) |
|   if( pic_alf_enabled_flag ) { | |
|     pic_num_alf_aps_ids_luma | u(3) |
|     for( i = 0; i < pic_num_alf_aps_ids_luma; i++ ) | |
|       pic_alf_aps_id_luma[ i ] | u(3) |
|     if( ChromaArrayType != 0 ) | |
|       pic_alf_chroma_idc | u(2) |
|     if( pic_alf_chroma_idc ) | |
|       pic_alf_aps_id_chroma | u(3) |
|    } | |
|  } | |
| ... | |
| if( deblocking_filter_override_enabled_flag && | |
|    deblocking_filter_override_present_in_ph_flag ) | |
|   pic_deblocking_filter_override_flag | u(1) |
| if( pic_deblocking_filter_override_flag ) { | |
|   pic_deblocking_filter_disabled_flag | u(1) |
|   if( !pic_deblocking_filter_disabled_flag ) { | |
|     pic_beta_offset_div2 | se(v) |
|     pic_tc_offset_div2 | se(v) |
|   } | |
|  } | |
| ... | |
| } | |

In Embodiment 3, signaling of picture header and slice header elements could be combined in a single process.

This embodiment introduces a flag ("picture_header_in_slice_header_flag") that indicates whether a picture and slice headers are combined. Syntax for a bitstream according to this embodiment is as follows:

Picture Header RBSP Syntax

| | Descriptor |
|---|---|
| picture_header_rbsp( ) { | |
|   picture_header_structure( ) | |
| } | |

Picture Header Structure Syntax

| | Descriptor |
|---|---|
| picture_header_structure( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   ... | |
| } | |

General Slice Header Syntax

| | Descriptor |
|---|---|
| slice_header( ) { | |
|   picture_header_in_slice_header_flag | u(1) |
|   if(picture_header_in_slice_header_flag) | |
|     picture_header_structure( ) | |
|   if( subpics_present_flag ) | |
|     slice_subpic_id | u(v) |
|   if( rect_slice_flag \|\| NumTilesInPic > 1 ) | |
|     slice_address | u(v) |
|   if( !rect_slice_flag && NumTilesInPic > 1 ) | |
|     num_tiles_in_slice_minus1 | ue(v) |
|   slice_type | ue(v) |
|   if( !pic_rpl_present_flag &&( ( nal_unit_type != IDR_W_RADL && | |
| nal_unit_type != | |
|     IDR_N_LP ) \|\| sps_idr_rpl_present_flag ) ) { | |
|     for( i = 0; i < 2; i++ ) { | |
|       if( num_ref_pic_lists_in_sps[ i ] > 0 | |
|       && !pps_ref_pic_list_sps_idc[ i ] && | |
|         ( i == 0 \|\| ( i == 1 && | |
|         rpl1_idx_present_flag ) ) ) | |
|       slice_rpl_sps_flag[ i ] | u(1) |
|   ... | |
| } | |

Semantics for the picture_header_in_slice_header_flag and related bitstream constraints is as follows:

picture_header_in_slice_header_flag equal to 1 specifies that the picture header syntax structure is present in the slice header. picture_header_in_slice_header_flag equal to 0 specifies that the picture header syntax structure is not present in the slice header.

It is a requirement of bitstream conformance that the value of picture_header_in_slice_header_flag is the same in all slices of a CLVS.

When picture_header_in_slice_header_flag is equal to 1, it is a requirement of bitstream conformance that no NAL unit with NAL unit type equal to PH_NUT is present in the CLVS.

When picture_header_in_slice_header_flag is equal to 0, it is a requirement of bitstream conformance that a NAL unit with NAL unit type equal to PH_NUT is present in the PU, preceding the first VCL NAL unit of the PU.

A combination of Embodiment 2 and Embodiment 3 is nontrivial since both of the embodiments relate to the subject of PH and SH signaling.

A combination of aspects of these embodiments is as follows.

When picture_header_in_slice_header_flag is equal to 0 (Embodiment 4), the flags that specify whether a syntax element of a related coding tool is present in either PH or SH (but not both);

Otherwise (when picture_header_in_slice_header_flag is equal to 1), these flags are inferred to 0 indicating tool parameter signaling on slice level.

An alternative combination is as follows:

When picture_header_in_slice_header_flag is equal to 0 (Embodiment 4), the flags that specify whether a syntax element of a related coding tool is present in either PH or SH (but not both);

Otherwise (when picture_header_in_slice_header_flag is equal to 1), these flags are inferred to 0 indicating tool parameter signaling on the picture header level.

This combination has the following syntax:

Picture Parameter Set Syntax

| | Descriptor |
|---|---|
| pic_parameter_set_rbsp( ) { | |
|   picture_header_in_slice_header_flag | u(1) |
|   ... | |
|   if (picture_header_in_slice_header_flag) | |
|   { | |
|   rpl_present_in_ph_flag | u(1) |
|   sao_present_in_ph_flag | u(1) |
|   alf_present_in_ph_flag | u(1) |
|   } | |
|   ... | |
|   pps_weighted_pred_flag | u(1) |
|   pps_weighted_bipred_flag | u(1) |
|   if( pps_weighted_pred_flag \|\| pps_weighted_bipred_flag \|\| rpl_present_in_ph_flag ) | |
|     weighted_pred_table_present_in_ph_flag | u(1) |
|   deblocking_filter_control_present_flag | u(1) |
|   if( deblocking_filter_control_present_flag ) { | |
|     deblocking_filter_override_enabled_flag | u(1) |
|     if( deblocking_filter_override_enabled_flag ) | |
|       deblocking_filter_override_present_in_ph_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|     } | |
|   } | |
|   constant_slice_header_params_enabled_flag | u(1) |
|   ... | |
| } | |

In Embodiment 4, the check of whether a weighted prediction is enabled is performed by indicating the number of entries in a reference picture list that are referenced with weighted prediction.

Syntax and semantics in this embodiment is defined as follows:

| | Descriptor |
|---|---|
| pred_weight_table( ) { | |
|   luma_log2_weight_denom | ue(v) |
|   if( ChromaArrayType != 0 ) | |
|     delta_chroma_log2_weight_denom | se(v) |
|   num_l0_weighted_ref_pics | ue(v) |
|   for( i = 0; i < num_l0_weighted_ref_pics; i++ ) | |
|     luma_weight_l0_flag[ i ] | u(1) |
|   if( ChromaArrayType != 0 ) | |
|     for( i = 0; i < NumRefIdxActive[ 0 ]; i++ ) | |
|       chroma_weight_l0_flag[ i ] | u(1) |
|   for( i = 0; i < NumRefIdxActive[ 0 ]; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   num_l1_weighted_ref_pics | ue(v) |
|   for( i = 0; i < num_l1_weighted_ref_pics; i++ ) | |
|     luma_weight_l1_flag[ i ] | u(1) |
|   if( ChromaArrayType != 0 ) | |
|     for( i = 0; i < NumRefIdxActive[ 1 ]; i++ ) | |
|       chroma_weight_l1_flag[ i ] | u(1) |
|   for( i = 0; i < NumRefIdxActive[ 1 ]; i++ ) { | |
|     if( luma_weight_l1_flag[ i ] ) { | |
|       delta_luma_weight_l1[ i ] | se(v) |
|       luma_offset_l1[ i ] | se(v) |
|     } | |
|     if( chroma_weight_l1_flag[ i ] ) | |
|       for( j = 0; j < 2; j++ ) { | |
|         delta_chroma_weight_l1[ i ][ j ] | se(v) |
|         delta_chroma_offset_l1[ i ][ j ] | se(v) |
|       } | |
|   } | |
| } | | num_l0_weighted_ref_pics specifies the number of reference pictures in reference picture list 0 that are weighted. The value of num_l0_weighted_ref_pics shall ranges from 0 to MaxDecPicBuffMinus1+14, inclusive.

It is a requirement of bitstream conformance that when present, the value of num_l0_weighted_ref_pics shall not be less than the number of active reference pictures for L0 of any slices in the picture associated with the picture header.

num_l1_weighted_ref_pics specifies the number of reference pictures in reference picture list 1 that are weighted. The value of num_l1_weighted_ref_pics shall ranges from 0 to MaxDecPicBuffMinus1+14, inclusive.

It is a requirement of bitstream conformance that when present, the value of num_l1_weighted_ref_pics shall not be less than the number of active reference pictures for L1 of any slices in the picture associated with the picture header.

MaxNumGeoMergeCand is set to zero when either num_l0_weighted_ref_pics or num_l1_weighted_ref_pics is non-zero. The following syntax is an example of how this dependency could be utilized:

| | |
|---|---|
| if( sps_prof_pic_present_flag ) | |
|    pic_disable_prof_flag | u(1) |
| if( sps_geo_enabled_flag && MaxNumMergeCand >= 2 && | |
|      !pps_max_num_merge_cand_minus_max_num_geo_cand_plus1 && | |
| num_l0_weighted_ref_pics==0 && num_l1_weighted_ref_pics==0) | |
|    pic_max_num_merge_cand_minus_max_num_geo_cand | ue(v) |
| if( sps_ibc_enabled_flag ) | |
|    pic_six_minus_max_num_ibc_merge_cand | ue(v) |
| if( sps_joint_cbcr_enabled_flag ) | |

Semantics of pic_max_num_merge_cand_minus_max_num_geo_cand in this embodiment is the same as for the previous embodiments.

In Embodiment 5, inter- and intra-related syntax elements are conditionally signaled if only certain slice types are used in the picture associated with the PH.

Syntax for this embodiment is given below:

| | Descriptor |
|---|---|
| picture_header_rbsp( ) { | |
|   pic_inter_slice_present_flag | u(1) |
|   if( pic_inter_slice_present_flag ) | |
|     pic_intra_slice_present_flag | u(1) |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
|   if( !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
|   if( separate_colour_plane_flag == 1 ) | |
|     colour_plane_id | u(2) |
|   if( output_flag_present_flag ) | |
|     pic_output_flag | u(1) |
|   pic_rpl_present_flag | u(1) |
|   if( pic_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i == 0 \|\| ( i == 1 && rpl1_idx_present_flag ) ) ) | |
|         pic_rpl_sps_flag[ i ] | u(1) |
|       if( pic_rpl_sps_flag[ i ] ) { | |
|         if( num_ref_pic_lists_in_sps[ i ] > 1 && | |
|           ( i == 0 \|\| ( i == 1 && rpl1_idx_present_flag ) ) ) | |
|           pic_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|         pic_delta_poc_msb_present_flag[ i ][ j ] | u(1) |

-continued

| | Descriptor |
|---|---|
| if( pic_delta_poc_msb_present_flag[ i ][ j ] ) | |
| pic_delta_poc_msb_cycle_lt[ i ][ j ] | ue(v) |
| } | |
| } | |
| } | |
| if( partition_constraints_override_enabled_flag ) + | |
| partition_constraints_override_flag | u(1) |
| if( pic_intra_slice_present_flag ) { | |
| if( partition_constraints_override_flag ) { | |
| pic_log2_diff_min_qt_min_cb_intra_slice_luma | ue(v) |
| pic_max_mtt_hierarchy_depth_intra_slice_luma | ue(v) |
| if( pic_max_mtt_hierarchy_depth_intra_slice_luma  !=  0 ) { | |
| pic_log2_diff_max_bt_min_qt_intra_slice_luma | ue(v) |
| pic_log2_diff_max_tt_min_qt_intra_slice_luma | ue(v) |
| } | |
| if( qtbtt_dual_tree_intra_flag ) { | |
| pic_log2_diff_min_qt_min_cb_intra_slice_chroma | ue(v) |
| pic_max_mtt_hierarchy_depth_intra_slice_chroma | ue(v) |
| if( pic_max_mtt_hierarchy_depth_intra_slice_chroma  !=  0 ) { | |
| pic_log2_diff_max_bt_min_qt_intra_slice_chroma | ue(v) |
| pic_log2_diff_max_tt_min_qt_intra_slice_chroma | ue(v) |
| } | |
| } | |
| } | |
| → | |
| if( cu_qp_delta_enabled_flag ) + | |
| pic_cu_qp_delta_subdiv_intra_slice | ue(v) |
| if( pps_cu_chroma_qp_offset_list_enabled_flag ) | |
| pic_cu_chroma_qp_offset_subdiv_intra_slice | ue(v) |
| } | |
| if( pic_inter_slice_present_flag ) { | |
| if( partition_constraints_override_flag ) { | |
| pic_log2_diff_min_qt_min_cb_inter_slice | ue(v) |
| pic_max_mtt_hierarchy_depth_inter_slice | ue(v) |
| if( pic_max_mtt_hierarchy_depth_inter_slice  !=  0 ) { | |
| pic_log2_diff_max_bt_min_qt_inter_slice | ue(v) |
| pic_log2_diff_max_tt_min_qt_inter_slice | ue(v) |
| } | |
| } | |
| if( cu_qp_delta_enabled_flag ) | |
| pic_cu_qp_delta_subdiv_inter_slice | ue(v) |
| if( pps_cu_chroma_qp_offset_list_enabled_flag ) + | |
| pic_cu_chroma_qp_offset_subdiv_inter_slice | ue(v) |
| if( sps_temporal_mvp_enabled_flag ) | |
| pic_temporal_mvp_enabled_flag | u(1) |
| if(!pps_mvd_l1_zero_idc ) | |
| mvd_l1_zero_flag | u(1) |
| if( !pps_six_minus_max_num_merge_cand_plus1 ) | |
| pic_six_minus_max_num_merge_cand | ue(v) |
| if( sps_affine_enabled_flag ) | |
| pic_five_minus_max_num_subblock_merge_cand | ue(v) |
| if( sps_fpel_mmvd_enabled_flag ) | |
| pic_fpel_mmvd_enabled_flag | u(1) |
| if( sps_bdof_pic_present_flag ) | |
| pic_disable_bdof_flag | u(1) |
| if( sps_dmvr_pic_present_flag ) | |
| pic_disable_dmvr_flag | u(1) |
| if( sps_prof_pic_present_flag ) | |
| pic_disable_prof_flag | u(1) |
| if( sps_triangle_enabled_flag && MaxNumMergeCand >= 2 && | |
| !pps_max_num_merge_cand_minus_max_num_triangle_cand_plus1 | |
| ) | |
| pic_max_num_merge_cand_minus_max_num_triangle_cand | ue(v) |
| } | |
| if ( sps_ibc_enabled_flag ) | |
| pic_six_minus_max_num_ibc_merge_cand | ue(v) |
| ... | |

7.3.7.1 General Slice Header Syntax

| | Descriptor |
|---|---|
| slice_header( ) { | |
|    slice_pic_order_cnt_lsb | u(v) |
|    if( subpics_present_flag ) | |
|      slice_subpic_id | u(v) |
|    if( rect_slice_flag  \|\|  NumTilesInPic > 1 ) | |
|      slice_address | u(v) |
|    if( !rect_slice_flag  &&  NumTilesInPic > 1 ) | |
|      num_tiles_in_slice_minus1 | ue(v) |
|    if( pic_inter_slice_present_flag ) | |
|      slice_type | ue(v) |
|    ... | |

7.4.3.6 Picture Header RBSP Semantics pic_inter_slice_present_flag equal to 1 specifies that one or more slice with slice_type equal to 0 (B) or 1 (P) may be present in the picture associated with the PH.

pic_inter_slice_present_flag equal to 0 specifies that no slice with slice_type equal to 0 (B) or 1 (P) can be present in the picture associated with the PH.

pic_intra_slice_present_flag equal to 1 specifies that one or more slice with slice_type equal to 2 (I) may be present in the picture associated with the PH. pic_intra_slice_present_flag is equal to 0 specifies that no slice with slice_type equal to 2 (I) can be present in the picture associated with the PH. When not present, the value of pic_intra_slice_only_flag is inferred to be equal to 1.

NOTE—: The values of both pic_inter_slice_present_flag and pic_intra_slice_present_flag are set equal to 1 in the picture header associated with picture containing one or more subpicture(s) containing intra coded slice(s) which may be merged with one or more subpicture(s) containing inter coded slices(s).

7.4.8.1 General Slice Header Semantics slice_type specifies the coding type of the slice according to Table 7-5.

TABLE 7-5

| Name association to slice_type | |
|---|---|
| slice_type | Name of slice_type |
| 0 | B (B slice) |
| 1 | P (P slice) |
| 2 | I (I slice) |

When nal_unit_type is a value of nal_unit_type in the range of IDR_W_RADL to CRA_NUT, inclusive, and the current picture is the first picture in an access unit, slice_type shall be equal to 2.

When not present, the value of slice_type is infer to be equal to 2.

When pic_intra_slice_present_flag is equal to 0, the value of slice_type shall be in the range from 0 to 1, inclusive.

Embodiment 4 could be combined with signaling of of pred_weight_table( ) in picture header. Signaling of pred_weight_table( ) in a picture header is disclosed in the previous embodiments.

An exemplary syntax is as follows:

| | Descriptor |
|---|---|
| picture_header_rbsp( ) { | |
|   ... | |
|   ... | |
|   if( ( pps_weighted_pred_flag \| \| pps_weighted_bipred_flag ) && | |
|     weighted_pred_table_present_in_ph_flag ) | |
|     pred_weight_table( ) | |
|   ... | |

When indicating the presence of pred_weight_table( ) in the picture header, the following syntax combination with Embodiment 3 could be used

| | Descriptor |
|---|---|
| picture_header_rbsp( ) { | |
|   ... | |
|   pic_inter_slice_present_flag | u(1) |
|   if( pic_inter_slice_present_flag ) | |
|     pic_intra_slice_present_flag | u(1) |
|   ... | |
|   if( ( pps_weighted_pred_flag \| \| | |
|   pps_weighted_bipred_flag ) && | |
|     pic_inter_slice_present_flag ) | |
|     pred_weight_table( ) | |
|   ... | |

Alternative embodiments may use the following syntax:

| | Descriptor |
|---|---|
| picture_header_rbsp( ) { | |
|   ... | |
|   pic_inter_slice_present_flag | u(1) |
|   if( pic_inter_slice_present_flag ) | |
|     pic_intra_slice_present_flag | u(1) |
|   ... | |
|   if( ( pps_weighted_pred_flag \| \| | |
|   pps_weighted_bipred_flag ) && | |
|     pic_inter_slice_present_flag && | |
|   weighted_pred_table_present_in_ph_flag ) | |
|     pred_weight_table( ) | |
|   ... | |

Alternative embodiments may use the following syntax:

| | Descriptor |
|---|---|
| picture_header_rbsp( ) { | |
|   ... | |
|   pic_inter_bipred_slice_present_flag | u(1) |
|   if( !pic_inter_bipred_slice_present_flag ) | |
|     pic_inter_slice_present_flag | u(1) |
|     if( pic_inter_slice_present_flag ) | |
|       pic_intra_slice_present_flag | u(1) |
|   ... | |
|   if( ( pps_weighted_pred_flag \| \| | |
|   pps_weighted_bipred_flag ) && | |
|     pic_inter_slice_present_flag && | |
|   weighted_pred_table_present_in_ph_flag ) | |
|     pred_weight_table( ) | |
|   ... | |

In the syntax above, pic_inter_bipred_slice_present_flag indicates the presence of all the slice types, I-, B- and P-slices that refers to the picture header.

When pic_inter_bipred_slice_present_flag is 0, the picture comprises only slices of either I- or B-type.

In this case non-rectangular modes are disabled.

Embodiment 5 is a combination of features disclosed above. An exemplary syntax is described as follows:

| | Descriptor |
|---|---|
| picture_header_rbsp( ) { | |
| ... | |
|   pic_inter_slice_present_flag | u(1) |
|   if( pic_inter_slice_present_flag ) | |
|     pic_intra_slice_present_flag | u(1) |
| ~~  pic_rpl_present_flag~~ | ~~u(1)~~ |
| ~~  if( pic_rpl_present_flag ) {~~ | |
|   if( rpl_present_in_ph_flag ) { | |
|     for( i = 0; i < 2; i++ ) { | |
|       if( num_ref_pic_lists_in_sps[ i ] > 0 && | |
|       !pps_ref_pic_list_sps_idc[ i ] | |
| && | |
|         ( i = = 0 || ( i = = 1 && rpl1_idx_present_flag ) ) ) | |
|       pic_rpl_sps_flag[ i ] | u(1) |
|       if( pic_rpl_sps_flag[ i ] ) { | |
|         if( num_ref_pic_lists_in_sps[ i ] > 1 && | |
|           ( i = = 0 || ( i = = 1 && rpl1_idx_present_flag ) ) ) | |
|         pic_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|         pic_delta_poc_msb_present_flag[ i ][ j ] | u(1) |
|         if( pic_delta_poc_msb_present_flag[ i ][ j ] ) | |
|           pic_delta_poc_msb_cycle_lt[ i ][ j ] | ue(v) |
|       } | |
|     } | |
|   } | |
|   ... | |
|   if( ( pps_weighted_pred_flag || pps_weighted_bipred_flag ) && | |
|     weighted_pred_table_present_in_ph_flag && | |
| pic_inter_slice_present_flag ) | |
|     pred_weight_table( ) | |
|   ... | |
|   if( sps_sao_enabled_flag && sao_present_in_ph_flag ) { | |
|     pic_sao_luma_enabled_flag | u(1) |
|     if(ChromaArrayType != 0 ) | |
|       pic_sao_chroma_enabled_flag | u(1) |
|   } | |
|   if( sps_alf_enabled_flag && alf_present_in_ph_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc ) | |
|         pic_alf_aps_id_chroma | u(3) |
|     } | |
|   } | |
|   ... | |
|   if( deblocking_filter_override_enabled_flag && | |
|     deblocking_filter_override_present_in_ph_flag ) ~~{~~ | |
|     pic_deblocking_filter_override_flag | u(1) |
|   if( pic_deblocking_filter_override_flag ) { | |
|     pic_deblocking_filter_disabled_flag | u(1) |
|     if( !pic_deblocking_filter_disabled_flag ) { | |
|       pic_beta_offset_div2 | se(v) |
|       pic_tc_offset_div2 | se(v) |
|     } | |
|   } | |
|   ... | |
| } | |

Embodiment 6 allows the encoder to select non-rectangular (e.g. GEO) mode referring to picture without weighted prediction factor.

In this embodiment, semantics is defined as follows:
7.4.10.7 Merge Data Semantics The variable MergeGeoFlag[x0][y0], which specifies whether geo shape based motion compensation is used to generate the prediction samples of the current coding unit, when decoding a B slice, is derived as follows:

If all the following conditions are true, MergeGeoFlag [x0][y0] is set equal to 1:
sps_geo_enabled_flag is equal to 1.
slice_type is equal to B.
general_merge_flag[x0][y0] is equal to 1.
MaxNumGeoMergeCand is greater than or equal to 2.
cbWidth is greater than or equal to 8 cbHeight is greater than or equal to 8
cbWidth is smaller than 8*cbHeight
cbHeight is smaller than 8*cbWidth
regular_merge_flag[x0][y0] is equal to 0.
merge_subblock_flag[x0][y0] is equal to 0.
ciip_flag[x0][y0] is equal to 0.

Otherwise, MergeGeoFlag[x0][y0] is set equal to 0.

It is a requirement of bitstream conformance that if one of the luma or chroma explicit weighted flags of the CU is true, MergeGeoFlag[x0][y0] shall be equal to 0.

Embodiment 7 could be explained as a part of the VVC specification as follows:

8.5.7 Decoding Process for Geo Inter Blocks 8.5.7.1 General

This process is invoked when decoding a coding unit with MergeGeoFlag[xCb][yCb] equal to 1.

Inputs to this process are:

a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, the luma motion vectors in $\frac{1}{16}$ fractional-sample accuracy mvA and mvB, the chroma motion vectors mvCA and mvCB, the reference indices refIdxA and refIdxB, the prediction list flags predListFlagA and predListFlagB.

Let predSamplesLA$_L$ and predSamplesLB$_L$ be (cbWidth)×(cbHeight) arrays of predicted luma sample values and, predSamplesLA$_{Cb}$, predSamplesLB$_{Cb}$, predSamplesLA$_{Cr}$ and predSamplesLB$_{Cr}$ be (cbWidth/SubWidthC)×(cbHeight/SubHeightC) arrays of predicted chroma sample values.

The predSamples$_L$, predSamples$_{Cb}$ and predSamples$_{Cr}$ are derived by the following ordered operations:

1. For N being each of A and B, the following applies:
   . . .

2. The partition angle and distance of merge geo mode variable angleIdx and distanceIdx are set according to the value of merge_geo_partition_idx[xCb][yCb] as specified in Table 36.

3. The variable explictWeightedFlag is derived as follow:
   lumaWeightedFlagA=predListFlagA? luma_weight_l1_flag[refIdxB]: luma_weight_l0_flag[refIdxA]
   lumaWeightedFlagB=predListFlagB? luma_weight_l1_flag[refIdxB]: luma_weight_l0_flag[refIdxB]
   chromaWeightedFlagA=predListFlagA? chroma_weight_l1_flag[refIdxA]: chroma weight_l0_flag[refIdxA]

chromaWeightedFlagB=predListFlagB? chroma_weight_l1_flag[refIdxB]: chroma weight_l0_flag[refIdxB]

weightedFlag=lumaWeightedFlagA||lumaWeightedFlagB||chromaWeightedFlagA||chromaWeightedFlagB 4. The prediction samples inside the current luma coding block, predSamples$_L$[x$_L$][y$_L$] with x$_L$=0 . . . cbWidth−1 and y$_L$=0 . . . cbHeight−1, are derived by invoking the weighted sample prediction process for geo merge mode specified in clause 8.5.7.2 if weightedFlag is equal to 0, and the explicit weighted sample prediction process in clause 8.5.6.6.3 if weightedFlag is equal to 1 with the coding block width nCbW set equal to cbWidth, the coding block height nCbH set equal to cbHeight, the sample arrays predSamplesLA$_L$, and predSamplesLB$_L$, and the variables angleIdx and distanceIdx, and cIdx equal to 0 as inputs.

5. The prediction samples inside the current chroma component Cb coding block, predSamples$_{Cb}$[x$_C$][y$_C$] with x$_C$=0 . . . cbWidth/SubWidthC−1 and y$_C$=0 . . . cbHeight/SubHeightC−1, are derived by invoking the weighted sample prediction process for geo merge mode specified in clause 8.5.7.2 if weightedFlag is equal to 0, and the explicit weighted sample prediction process in clause 8.5.6.6.3 if weightedFlag is equal to 1 with the coding block width nCbW set equal to cbWidth/SubWidthC, the coding block height nCbH set equal to cbHeight/SubHeightC, the sample arrays predSamplesLA$_{Cb}$ and predSamplesLB$_{Cb}$, and the variables angleIdx and distanceIdx, and cIdx equal to 1 as inputs.

6. The prediction samples inside the current chroma component Cr coding block, predSamples$_{Cr}$[x$_C$][y$_C$] with x$_C$=0 . . . cbWidth/SubWidthC−1 and y$_C$=0 . . . cbHeight/SubHeightC−1, are derived by invoking the weighted sample prediction process for geo merge mode specified in clause 8.5.7.2 if weightedFlag is equal to 0, and the explicit weighted sample prediction process in clause 8.5.6.6.3 if weightedFlag is equal to 1 with the coding block width nCbW set equal to cbWidth/SubWidthC, the coding block height nCbH set equal to cbHeight/SubHeightC, the sample arrays predSamplesLA$_{Cr}$ and predSamplesLB$_{Cr}$, and the variables angleIdx and distanceIdx, and cIdx equal to 2 as inputs.

7. The motion vector storing process for merge geo mode specified in clause 8.5.7.3 is invoked with the luma coding block location (xCb, yCb), the luma coding block width cbWidth, the luma coding block height cbHeight, the partition direction angleIdx and distanceIdx, the luma motion vectors mvA and mvB, the reference indices refIdxA and refIdxB, and the prediction list flags predListFlagA and predListFlagB as inputs.

TABLE 36

Specification of the angleIdx and distanceIdx values based
on the merge_geo_partition_idx value.

| | merge_geo_partition_idx | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| angleIdx | 0 | 0 | 1 | 1 | 1 | 1 | 2 | 2 | 2 | 2 | 3 | 3 | 3 | 3 | 4 | 4 | 4 |
| distance Idx | 1 | 3 | 0 | 1 | 2 | 3 | 0 | 1 | 2 | 3 | 0 | 1 | 2 | 3 | 0 | 1 | 2 |

TABLE 36-continued

Specification of the angleIdx and distanceIdx values based
on the merge_geo_partition_idx value.

| | merge_geo_partition_idx | | | | | | | | | | | | | | | | |
|---|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 | 33 |
| angleIdx | 4 | 6 | 6 | 8 | 8 | 8 | 8 | 9 | 9 | 9 | 9 | 10 | 10 | 10 | 10 | 11 | 11 |
| distanceIdx | 3 | 1 | 3 | 0 | 1 | 2 | 3 | 0 | 1 | 2 | 3 | 0 | 1 | 2 | 3 | 0 | 1 |

| | merge_geo_partition_idx | | | | | | | | | | | | | | | | |
|---|---|---|---|---|---|---|---|---|---|---|---|---|---|---|---|---|---|
| | 34 | 35 | 36 | 37 | 38 | 39 | 40 | 41 | 42 | 43 | 44 | 45 | 46 | 47 | 48 | 49 | 50 |
| angleIdx | 11 | 11 | 12 | 12 | 13 | 13 | 13 | 14 | 14 | 14 | 15 | 15 | 15 | 16 | 16 | 16 | 18 |
| distanceIdx | 2 | 3 | 1 | 3 | 1 | 2 | 3 | 1 | 2 | 3 | 1 | 2 | 3 | 1 | 2 | 3 | 1 |

| | merge_geo_partition_idx | | | | | | | | | | | | |
|---|---|---|---|---|---|---|---|---|---|---|---|---|---|
| | 51 | 52 | 53 | 54 | 55 | 56 | 57 | 58 | 59 | 60 | 61 | 62 | 63 |
| angleIdx | 18 | 20 | 20 | 20 | 21 | 21 | 21 | 22 | 22 | 22 | 23 | 23 | 23 |
| distanceIdx | 3 | 1 | 2 | 3 | 1 | 2 | 3 | 1 | 2 | 3 | 1 | 2 | 3 |

8.5.6.6.3 Explicit Weighted Sample Prediction Process

Inputs to this process are:
two variables nCbW and nCbH specifying the width and the height of the current coding block,
two (nCbW)×(nCbH) arrays predSamplesL0 and predSamplesL1,
the prediction list utilization flags, predFlagL0 and predFlagL1,
the reference indices, refIdxL0 and refIdxL1,
the variable cIdx specifying the colour component index,
the sample bit depth, bitDepth.

Output of this process is the (nCbW)×(nCbH) array pbSamples of prediction sample values.

The variable shift1 is set equal to Max(2, 14−bitDepth).
The variables log2Wd, o0, o1, w0 and w1 are derived as follows:
If cIdx is equal to 0 for luma samples, the following applies:

$$\log 2Wd = \text{luma\_log2\_weight\_denom} + \text{shift1} \quad (1010)$$

$$w0 = LumaWeightL0[refIdxL0] \quad (1011)$$

$$w1 = LumaWeightL1[refIdxL1] \quad (1012)$$

$$o0 = \text{luma\_offset\_l0}[refIdxL0] << (bitDepth - 8) \quad (1013)$$

$$o1 = \text{luma\_offset\_l1}[refIdxL1] << (bitDepth - 8) \quad (1014)$$

Otherwise (cIdx is not equal to 0 for chroma samples), the following applies:

$$\log 2Wd = ChromaLog2WeightDenom + \text{shift1} \quad (1015)$$

$$w0 = ChromaWeightL0[refIdxL0][cIdx - 1] \quad (1016)$$

$$w1 = ChromaWeightL1[refIdxL1][cIdx - 1] \quad (1017)$$

$$o0 = ChromaOffsetL0[refIdxL0][cIdx - 1] << (bitDepth - 8) \quad (1018)$$

$$o1 = ChromaOffsetL1[refIdxL1][cIdx - 1] << (bitDepth - 8) \quad (1019)$$

The prediction sample pbSamples[x][y] with x=0 . . . nCbW−1 and y=0 . . . nCbH−1 are derived as follows:

If predFlagL0 is equal to 1 and predFlagL1 is equal to 0, the prediction sample values are derived as follows:

$$\text{if } (\log 2Wd >= 1) pbSamples[x][y] = Clip3(0, (1 << bitDepth) - 1, \quad (1020)$$
$$((predSamplesL0[x][y] * w0 + 2^{log2Wd-1}) >> \log 2Wd) + o0) \text{ else}$$

$$pbSamples[x][y] =$$
$$Clip3(0, (1 << bitDepth) - 1, predSamplesL0[x][y] * w0 + o0)$$

Otherwise, if predFlagL0 is equal to 0 and predFlagL1 is equal to 1, the prediction sample values are derived as follows:

$$\text{if } (\log 2Wd >= 1) pbSamples[x][y] = Clip3(0, (1 << bitDepth) - 1, \quad (1021)$$
$$((predSamplesL1[x][y] * w1 + 2^{log2Wd-1}) >> \log 2Wd) + o1) \text{ else}$$

$$pbSamples[x][y] =$$
$$Clip3(0, (1 << bitDepth) - 1, predSamplesL1[x][y] * w1 + o1)$$

Otherwise (predFlagL0 is equal to 1 and predFlagL1 is equal to 1), the prediction sample values are derived as follows:

$$pbSamples[x][y] = Clip3(0, 1 << bitDepth) - 1, \quad (1022)$$
$$(predSamplesL0[x][y] * w0 + predSamplesL1[x][y] * w1 +$$
$$((o0 + o1 + 1) << \log 2Wd)) >> (\log 2Wd + 1))$$

Embodiment 8 discloses a syntax of merge data parameter that comprises a check of a variable that indicates the presence of a non-rectangular merge mode (e.g. GEO mode). The syntax example is given below:

|  | Descriptor |
|---|---|
| merge_data( x0, y0, cbWidth, cbHeight, chType ) { | |
|   if( CuPredMode[ chType ][ x0 ][ y0 ]  = =  MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && | |
| cbHeight >= 8 ) | |
|       merge_subblock_flag[ x0 ][ y0 ] | ae(v) |
|     if( merge_subblock_flag[ x0 ][ y0 ]  = =  1 ) { | |
|       if( MaxNumSubblockMergeCand > 1 ) | |
|         merge_subblock_idx[ x0 ][ y0 ] | ae(v) |
|     } else { | |
|       if( cbWidth < 128 && cbHeight < 128 && ( (sps_ciip_enabled_flag && | |
|         cu_skip_flag[ x0 ][ y0 ] = = 0 && ( cbWidth * cbHeight ) >= | |
| 64 ) \|\| | |
|         ( sps_geo_enabled_flag && MaxNumGeoMergeCand > 1 && | |
|         cbWidth>=8 && cbHeight >=8 && cbWidth < 8*cbHeight && | |
| cbHeight < 8*cbWidth && slice_type = = B ) ) ) | |
|         regular_merge_flag[ x0 ][ y0 ] | ae(v) |
|       if( regular_merge_flag[ x0 ][ y0 ]  = =  1 ) { | |
|         if( sps_mmvd_enabled_flag ) | |
|           mmvd_merge_flag[ x0 ][ y0 ] | ae(v) |
|         if( mmvd_merge_flag[ x0 ][ y0 ]  = =  1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else if( MaxNumMergeCand > 1 ) | |
|           merge_idx[ x0 ][ y0 ] | ae(v) |
|       } else { | |
|         if( sps_ciip_enabled_flag && sps_geo_enabled_flag && | |
|         MaxNumGeoMergeCand > 1 && slice_type = = B && | |
|         cu_skip_flag[ x0 ][ y0 ] = = 0 && | |
|          cbWidth >= 8 && cbHeight >= 8 && cbWidth < 8*cbHeight | |
| && cbHeight < 8*cbWidth && cbWidth < 128 && cbHeight < 128 ) | |
|         ciip_flag[ x0 ][ y0 ] | ae(v) |
|         if( ciip_flag[ x0 ][ y0 ]  &&  MaxNumMergeCand > 1 ) | |
|           merge_idx[ x0 ][ y0 ] | ae(v) |
|         if( !ciip_flag[ x0 ][ y0 ]  &&  MaxNumGeoMergeCand > 1 ) { | |
|           merge_geo_partition_idx[ x0 ][ y0 ] | ae(v) |
|           merge_geo_idx0[ x0 ][ y0 ] | ae(v) |
|           if( MaxNumGeoMergeCand > 2 ) | |
|             merge_geo_idx1[ x0 ][ y0 ] | ae(v) |
|         } | |
|       } | |
|     } | |
|   } | |
| } | |

Variable MaxNumGeoMergeCand is derived according to any of the previous embodiments.

Embodiment 9 uses an alternative variable SliceMaxNumGeoMergeCand which is derived from MaxNumGeoMergeCand variable. The value of MaxNumGeoMergeCand is obtained on the higher signaling levels (i.e. PH, PPS or SPS).

In this embodiment SliceMaxNumGeoMergeCand is derived based on the value of MaxNumGeoMergeCand and additional checks that are performed for the slice.

For example, SliceMaxNumGeoMergeCand=(num_l0_weighted_ref_pics>0||num_l1_weighted_ref_pics>0)? 0: MaxNumGeoMergeCand.

Embodiment 10 is a variation of Embodiment 9 that uses the following expression to determine MaxNumGeoMerge-Cand value:

SliceMaxNumGeoMergeCand=(!pic_inter_slice_present_flag)? 0: MaxNumGeoMergeCand

Embodiment 11 is a combination with Embodiment 4.

The following syntax table is defined:

|  | Descriptor |
|---|---|
| picture_header_rbsp( ) { | |
|   ... | |
|   pic_inter_bipred_slice_present_flag | |
|   if (!pic_inter_bipred_slice_present_flag ) | |
|     pic_inter_slice_present_flag | |
|     if( pic_inter_slice_present_flag ) | |
|       pic_intra_slice_present_flag | u(1) |
|   ... | |
|   if( ( pps_weighted_pred_flag \|\| | |
|   pps_weighted_bipred_flag ) && | |
|     pic_inter_slice_present_flag && | |
| weighted_pred_table_present_in_ph_flag ) | |
|     pred_weight_table( ) | |
|   ... | |

Variable MaxNumGeoMergeCand is derived as follows:

SliceMaxNumGeoMergeCand=(!pic_inter_bipred_slice_present_flag)? 0: MaxNumGeoMergeCand In accordance with the description above the following embodiments are, particularly, provided herein.

Figure 15:
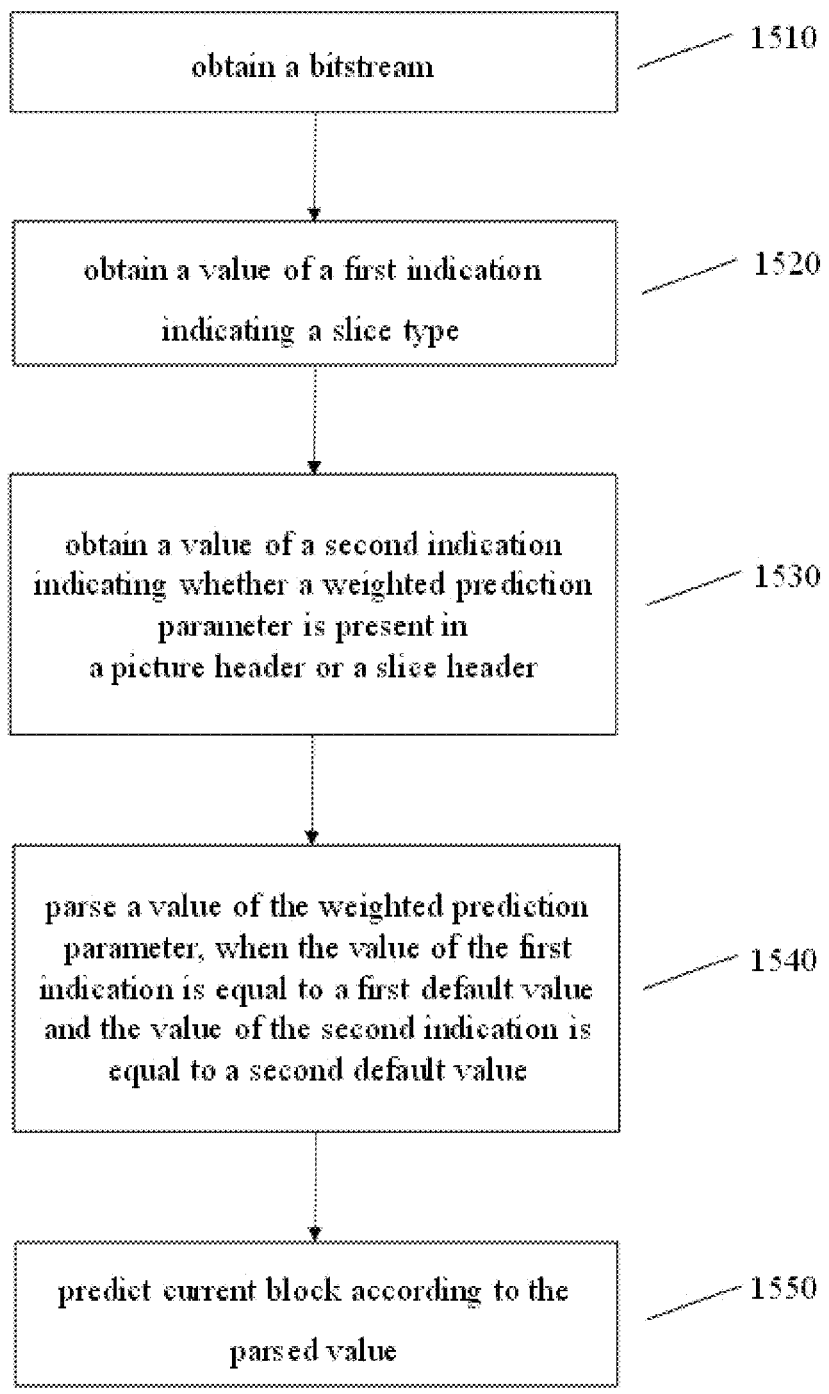
FIG. 15 is a flow chart illustrating a method of coding according to an embodiment.

FIG. 15 is a flow chart illustrating a method of coding according to an embodiment.

The method illustrated in FIG. 15 comprises the operation of obtaining 1510 a bitstream for a current picture (for example, of an encoded video sequence). A value of a first indicator for the current picture is obtained 1520 (for example, by parsing a respective syntax element comprised in the bitstream) according to the bitstream. The first indicator indicates a slice type (of a slice of the current picture). Further, the method comprises the operation of obtaining 1530 (for example, by parsing a respective syntax element comprised in the bitstream) a value of a second indicator for the current picture according to the bitstream, wherein the second indicator indicates whether a weighted prediction parameter is present in a picture header of the bitstream or is present in a slice header of the bitstream.

Then, a value of the weighted prediction parameter is parsed 1540 for a current block from the bitstream, when the value of the first indicator is equal to a first preset value (for example, 1) and the value of the second indicator is equal to a second preset value (for example, 2) indicating that a weighted prediction parameter is present in a picture header of the bitstream or is present in a slice header of the bitstream, wherein the current block is comprised in a current slice of the current picture. The first preset value is an integer value and the second preset value is an integer value. Then, the current block is predicted 1550 (a prediction block is generated for the current block) according to the value of the parsed weighted prediction parameter.

Figure 16A:
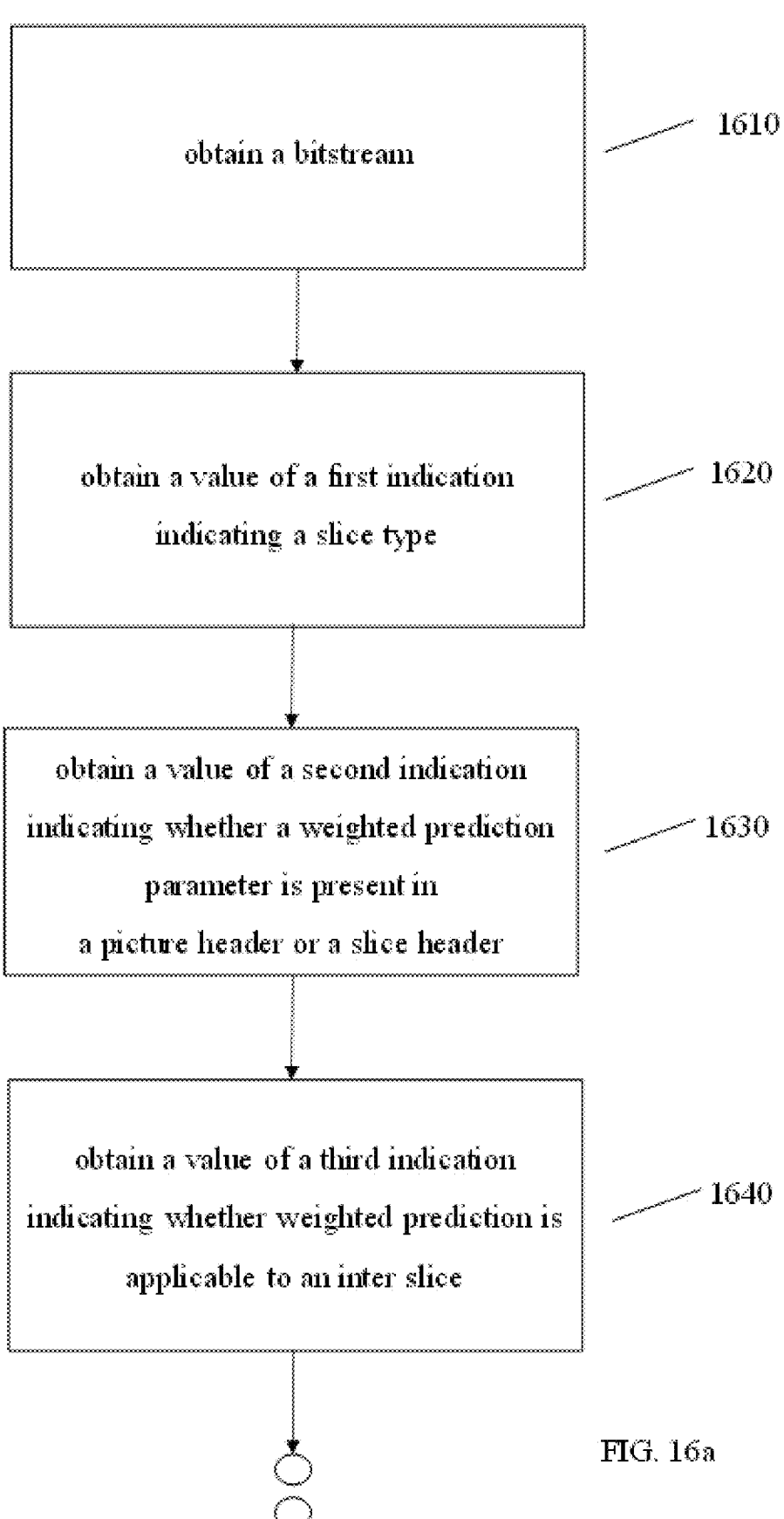
FIGS. 16a and 16b are a flow chart illustrating a method of coding according to another embodiment.
Figure 16B:
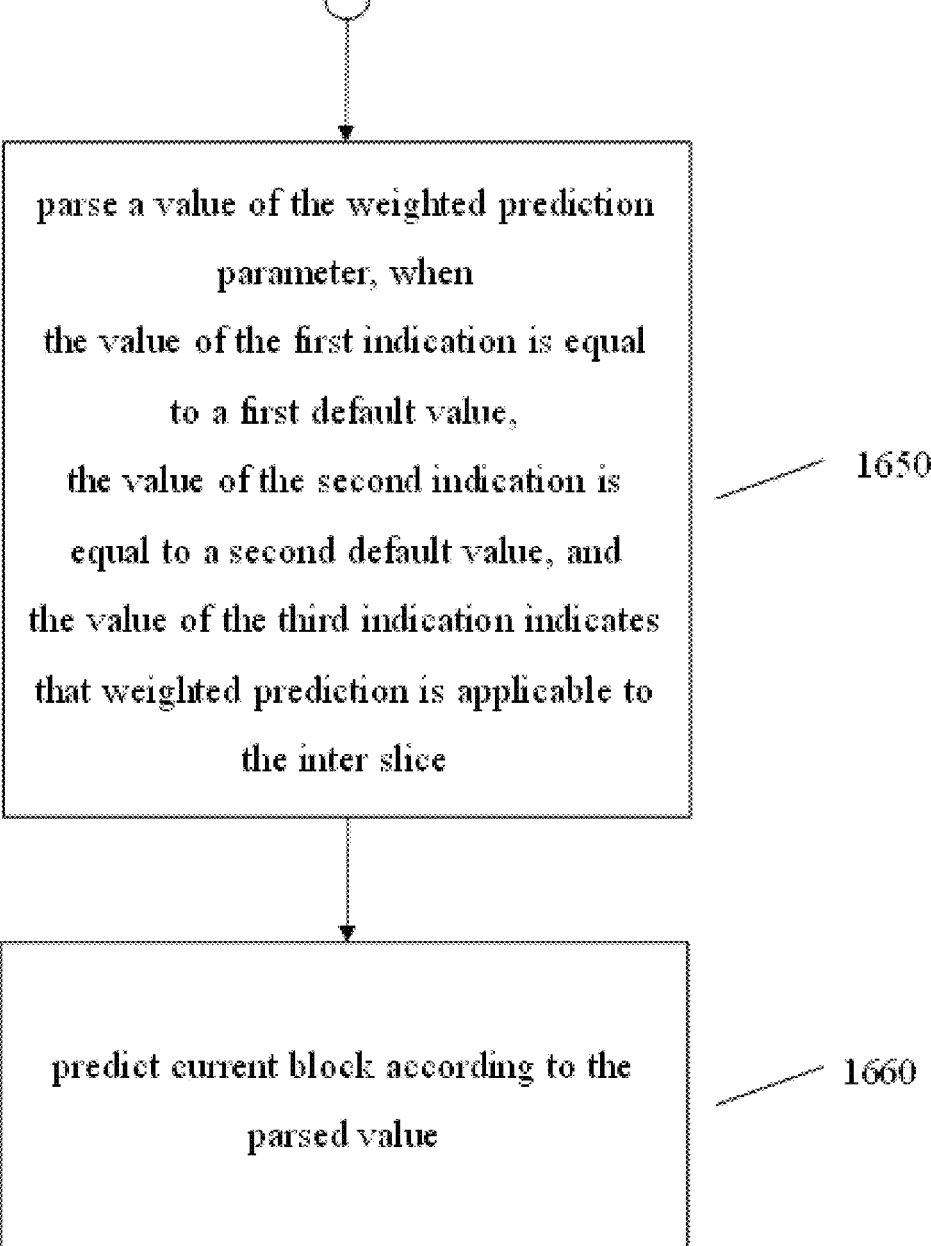

A method of coding according to another embodiment is illustrated in FIGS. 16*a* and 16*b*.

This method comprises the operation of obtaining 1610 a bitstream for a current picture (for example, of an encoded video sequence). A number of indicator values is obtained. Thus, this method comprises obtaining 1620 (for example, by parsing a respective syntax element comprised in the bitstream) a value of a first indicator for the current picture according to the bitstream, wherein the first indicator indicates a slice type (of a slice of the current picture), obtaining 1630 (for example, by parsing a respective syntax element comprised in the bitstream) a value of a second indicator for the current picture according to the bitstream, wherein the second indicator indicates whether a weighted prediction parameter is present in a picture header of the bitstream or is present in a slice header of the bitstream, and obtaining 1640 (for example, by parsing a respective syntax element comprised in the bitstream) a value of a third indicator for the current picture according to the bitstream, wherein the third indicator indicates whether weighted prediction is applicable to an inter slice, wherein the slice type of the inter slice is B slice or P slice.

Then, a value of the weighted prediction parameter is parsed 1650 for a current block from the bitstream, when a) the value of the first indicator is equal to a first preset value (for example, 1), b) the value of the second indicator is equal to a second preset value (for example 1) and c) the value of the third indicator indicates that weighted prediction is applicable to the inter slice, wherein the current block is comprised in a current slice of the current picture, the first preset value is an integer value, and the second preset value is an integer value. The current block is predicted 1660 (a prediction block is generated for the current block) according to the parsed value of the weighted prediction parameter.

The above-described methods may be implanted in a decoding device as described in the following.

Figure 17:
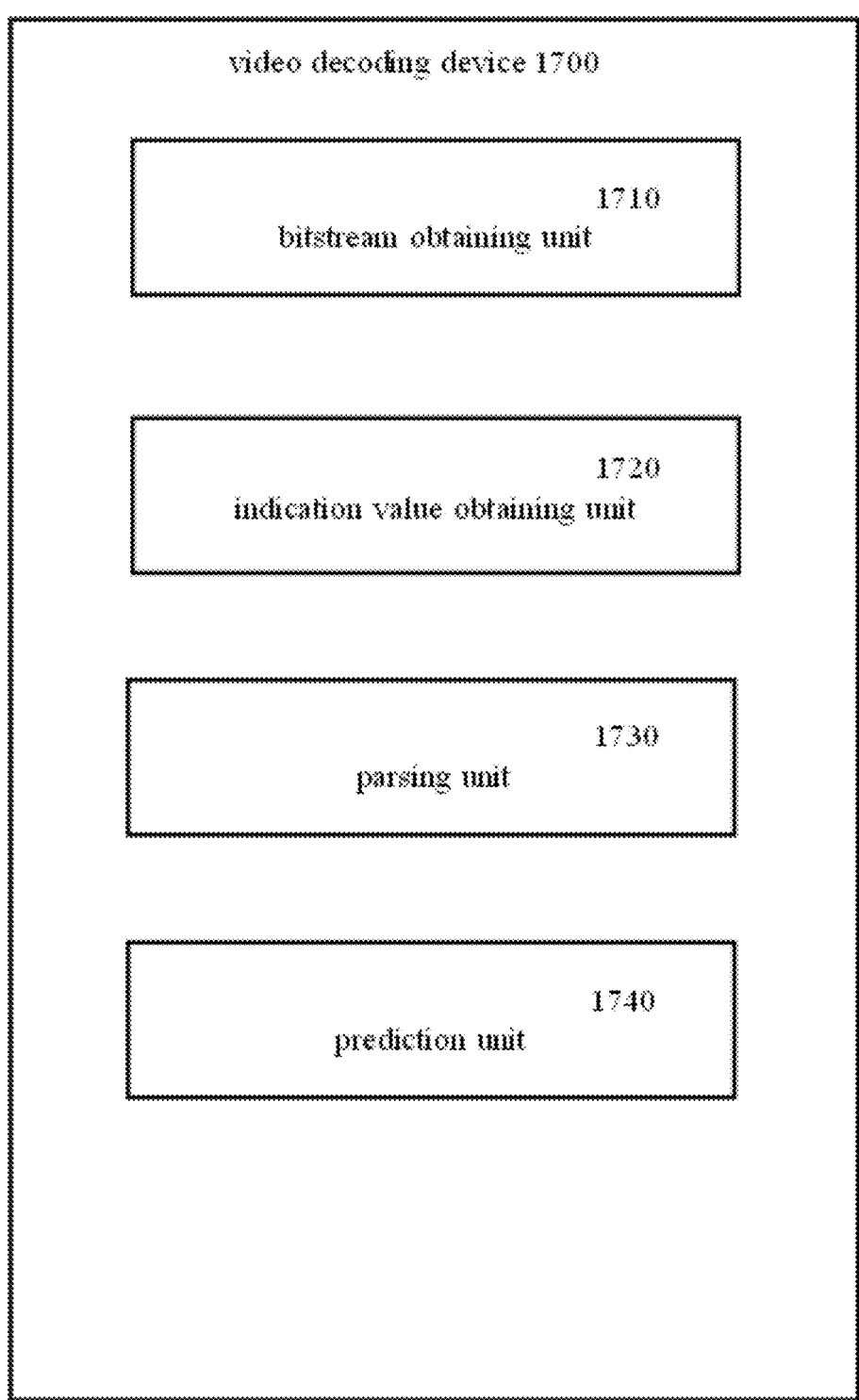
FIG. 17 illustrates a decoding device according to an embodiment.

It is provided a decoding device 1700 as shown in FIG. 17. The decoding device 1700 comprises a bitstream obtaining unit 1710, an indicator value obtaining unit 1720, a parsing unit 1730 and a prediction unit 1740.

The bitstream obtaining unit 1710 is configured for obtaining a bitstream for a current picture.

According to an embodiment the indicator value obtaining unit 1720 is configured for a) obtaining a value of a first indicator for the current picture according to the bitstream, wherein the first indicator indicates a slice type; and b) obtaining a value of a second indicator for the current picture according to the bitstream, wherein the second indicator indicates whether a weighted prediction parameter is present in a picture header of the bitstream or is present in a slice header of the bitstream.

In this case, the parsing unit 1730 is configured for parsing a value of the weighted prediction parameter for a current block from the bitstream, when the value of the first indicator is equal to a first preset value (for example 1) and the value of the second indicator is equal to a second preset value (for example 1), wherein the current block is comprised in a current slice of the current picture, the first preset value is an integer value, and the second preset value is an integer value, and the prediction unit is configured for predicting the current block according to the value of the weighted prediction parameter.

According to another embodiment, the indicator value obtaining unit 1720 is configured for a) obtaining a value of a first indicator for the current picture according to the bitstream, wherein the first indicator indicates a slice type;

b) obtaining a value of a second indicator for the current picture according to the bitstream, wherein the second indicator indicates whether a weighted prediction parameter is present in a picture header of the bitstream or is present in a slice header of the bitstream; and c) obtaining a value of a third indicator for the current picture according to the bitstream, wherein the third indicator indicates whether weighted prediction is applicable to an inter slice, wherein the slice type of the inter slice is B slice or P slice.

In this case, the parsing unit 1730 is configured for parsing a value of the weighted prediction parameter for a current block from the bitstream, when the value of the first indicator is equal to a first preset value (for example 1), the value of the second indicator is equal to a second preset value (for example 1) and the value of the third indicator indicates that weighted prediction is applicable to the inter slice, wherein the current block is comprised in a current slice of the current picture, the first preset value is an integer value, and the second preset value is an integer value; and the prediction unit 1740 is configured for predicting the current block according to the value of the weighted prediction parameter.

Figure 10:
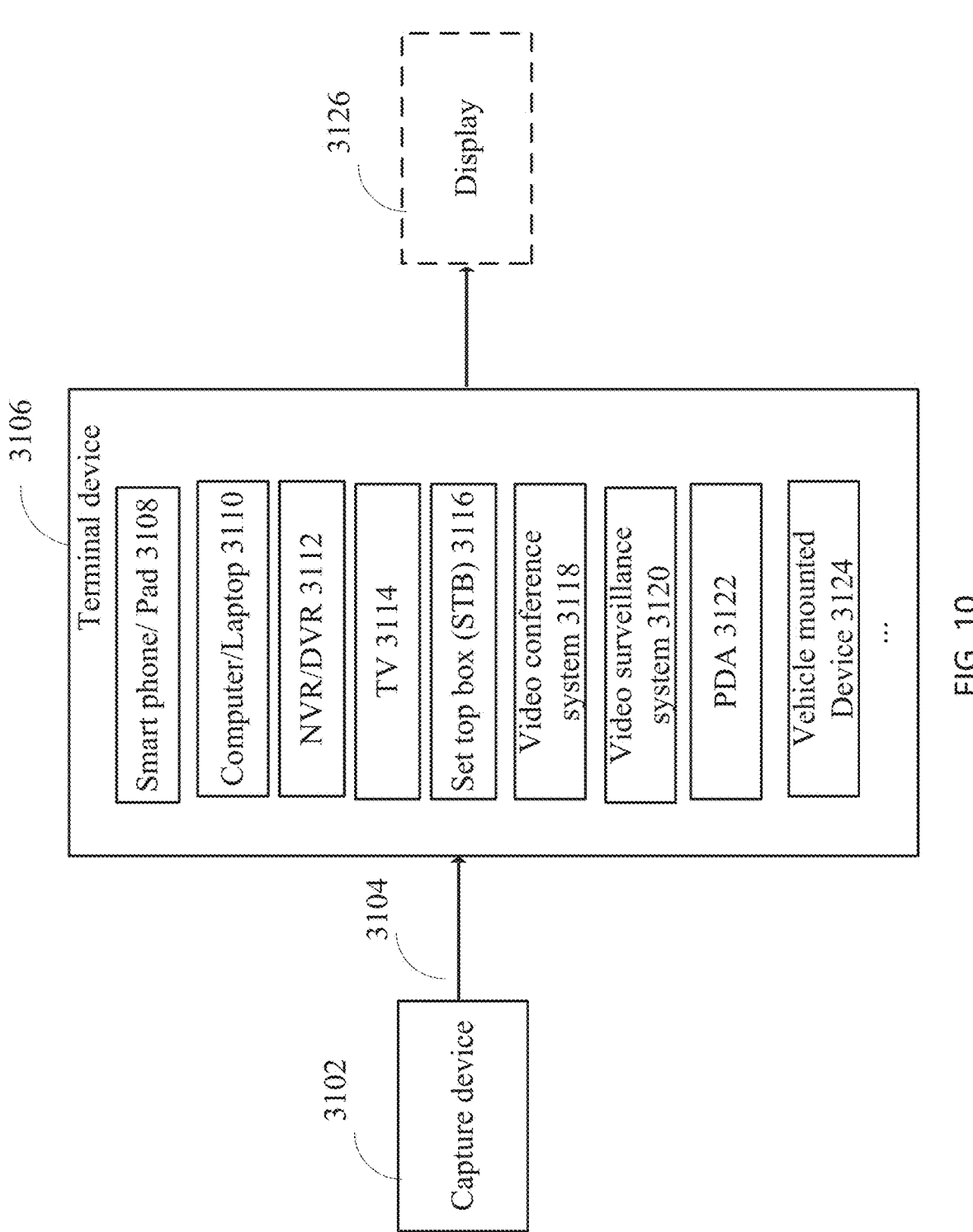
FIG. 10 is a block diagram showing an example structure of a content supply system 3100 which realizes a content delivery service.
Figure 11:
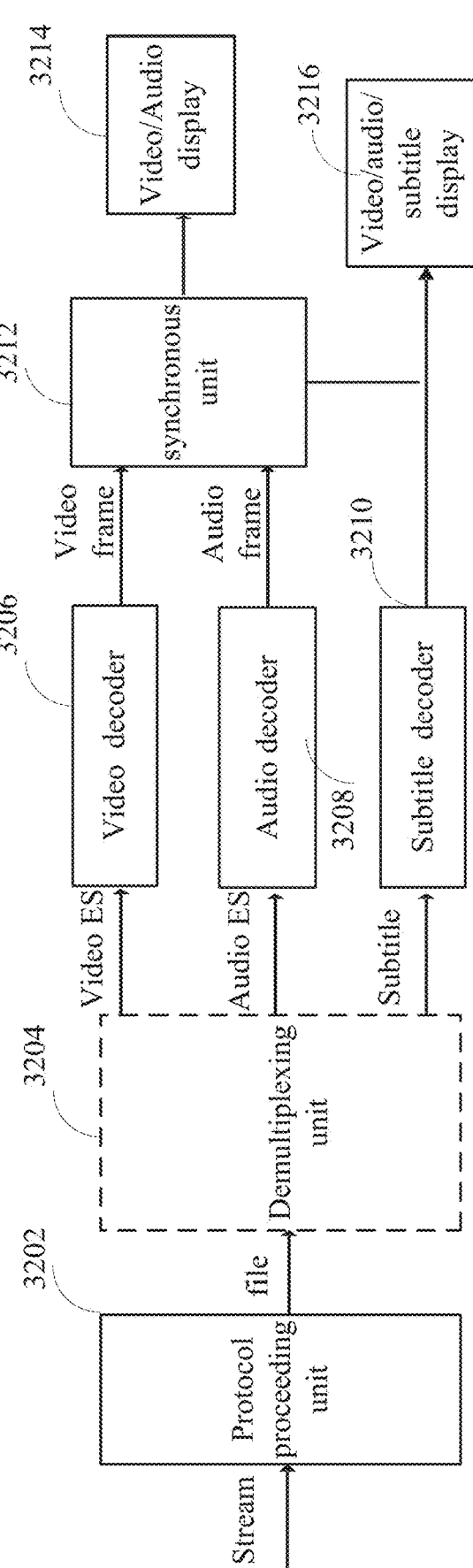
FIG. 11 is a block diagram showing a structure of an example of a terminal device.

The decoding device 1700 shown in FIG. 17 may be or may be comprised by the decoder 30 shown in FIGS. 1A, 1B, and 3 and the video decoder 3206 shown in FIG. 11. The decoding device 1700 shown in FIG. 17 may be comprised by the video coding device 400 shown in FIG. 4, the apparatus 500 shown in FIG. 5, the terminal device 3106 shown in FIG. 10, the apparatus 1300 shown in FIG. 13 and the apparatus 1400 shown in FIG. 14.

Following is an explanation of the applications of the encoding method as well as the decoding method as shown in the above-mentioned embodiments, and a system using them.

FIG. 10 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 3106 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

FIG. 11 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 11) before feeding it to the synchronous unit 3212. Similarly, the audio frame may store in a buffer (not shown in FIG. 11) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

+ Addition

− Subtraction (as a two-argument operator) or negation (as a unary prefix operator)

\* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators

The following logical operators are defined as follows:

x && y Boolean logical "and" of x and y x||y Boolean logical "or" of x and y

! Boolean logical "not"

x? y:z If x is TRUE or not equal to 0, evaluates to the value of y; otherwise, evaluates to the value of z.

Relational Operators

The following relational operators are defined as follows:

> Greater than

>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following assignment operators are defined as follows:

= Assignment operator

++ Increment, i.e., x++ is equivalent to x=x+1; when used in an array index, evaluates to the value of the variable prior to the increment operation.

— Decrement, i.e., x— is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$Abs(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$Atan2(y, x) = \begin{cases} Atan\left(\frac{y}{x}\right); & x > 0 \\ Atan\left(\frac{y}{x}\right) + \pi; & x < 0 \,\&\&\, y >= 0 \\ Atan\left(\frac{y}{x}\right) - \pi; & x < 0 \,\&\&\, y < 0 \\ +\frac{\pi}{2}; & x = 0 \,\&\&\, y >= 0 \\ -\frac{\pi}{2}; & \text{otherwise} \end{cases}$$

Ceil(x) the smallest integer greater than or equal to x.

$$Clip1_Y(x) = Clip3(0, (1 << BitDepth_Y) - 1, x)$$

$$Clip1_C(x) = Clip3(0, (1 << BitDepth_C) - 1, x)$$

$$Clip3(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).

Log2(x) the base-2 logarithm of x.

Log10(x) the base-10 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

$$Round(x) = Sign(x) * Floor(Abs(x) + 0.5)$$

$$Sign(x) = \begin{cases} 1; & x > 0 \\ 0; & x = 0 \\ -1; & x < 0 \end{cases}$$

Sin(x) the trigonometric sine function operating on an argument x in units of radians Sqrt(x)=$\sqrt{x}$ Swap(x, y)=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
| --- |
| operations (with operands x, y, and z) |
| "x++", "x−−" |
| "!x", "−x" (as a unary prefix operator) |
| $x^y$ |
| $"x * y", "x / y", "x \div y", "\frac{x}{y}", "x \% y"$ |
| $"x + y", "x - y"$ (as a two-argument operator), $"\sum_{i=x}^{y} f(i)"$ |
| "x << y", "x >> y" |
| "x < y", "x <= y", "x > y", "x >= y" |
| "x== y", "x != y" |
| "x & y" |
| "x \| y" |
| "x && y" |
| "x \|\| y" |
| "x ? y : z" |
| "x .. y" |
| "x = y", "x += y", "x −= y" |

Text description of logical operations

In the text. a statement of logical operations as would be described mathematically in the following form:

```
if(condition 0)
    statement 0
else if(condition 1)
    statement 1
. . .
else /* informative remark on remaining condition*/
    statement n
``` may be described in the following manner:

. . . as follows/ . . . the following applies:

If condition 0, statement 0

Otherwise, if condition 1, statement 1

. . .

Otherwise (informative remark on remaining condition), statement n.

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if(condition 0a && condition 0b)
    statement 0
else if(condition 1a||condition 1b)
    statement 1
. . .
else
    statement n
``` may be described in the following manner:

. . . as follows/ . . . the following applies:

If all of the following conditions are true, statement 0:

condition 0a condition 0b

Otherwise, if one or more of the following conditions are true, statement 1:

condition 1a condition 1b

. . .

Otherwise, statement n

In the text, a statement of logical operations as would be described mathematically in the following form:

```
if(condition 0)
    statement 0
if(condition 1)
    statement 1
``` may be described in the following manner:

When condition 0, statement 0

When condition 1, statement 1.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for embodiment of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for embodiment of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Further embodiments of the present disclosure are provided in the following. It should be noted that the numbering used in the following section does not necessarily need to comply with the numbering used in the previous sections.

Embodiment 1: A method of inter prediction of a block of a picture, wherein signaling of weighted prediction parameters and enabling of non-rectangular inter prediction is performed for a group of predicted blocks, the method comprising: obtaining an inter prediction mode parameters for a block, wherein the obtaining comprises the check of whether a non-rectangular inter prediction mode is enabled for the group of blocks that comprises the predicted block; and obtaining weighted prediction parameters associated with the block and an inter prediction mode parameters for a block with respect to the reference picture being indicated for the block and weighted prediction parameters specified for the group of blocks.

Embodiment 2: A method of embodiment 1, wherein enabling of non-rectangular inter prediction is performed by indicating the maximum number of triangular merge candidates (MaxNumTriangleMergeCand) that is greater than 1.

Embodiment 3: A method of embodiment 1 or 2, wherein non-rectangular inter prediction is inferred to be disabled when weighted prediction parameters specifies enabled weighted prediction for at least one reference index.

Embodiment 4: A method of any embodiments 1 to 3, wherein a group of blocks is a picture and both weighted prediction parameters and enabling of inter prediction non-rectangular mode parameters are indicated in picture header.

Embodiment 5: A method of any embodiments 1 to 4, wherein a group of blocks is a slice and both weighted prediction parameters and enabling of inter prediction non-rectangular mode parameters are indicated at the slice header.

Embodiment 6: A method of any embodiments 1 to 5, wherein inter prediction mode parameters comprise reference index used to determine the reference picture and motion vector information used to determine position of the reference block in the reference picture.

Embodiment 7: A method of any embodiments 1 to 6, where non-rectangular merge mode is a triangular partitioning mode.

Embodiment 8: A method of any embodiments 1 to 7, where non-rectangular merge mode is a GEO mode.

Embodiment 9: A method of any embodiments 1 to 8, wherein weighted prediction is a slice-level luminance compensation mechanism (such as global weighted prediction).

Embodiment 10: A method of any embodiments 1 to 9, wherein weighted prediction is a block-level luminance compensation mechanism, such as local illumination compensation (LIC).

Embodiment 11: A method of any embodiments 1 to 10, wherein weighted prediction parameters comprise: a set of flags indicating whether weighted prediction is applied to luma and chroma components of the predicted block; Linear model parameters \alpha and \betta specifying the linear transformation of the values of the predicted block.

Figure 12:
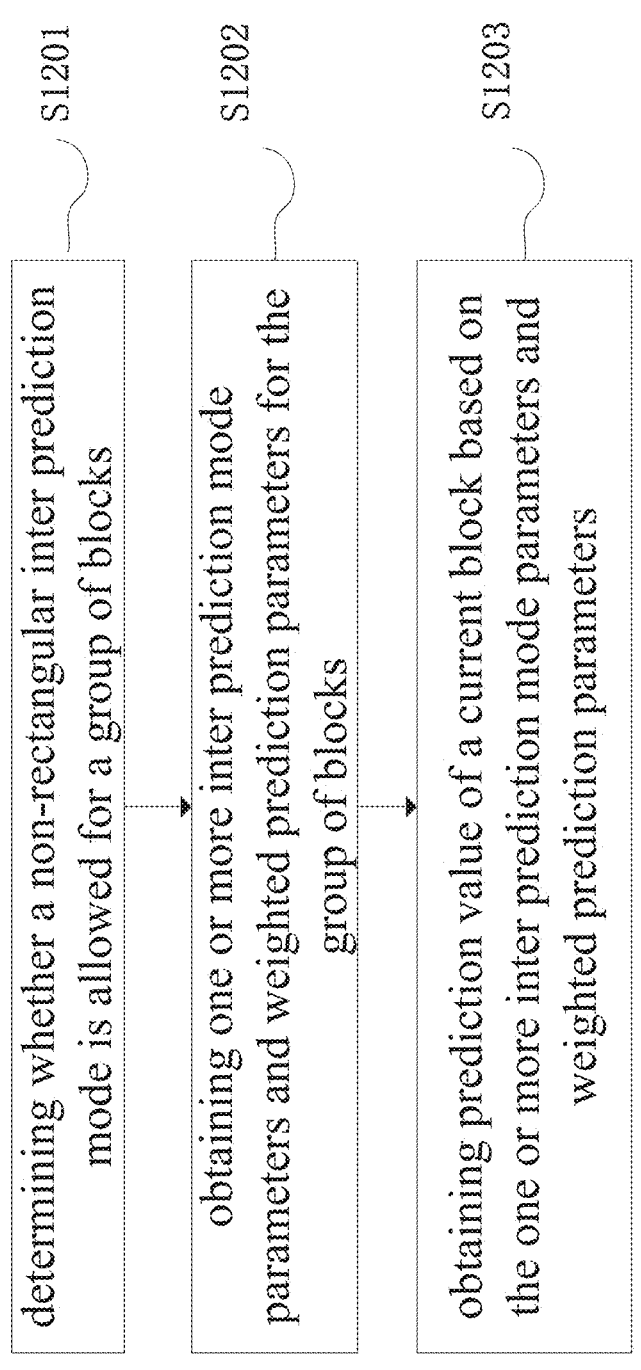
FIG. 12 is a block diagram illustrating an example of an inter prediction method according to the present application.

In a first aspect of the present application, as shown in FIG. 12, an inter prediction method 1200 is disclosed, which comprises: S1201: determining whether a non-rectangular inter prediction mode is allowed for a group of blocks; S1202: obtaining one or more inter prediction mode parameters and weighted prediction parameters for the group of blocks; and S1203: obtaining prediction value of a current block based on the one or more inter prediction mode parameters and weighted prediction parameters, wherein one of the inter prediction mode parameters indicates reference picture information for the current block, and wherein the group of blocks comprises the current block.

In a feasible embodiment, the reference picture information comprises whether weighted prediction is enabled for a reference picture index, and wherein the non-rectangular inter prediction mode is disabled in the event that weighted prediction is enabled.

In a feasible embodiment, the non-rectangular inter prediction mode is enabled in the event that weighted prediction is disabled.

In a feasible embodiment, determining the non-rectangular inter prediction mode is allowed, comprising: indicating the maximum number of triangular merge candidates (MaxNumTriangleMergeCand) is greater than 1.

In a feasible embodiment, the group of blocks consists of a picture, and wherein the weighted prediction parameters and indicating information for determining the non-rectangular inter prediction mode is allowed are in a picture header of the picture.

In a feasible embodiment, the group of blocks consists of a slice, and wherein the weighted prediction parameters and indicating information for determining the non-rectangular inter prediction mode is allowed are in a slice header of the slice.

In a feasible embodiment, the non-rectangular inter prediction mode is a triangular partitioning mode.

In a feasible embodiment, the non-rectangular inter prediction mode is a geometric (GEO) partitioning mode.

In a feasible embodiment, the weighted prediction parameters are used for a slice-level luminance compensation.

In a feasible embodiment, the weighted prediction parameters are used for a block-level luminance compensation.

In a feasible embodiment, the weighted prediction parameters comprises: flags indicating whether the weighted prediction is applied to luma and/or chroma components of a prediction block; and linear model parameters specifying a linear transformation of a value of the prediction block.

Figure 13:
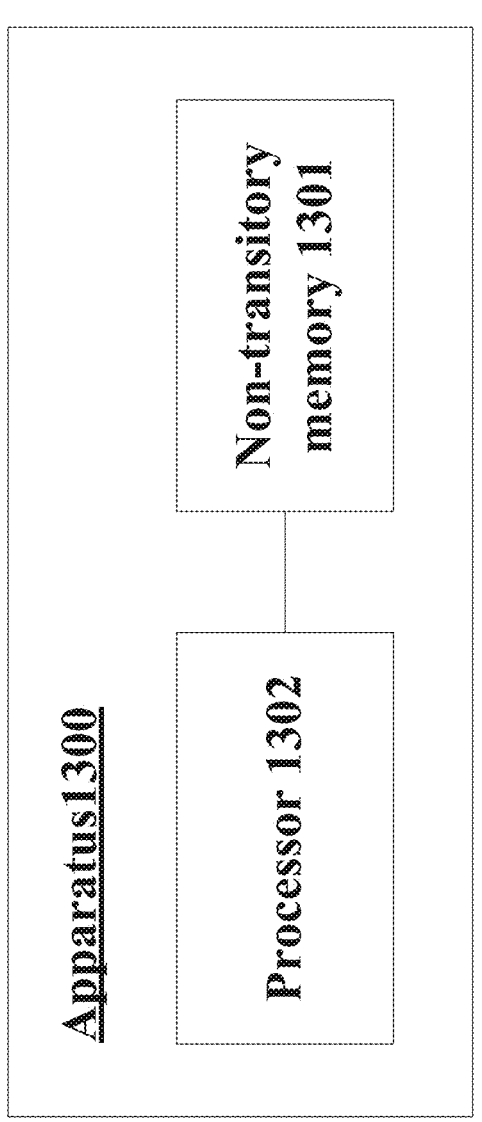
FIG. 13 is a block diagram illustrating an example of an apparatus for inter prediction according to the present application.

In a second aspect of the present application, an apparatus 1300 for inter prediction, as shown in FIG. 13, which comprises: a non-transitory memory 1301 having processor-executable instructions stored thereon; and a processor 1302, coupled to the memory 1301 configured to execute the processor-executable instructions to facilitate any one of feasible embodiments in the first aspect of the present application.

In a third aspect of the present application, a bitstream for inter prediction, comprising: indicating information for determining whether a non-rectangular inter prediction mode is allowed for a group of blocks; and one or more inter prediction mode parameters and weighted prediction parameters for the group of blocks, wherein prediction value of a current block is obtained based on the one or more inter prediction mode parameters and weighted prediction parameters, wherein one of the inter prediction mode parameters indicates reference picture information for the current block, and wherein the group of blocks comprises the current block.

In a feasible embodiment, the reference picture information comprises whether weighted prediction is enabled for a reference picture index, and wherein the non-rectangular inter prediction mode is disabled in the event that weighted prediction is enabled.

In a feasible embodiment, the non-rectangular inter prediction mode is enabled in the event that weighted prediction is disabled.

In a feasible embodiment, the indicating information comprises the maximum number of triangular merge candidates (MaxNumTriangleMergeCand) is greater than 1.

In a feasible embodiment, the group of blocks consists of a picture, and wherein the weighted prediction parameters and the indicating information are in a picture header of the picture.

In a feasible embodiment, the group of blocks consists of a slice, and wherein the weighted prediction parameters and the indicating information are in a slice header of the slice.

In a feasible embodiment, the non-rectangular inter prediction mode is a triangular partitioning mode.

In a feasible embodiment, the non-rectangular inter prediction mode is a geometric (GEO) partitioning mode.

In a feasible embodiment, the weighted prediction parameters are used for a slice-level luminance compensation.

In a feasible embodiment, the weighted prediction parameters are used for a block-level luminance compensation.

In a feasible embodiment, the weighted prediction parameters comprises: flags indicating whether the weighted prediction is applied to luma and/or chroma components of a prediction block; and linear model parameters specifying a linear transformation of a value of the prediction block.

Figure 14:
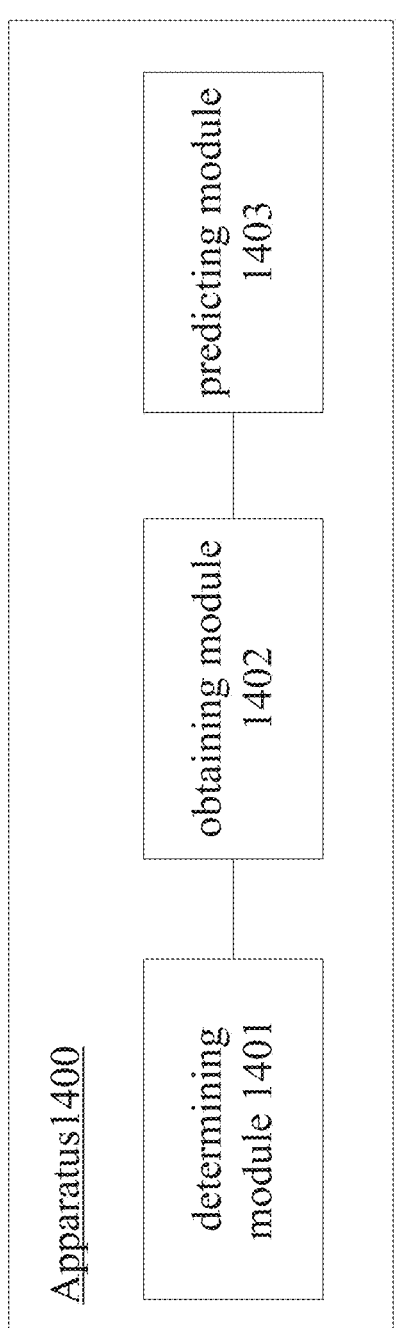
FIG. 14 is a block diagram illustrating another example of an apparatus for inter prediction according to the present application.

In a fourth aspect of the present application, as shown in FIG. 14, an inter prediction apparatus 1400 is disclosed, which comprises: a determining module 1401, configured to determine whether a non-rectangular inter prediction mode is allowed for a group of blocks; an obtaining module 1402, configured to obtain one or more inter prediction mode parameters and weighted prediction parameters for the group of blocks; and a predicting module 1403, configured to obtain prediction value of a current block based on the one or more inter prediction mode parameters and weighted prediction parameters, wherein one of the inter prediction mode parameters indicates reference picture information for the current block, and wherein the group of blocks comprises the current block.

In a feasible embodiment, the reference picture information comprises whether weighted prediction is enabled for a reference picture index, and wherein the non-rectangular inter prediction mode is disabled in the event that weighted prediction is enabled.

In a feasible embodiment, the non-rectangular inter prediction mode is enabled in the event that weighted prediction is disabled.

In a feasible embodiment, the determining module 1401 is specifically configured to: indicate the maximum number of triangular merge candidates (MaxNumTriangleMergeCand) is greater than 1.

In a feasible embodiment, the group of blocks consists of a picture, and wherein the weighted prediction parameters and indicating information for determining the non-rectangular inter prediction mode is allowed are in a picture header of the picture.

In a feasible embodiment, the group of blocks consists of a slice, and wherein the weighted prediction parameters and indicating information for determining the non-rectangular inter prediction mode is allowed are in a slice header of the slice.

In a feasible embodiment, the non-rectangular inter prediction mode is a triangular partitioning mode.

In a feasible embodiment, the non-rectangular inter prediction mode is a geometric (GEO) partitioning mode.

In a feasible embodiment, the weighted prediction parameters are used for a slice-level luminance compensation.

In a feasible embodiment, the weighted prediction parameters are used for a block-level luminance compensation.

In a feasible embodiment, the weighted prediction parameters comprises: flags indicating whether the weighted prediction is applied to luma and/or chroma components of a prediction block; and linear model parameters specifying a linear transformation of a value of the prediction block.

Furthermore, the following embodiments/aspects are provided herein that might be combined arbitrarily with each other as it is considered suitable for the actual applications. They are newly enumerated and listed as follows.

In a first aspect of the present application, an inter prediction method, comprising: determining whether a non-rectangular inter prediction mode is allowed for a group of blocks; obtaining one or more inter prediction mode parameters and weighted prediction parameters for the group of blocks; and obtaining prediction value of a current block based on the one or more inter prediction mode parameters and weighted prediction parameters, wherein one of the inter prediction mode parameters indicates reference picture information for the current block, and wherein the group of blocks comprises the current block.

In a feasible embodiment, the reference picture information comprises whether weighted prediction is enabled for a reference picture index, and wherein the non-rectangular inter prediction mode is disabled in the event that weighted prediction is enabled.

In a feasible embodiment, the non-rectangular inter prediction mode is enabled in the event that weighted prediction is disabled.

In a feasible embodiment, determining the non-rectangular inter prediction mode is allowed, comprising: indicating the maximum number of triangular merge candidates (MaxNumTriangleMergeCand) is greater than 1.

In a feasible embodiment, the group of blocks consists of a picture, and wherein the weighted prediction parameters and indicating information for determining the non-rectangular inter prediction mode is allowed are in a picture header of the picture.

In a feasible embodiment, the group of blocks consists of a slice, and wherein the weighted prediction parameters and indicating information for determining the non-rectangular inter prediction mode is allowed are in a slice header of the slice.

In a feasible embodiment, the non-rectangular inter prediction mode is a triangular partitioning mode.

In a feasible embodiment, the non-rectangular inter prediction mode is a geometric (GEO) partitioning mode.

In a feasible embodiment, syntax elements related to number of candidates for merge mode (indicating information for determining the non-rectangular inter prediction) are signaled in the sequence parameter set (SPS). Here, the picture header may be signaled in slice header when a picture comprises just one slice.

In a feasible embodiment, the picture header is signaled in slice header when a picture comprises just one slice.

In a feasible embodiment, the picture parameter set comprises a flag, the value of which defines whether weighted prediction parameters are present in picture header or in a slice header.

In a feasible embodiment, a flag in a picture header indicates whether a slice of non-intra type is present and whether inter prediction mode parameters are signaled for this slice.

In a feasible embodiment, the weighted prediction parameters are used for a slice-level luminance compensation.

In a feasible embodiment, the weighted prediction parameters are used for a block-level luminance compensation.

In a feasible embodiment, the weighted prediction parameters comprises: flags indicating whether the weighted prediction is applied to luma and/or chroma components of a prediction block; and linear model parameters specifying a linear transformation of a value of the prediction block.

In a second aspect of the present application, an apparatus for inter prediction, comprising: a non-transitory memory having processor-executable instructions stored thereon; and a processor, coupled to the memory, configured to execute the processor-executable instructions to facilitate any one of feasible embodiments in the first aspect of the present application.

In a third aspect of the present application, a bitstream for inter prediction, comprising: indicating information for determining whether a non-rectangular inter prediction mode is allowed for a group of blocks; and one or more inter prediction mode parameters and weighted prediction parameters for the group of blocks, wherein prediction value of a current block is obtained based on the one or more inter prediction mode parameters and weighted prediction parameters, wherein one of the inter prediction mode parameters indicates reference picture information for the current block, and wherein the group of blocks comprises the current block.

In a feasible embodiment, the reference picture information comprises whether weighted prediction is enabled for a reference picture index, and wherein the non-rectangular inter prediction mode is disabled in the event that weighted prediction is enabled.

In a feasible embodiment, the non-rectangular inter prediction mode is enabled in the event that weighted prediction is disabled.

In a feasible embodiment, the indicating information comprises the maximum number of triangular merge candidates (MaxNumTriangleMergeCand) is greater than 1.

In a feasible embodiment, the group of blocks consists of a picture, and wherein the weighted prediction parameters and the indicating information are in a picture header of the picture.

In a feasible embodiment, the group of blocks consists of a slice, and wherein the weighted prediction parameters and the indicating information are in a slice header of the slice.

In a feasible embodiment, the non-rectangular inter prediction mode is a triangular partitioning mode.

In a feasible embodiment, the non-rectangular inter prediction mode is a geometric (GEO) partitioning mode.

In a feasible embodiment, the weighted prediction parameters are used for a slice-level luminance compensation.

In a feasible embodiment, the weighted prediction parameters are used for a block-level luminance compensation.

In a feasible embodiment, the weighted prediction parameters comprises: flags indicating whether the weighted prediction is applied to luma and/or chroma components of a prediction block; and linear model parameters specifying a linear transformation of a value of the prediction block.

In a fourth aspect of the present application, an inter prediction apparatus, comprising: a determining module, configured to determine whether a non-rectangular inter prediction mode is allowed for a group of blocks; an obtaining module, configured to obtain one or more inter prediction mode parameters and weighted prediction parameters for the group of blocks; and a predicting module, configured to obtain prediction value of a current block based on the one or more inter prediction mode parameters and weighted prediction parameters, wherein one of the inter prediction mode parameters indicates reference picture information for the current block, and wherein the group of blocks comprises the current block.

In a feasible embodiment, the reference picture information comprises whether weighted prediction is enabled for a reference picture index, and wherein the non-rectangular inter prediction mode is disabled in the event that weighted prediction is enabled.

In a feasible embodiment, the non-rectangular inter prediction mode is enabled in the event that weighted prediction is disabled.

In a feasible embodiment, the determining module is specifically configured to: indicate the maximum number of triangular merge candidates (MaxNumTriangleMergeCand) is greater than 1.

In a feasible embodiment, the group of blocks consists of a picture, and wherein the weighted prediction parameters and indicating information for determining the non-rectangular inter prediction mode is allowed are in a picture header of the picture.

In a feasible embodiment, the group of blocks consists of a slice, and wherein the weighted prediction parameters and indicating information for determining the non-rectangular inter prediction mode is allowed are in a slice header of the slice.

In a feasible embodiment, the non-rectangular inter prediction mode is a triangular partitioning mode.

In a feasible embodiment, the non-rectangular inter prediction mode is a geometric (GEO) partitioning mode.

In a feasible embodiment, the weighted prediction parameters are used for a slice-level luminance compensation.

In a feasible embodiment, the weighted prediction parameters are used for a block-level luminance compensation.

In a feasible embodiment, the weighted prediction parameters comprises: flags indicating whether the weighted prediction is applied to luma and/or chroma components of a prediction block; and linear model parameters specifying a linear transformation of a value of the prediction block.

Furthermore, the following embodiments are provided herein:

What is claimed is:

1. A method of coding implemented by an encoding device, the method comprising:

encoding a picture header into a video bitstream, wherein the picture header comprises a first indicator for a picture, wherein the picture comprises a slice, the slice comprises a block, and wherein the first indicator indicates a slice type of the slice;

encoding a picture parameter set into the video bitstream, wherein the picture parameter set comprises a second indicator for the picture, wherein the second indicator indicates whether a weighted prediction table structure is present in the picture header or is present in a slice header;

determining a value of a weighted prediction parameter for the block in the weighted prediction table structure when a first value of the first indicator is equal to a first preset value and a second value of the second indicator is equal to a second preset value, and wherein the first preset value is a first integer value, and the second preset value is a second integer value;

encoding the weighted prediction table structure into the video bitstream;

encoding a reference picture list syntax structure into the video bitstream; and predicting the block according to the value of the weighted prediction parameter and the reference picture list syntax structure.

2. The method of claim 1, wherein the weighted prediction table structure is designated as pred_weight_table( ).

3. The method of claim 1, wherein the first value of the first indicator being equal to the first preset value represents that a slice type of at least one slice comprised in the picture is an inter slice, wherein the inter slice comprises a B slice or a P slice.

4. The method of claim 1, wherein the weighted prediction table structure comprises a first parameter luma_log 2_weight_denom, wherein the first parameter luma_log 2_weight_denom is a base 2 logarithm of a denominator for all luma weighting factors.

5. The method of claim 1, wherein the weighted prediction table structure comprises a second parameter luma_offset_l0[i] and a third parameter luma_offset_l1[i], wherein the second parameter luma_offset_l0[i] is a first additive offset applied to a first luma prediction value for list 0 prediction using RefPicList[0][i], and wherein the third parameter luma_offset_l1[i] is a second additive offset applied to a second luma prediction value for list 1 prediction using RefPicList[1][i].

6. The method of claim 1, wherein the reference picture list syntax structure is designated as ref_pic_list_struct(listIdx, rplsIdx) and specifies reference picture list listIdx of the picture when the ref pic list_struct(listIdx, rplsIdx) is present in the slice header.

7. The method of claim 1, wherein the reference picture list syntax structure is designated as ref_pic_list_struct(listIdx, rplsIdx) and specifies a candidate for reference picture list listIdx when the ref_pic_list_struct(listIdx, rplsIdx) is present in an sequence parameter set (SPS).

8. An encoder, comprising:

one or more processors; and a non-transitory computer-readable storage medium coupled to the one or more processors and storing programming for execution by the one or more processors to cause the encoder to carry out operations comprising:

encoding a picture header into a video bitstream, wherein the picture header comprises a first indicator for a picture, wherein the picture comprises a slice, the slice comprises a block, and wherein the first indicator indicates a slice type of the slice;

encoding a picture parameter set into the video bitstream, wherein the picture parameter set comprises a second indicator for the picture, wherein the second indicator indicates whether a weighted prediction table structure is present in the picture header or is present in a slice header;

determining a value of a weighted prediction parameter for the block in the weighted prediction table structure when a first value of the first indicator is equal to a first preset value and a second value of the second indicator is equal to a second preset value, and wherein the first preset value is a first integer value, and the second preset value is a second integer value;

encoding the weighted prediction table structure into the video bitstream;

encoding a reference picture list syntax structure into the video bitstream; and predicting the block according to the value of the weighted prediction parameter and the reference picture list syntax structure.

9. The encoder of claim 8, wherein the weighted prediction table structure is designated as pred_weight_table( ).

10. The encoder of claim 8, wherein the first value of the first indicator being equal to the first preset value represents that a slice type of at least one slice comprised in the picture is an inter slice, wherein the inter slice comprises a B slice or a P slice.

11. The encoder of claim 8, wherein the weighted prediction table structure comprises a first parameter luma_log 2_weight_denom, wherein the first parameter luma_log 2_weight_denom is a base 2 logarithm of a denominator for all luma weighting factors.

12. The encoder of claim 8, wherein the weighted prediction table structure comprises a second parameter luma_offset_l0[i] and a third parameter luma_offset_l1[i], wherein the second parameter luma_offset_l0[i] is a first additive offset applied to a first luma prediction value for list 0 prediction using RefPicList[0][i], and wherein the third parameter luma_offset_l1[i] is a second additive offset applied to a second luma prediction value for list 1 prediction using RefPicList[1][i].

13. The encoder of claim 8, wherein the reference picture list syntax structure is designated as ref_pic_list_struct(listIdx, rplsIdx) and specifies reference picture list listIdx of the picture when the ref_pic_list_struct(listIdx, rplsIdx) is present in the slice header.

14. The encoder of claim 8, wherein the reference picture list syntax structure is designated as ref_pic_list_struct(listIdx, rplsIdx) and specifies a candidate for reference picture list listIdx when the ref_pic_list_struct(listIdx, rplsIdx) is present in an sequence parameter set (SPS).

15. A non-transitory computer-readable medium storing computer-executable instructions that, when executed by a video decoding device comprising a processor and a memory, configure the video decoding device to:

store, in the memory, an encoded video bitstream, wherein the bitstream comprises syntax elements and data representing a picture comprising a slice, the slice comprises a block, and the syntax elements comprising:

a picture header, comprising a first indicator for the picture, wherein the first indicator indicates a slice type of the slice;

a weighted prediction table structure;

a picture parameter set, comprising a second indicator for the picture, wherein the second indicator indicates whether the weighted prediction table structure is present in the picture header or is present in a slice header, wherein a value of a weighted prediction parameter for the block in the weighted prediction table structure is parsed when a first value of the first indicator is equal to a first preset value and a second value of the second indicator is equal to a second preset value, and wherein the first preset value is a first integer value, and the second preset value is a second integer value; and a reference picture list syntax structure; and configure the video coding device to predict the block by processing of the picture based on the syntax elements.

16. The medium of claim 15, wherein the weighted prediction table structure is designated as pred_weight_table( ).

17. The medium of claim 15, wherein the first value of the first indicator being equal to the first preset value represents that a slice type of at least one slice comprised in the picture is an inter slice, wherein the inter slice comprises a B slice or a P slice.

18. The medium of claim 15, wherein the weighted prediction table structure comprises a first parameter luma_log 2_weight_denom, wherein the first parameter luma_log 2_weight_denom is a base 2 logarithm of a denominator for all luma weighting factors.

19. The medium of claim 15, wherein the weighted prediction table structure comprises a second parameter luma_offset_l0[i] and a third parameter luma_offset_l1[i], wherein the second parameter luma_offset_l0[i] is a first additive offset applied to a first luma prediction value for list 0 prediction using RefPicList[0][i], and wherein the third parameter luma_offset_l1[i] is a second additive offset applied to a second luma prediction value for list 1 prediction using RefPicList[1][i].

20. The medium of claim 15, wherein the reference picture list syntax structure is designated as ref_pic_list_struct(listIdx, rplsIdx), wherein the ref_pic_list_struct(listIdx, rplsIdx) specifies reference picture list listIdx of the picture when ref_pic_list_struct(listIdx, rplsIdx) is present in the slice header, or specifies a candidate for reference picture list listIdx when the ref pic_list_struct(listIdx, rplsIdx) is present in an sequence parameter set (SPS).

* * * * *